United States Patent
Morris

(10) Patent No.: US 10,747,853 B1
(45) Date of Patent: *Aug. 18, 2020

(54) APPLICATION-GOVERNED LINK OPENING SYSTEM AND METHOD

(71) Applicant: Vulpecula, LLC, Allen, TX (US)

(72) Inventor: Robert Paul Morris, Madison, GA (US)

(73) Assignee: VULPECULA, LLC, Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,168

(22) Filed: Nov. 25, 2019

Related U.S. Application Data

(63) Continuation of application No. 16/267,334, filed on Feb. 4, 2019, now Pat. No. 10,496,800, which is a
(Continued)

(51) Int. Cl.
*G06F 21/12* (2013.01)
*G06F 21/62* (2013.01)
(Continued)

(52) U.S. Cl.
CPC .......... *G06F 21/128* (2013.01); *G06F 16/955* (2019.01); *G06F 16/957* (2019.01);
(Continued)

(58) Field of Classification Search
CPC .... G06F 21/128; G06F 21/6263; G06F 21/51; G06F 16/955; G06F 16/958; G06F 16/9558; G06F 16/957; H04L 67/025
(Continued)

(56) References Cited

U.S. PATENT DOCUMENTS 6,185,586 B1 *  2/2001  Judson ................. G06F 16/957
                                                        715/207
6,434,561 B1 *  8/2002  Durst, Jr. ........... H04N 1/33323
(Continued)

OTHER PUBLICATIONS

NPL Search Results (Year: 2020).*
(Continued)

*Primary Examiner* — Syed A Zaidi
(74) *Attorney, Agent, or Firm* — Patrick E. Caldwell, Esq.; The Caldwell Firm, LLC

(57) ABSTRACT

In one embodiment, a computer-implemented method is provided, comprising: developing at least a portion of a particular application that is configured to be installed on at least one device including an operating system, a web browser, and another application; developing a web page that includes a Hypertext Transfer Protocol (HTTP) link; causing the web page that includes the HTTP link to be hosted by at least one server in connection with a web site; causing to be stored, in connection with the particular application, first information identifying at least one aspect of the web site; causing to be stored, at the at least one server, second information identifying the particular application; via at least one network, receiving, at the at least one server and from the at least one device, a first request initiated via the web browser of the at least one device; and in response to the first request, serving, to the at least one device via the at least one network, the web page that includes the HTTP link such that, in response to a selection of the HTTP link via the web browser of the at least one device, the HTTP link causes the operating system to: based on a first result of an analysis involving the first information and the second information, open the HTTP link utilizing the particular application of the at least one device, and based on a second result of the analysis involving the first information and the second information, open the HTTP link utilizing the
(Continued)

web browser of the at least one device; wherein the HTTP link is opened utilizing the particular application of the at least one device in response to the selection of the HTTP link via web browser of the at least one device, without any user input in connection with the HTTP link other than the selection of the HTTP link via the web browser of the at least one device.

18 Claims, 44 Drawing Sheets

Related U.S. Application Data continuation of application No. 16/151,312, filed on Oct. 3, 2018, which is a continuation-in-part of application No. 15/158,558, filed on May 18, 2016, now abandoned, which is a continuation-in-part of application No. 14/807,831, filed on Jul. 23, 2015, now abandoned.

(60) Provisional application No. 62/065,601, filed on Oct. 17, 2014.

(51) Int. Cl.
| | |
|---|---|
| *G06F 21/51* | (2013.01) |
| *G06F 16/958* | (2019.01) |
| *G06F 16/957* | (2019.01) |
| *G06F 16/955* | (2019.01) |
| *H04L 29/08* | (2006.01) |

(52) U.S. Cl.
CPC ........ *G06F 16/958* (2019.01); *G06F 16/9558* (2019.01); *G06F 21/51* (2013.01); *G06F 21/6263* (2013.01); *H04L 67/025* (2013.01)

(58) Field of Classification Search
USPC .......................................................... 726/29
See application file for complete search history.

(56) References Cited

U.S. PATENT DOCUMENTS

| | | | |
|---|---|---|---|
| 6,854,120 B1* | 2/2005 | Lo .......................... | G06Q 10/06 719/311 |
| 7,200,632 B1 | 4/2007 | Greschler et al. | |
| 8,782,538 B1 | 7/2014 | Skare et al. | |
| 9,070,211 B1 | 6/2015 | Kroeger et al. | |
| 9,268,956 B2* | 2/2016 | Anakata ................. | G06F 21/604 |
| 9,806,942 B2 | 10/2017 | Saxena et al. | |
| 9,875,456 B2* | 1/2018 | Favier ................. | G06Q 30/0185 |
| 2001/0032320 A1* | 10/2001 | Abdelnur ................ | H04L 29/06 726/7 |
| 2002/0073206 A1* | 6/2002 | Jawahar .............. | G06F 11/3495 709/227 |
| 2003/0014489 A1* | 1/2003 | Inala ...................... | H04L 29/06 709/204 |
| 2003/0061105 A1* | 3/2003 | Morris ................... | G06Q 30/02 705/26.8 |
| 2003/0167213 A1* | 9/2003 | Jammes ................. | G06Q 30/02 705/26.62 |
| 2003/0182400 A1* | 9/2003 | Karagounis ............. | H04L 67/02 709/219 |
| 2005/0278410 A1* | 12/2005 | Espino ................ | H04L 67/2823 709/201 |
| 2006/0064410 A1* | 3/2006 | Razza ................... | G06F 16/958 |
| 2007/0050703 A1* | 3/2007 | Lebel .................... | G06F 16/958 715/234 |
| 2010/0161717 A1 | 6/2010 | Albrecht et al. | |
| 2012/0011588 A1* | 1/2012 | Milener .............. | H04L 63/1425 726/24 |
| 2012/0221724 A1 | 8/2012 | Chor | |
| 2013/0054705 A1 | 2/2013 | Belvin et al. | |
| 2013/0080930 A1 | 3/2013 | Johansson | |
| 2013/0312075 A1* | 11/2013 | Nichols ................... | G06F 21/62 726/8 |
| 2013/0318609 A1 | 11/2013 | Kim et al. | |
| 2014/0237248 A1 | 8/2014 | Striem-Amit | |
| 2014/0324545 A1* | 10/2014 | Splaine ............. | G06Q 30/0277 705/7.33 |
| 2014/0351889 A1 | 11/2014 | Liu et al. | |
| 2015/0154584 A1 | 6/2015 | Prashant et al. | |
| 2015/0185995 A1 | 7/2015 | Shoemaker et al. | |
| 2015/0286737 A1 | 10/2015 | Cattone et al. | |

OTHER PUBLICATIONS

Notice of Allowance and Fees Due (PTOL-85) dated Sep. 19, 2019.
Notice of Allowance and Fees Due (PTOL-85) dated Oct. 22, 2019.
Final_Rejection_dated Aug. 21, 2019_for_U.S. Appl. No. 16/267,334.
Non-Final Rejection dated May 24, 2019 for U.S. Appl. No. 16/267,334.
Reconsideration After Non-Final Rejection dated Jun. 5, 2019 for U.S. Appl. No. 16/267,334.
U.S. Appl. No. 16/151,311 Office Action dated Jan. 14, 2019.
U.S. Appl. No. 16/151,311 Office Action dated May 6, 2019.
U.S. Appl. No. 16/151,311 Office Action dated Jun. 11, 2019.
U.S. Appl. No. 16/360,001 Office Action dated May 23, 2019.
U.S. Appl. No. 16/360,001 Office Action dated Aug. 6, 2019.
Notice of allowance dated Oct. 24, 2019 for U.S. Appl. No. 16/151,311.

* cited by examiner

```
                    ┌─ 702      ┌─ 704                    ┌─ 706                                 700
                                                                                              ╱
       POST www.otherSite.net/path/formHandler.cgi HTTP/1.1
708 ── Host: finance.myExample.us.com
       User-Agent: Mozilla/5.0 (Windows; U; Windows NT 5.1; en-US; rv: 1.8.0.7) Gecko/
       2006010010 Firefox 1.5.0.7
       Accept: text/xml,application/xml,application/xhtml+xml,text/html;q=0.10,text/
       plain;q=0.8, \
       image/png,image/jpeg
       Accept-Language: en-us,en;q=0.5                    ── 710
       Accept-Encoding: gzip,deflate
       Accept-Charset: ISO-88510-I,utf-8;q=0.7,*;q=0.7
       Keep-Alive: 300
       Connection: keep-alive                    ── 712
       Cookie: sessionid=AF13BOC
       Target-UA: IE 10+; MZ 22          ── 716
       Target-UAC: ZOZO 15              ── 718
       Route-UA: MZ 22                ── 720
       Content-Type: application/x-www-form-urlencoded
       Content-Length: 32 home=Cosby&favorite+flavor=flies
                       ╱
               714 ──╱
```

*Fig. 7A*

```
                    ┌─ 722
                                                                    721
       HTTP/1.1 200 OK                                           ╱
       Date: Wed, 08 Sep 200317:32:31 GMT
       Server: Apache/1.3.27 (Unix) (Red-Hat!Linux) PHP/3.1.2
       Last-Modified: Wed, 08 Sep 2003 17:02:30 GMT
       Target-UA: IE 10+; MZ 22 ───────────── 730
       Target-UAC: ZOZO 15
       MIME-Version: 1.0   ─────── 728
       Content-Type: empty/*  ──── 724
       Cookie: sessionid=AF13BOC
                               ╲
                                ── 726
```

*Fig. 7B*

```
MIME-Version: 1.0
Content-Type: multipart/mixed; boundary="--somedomain----toOo--------"
                                               902
--somedomain----toOo--------
Content-Type: text/plain
Agent mail/*
                                 906
Hi, this is the first message
--somedomain----toOo--------    904
Content-Type: image/*
Agent: photo/*
                           908
...
--somedomain----toOo--------
```

```
MIME-Version: 1.0
Content-Type: multipart/mixed; boundary="--toOo----somedomain--------"

--toOo----somedomain--------
Content-Type: text/plain       912
Client: Thunderbird
Dad, See the web page Love,
William
--toOo----somedomain--------
Content-Type: application/link
Agent: MZ 7+; IE 7+
                           914
Http://somedomain.com/somefolder/somepage.html
--toOo----somedomain--------
```

*Fig. 9B*

APPLICATION-GOVERNED LINK OPENING SYSTEM AND METHOD

RELATED APPLICATIONS

This application claims priority to and is a continuation of application Ser. No. 16/267,334, filed on Feb. 4, 2019, which, in turn, claims priority to and is a continuation of application Ser. No. 16/151,312 filed on Oct. 3, 2018, which, in turn, claims priority to and is a continuation-in-part of application Ser. No. 15/158,558 filed on May 18, 2016 (published US 2016-0266879 A1) which, in turn, claims priority to and is a continuation-in-part of application Ser. No. 14/807,831 filed on Jul. 23, 2015 (published US 2016-0154673 A1) which, in turn, claims priority to App. Ser. No. 62/065,601 filed on Oct. 17, 2014. App. Ser. No. 62/065,601 filed on Oct. 17, 2014 is incorporated herein by reference in its entirety for all purposes.

FIELD OF THE INVENTION

The present invention relates to relates to opening links based on application information.

SUMMARY

In one embodiment, a computer-implemented method is provided, comprising: developing at least a portion of a particular application that is configured to be installed on at least one device including an operating system, a web browser, and another application; developing a web page that includes a Hypertext Transfer Protocol (HTTP) link; causing the web page that includes the HTTP link to be hosted by at least one server in connection with a web site; causing to be stored, in connection with the particular application, first information identifying at least one aspect of the web site; causing to be stored, at the at least one server, second information identifying the particular application; via at least one network, receiving, at the at least one server and from the at least one device, a first request initiated via the web browser of the at least one device; and in response to the first request, serving, to the at least one device via the at least one network, the web page that includes the HTTP link such that, in response to a selection of the HTTP link via the web browser of the at least one device, the HTTP link causes the operating system to: based on a first result of an analysis involving the first information and the second information, open the HTTP link utilizing the particular application of the at least one device, and based on a second result of the analysis involving the first information and the second information, open the HTTP link utilizing the web browser of the at least one device; wherein the HTTP link is opened utilizing the particular application of the at least one device in response to the selection of the HTTP link via web browser of the at least one device, without any user input in connection with the HTTP link other than the selection of the HTTP link via the web browser of the at least one device.

A non-transitory computer-readable media is provided comprising: first instructions of a particular application configured to be installed, along with first information identifying at least one aspect of a web site, on a device including an operating system, a web browser, and another application; and second instructions that; when executed by one or more processors of at least one server storing: the web site with a web page that includes a Hypertext Transfer Protocol (HTTP) link, and second information identifying the particular application; cause the one or more processors of the at least one server to: via at least one network, receiving, at the at least one server and from the at least one device, a first request initiated via the web browser of the at least one device; and in response to the first request, serving, to the at least one device via the at least one network, the web page that includes the HTTP link such that, in response to a selection of the HTTP link via the web browser of the at least one device, the HTTP link causes the operating system to: based on a first result of an analysis involving the first information and the second information, open the HTTP link utilizing the particular application of the at least one device, and based on a second result of the analysis involving the first information and the second information, open the HTTP link utilizing the web browser of the at least one device; wherein the HTTP link is opened utilizing the particular application of the at least one device in response to the selection of the HTTP link via web browser of the at least one device, without any user input in connection with the HTTP link other than the selection of the HTTP link via the web browser of the at least one device.

An apparatus is provided, comprising: at least one non-transitory memory configured to store instructions; and one or more processors in communication with the at least one non-transitory memory, wherein the one or more processors is configured to execute the instructions to: store a web site with a web page that includes a Hypertext Transfer Protocol (HTTP) link and first information identifying a particular application, the particular application configured to be installed, with second information identifying at least one aspect of the web site on a device with an operating system, a web browser, and another application; via at least one network, receiving, at the at least one server and from the at least one device, a first request initiated via the web browser of the at least one device; and in response to the first request, serving, to the at least one device via the at least one network, the web page that includes the HTTP link such that, in response to a selection of the HTTP link via the web browser of the at least one device, the HTTP link causes the operating system to: based on a first result of an analysis involving the first information and the second information, open the HTTP link utilizing the particular application of the at least one device, and based on a second result of the analysis involving the first information and the second information, open the HTTP link utilizing the web browser of the at least one device; wherein the HTTP link is opened utilizing the particular application of the at least one device in response to the selection of the HTTP link via web browser of the at least one device, without any user input in connection with the HTTP link other than the selection of the HTTP link via the web browser of the at least one device.

A system is provided, comprising: a first computer including a first non-transitory memory configured to store first instructions, and one or more first processors in communication with the first non-transitory memory, wherein the one or more first processors is configured to execute the first instructions to: create at least a portion of a particular application that is configured to be installed on a device including an operating system, a web browser, and another application, and cause to be stored, in connection with the particular application, first information identifying at least one aspect of a web site; and a second computer including a second non-transitory memory configured to store second instructions, and one or more second processors in communication with the first non-transitory memory, wherein the one or more second processors is configured to execute the second instructions to: store a web page that includes a Hypertext Transfer Protocol (HTTP) link in connection with the web site, store second information identifying the particular application, via at least one network, receiving, at the at least one server and from the at least one device, a first request initiated via the web browser of the at least one device; and in response to the first request, serving, to the at least one device via the at least one network, the web page that includes the HTTP link such that, in response to a selection of the HTTP link via the web browser of the at least one device, the HTTP link causes the operating system to: based on a first result of an analysis involving the first information and the second information, open the HTTP link utilizing the particular application of the at least one device, and based on a second result of the analysis involving the first information and the second information, open the HTTP link utilizing the web browser of the at least one device; wherein the HTTP link is opened utilizing the particular application of the at least one device in response to the selection of the HTTP link via web browser of the at least one device, without any user input in connection with the HTTP link other than the selection of the HTTP link via the web browser of the at least one device.

BRIEF DESCRIPTION OF THE DRAWINGS

FIG. 7A shows a diagram illustrating an HTTP request message, in accordance with an embodiment;

FIG. 7B shows a diagram illustrating a HTTP response, in accordance with an embodiment;

FIG. 9A shows a diagram illustrating a multipart formatting of data, in accordance with an embodiment;

FIG. 9B shows a diagram illustrating a multipart formatting of data, in accordance with an embodiment;

DETAILED DESCRIPTION

Figure 1A:
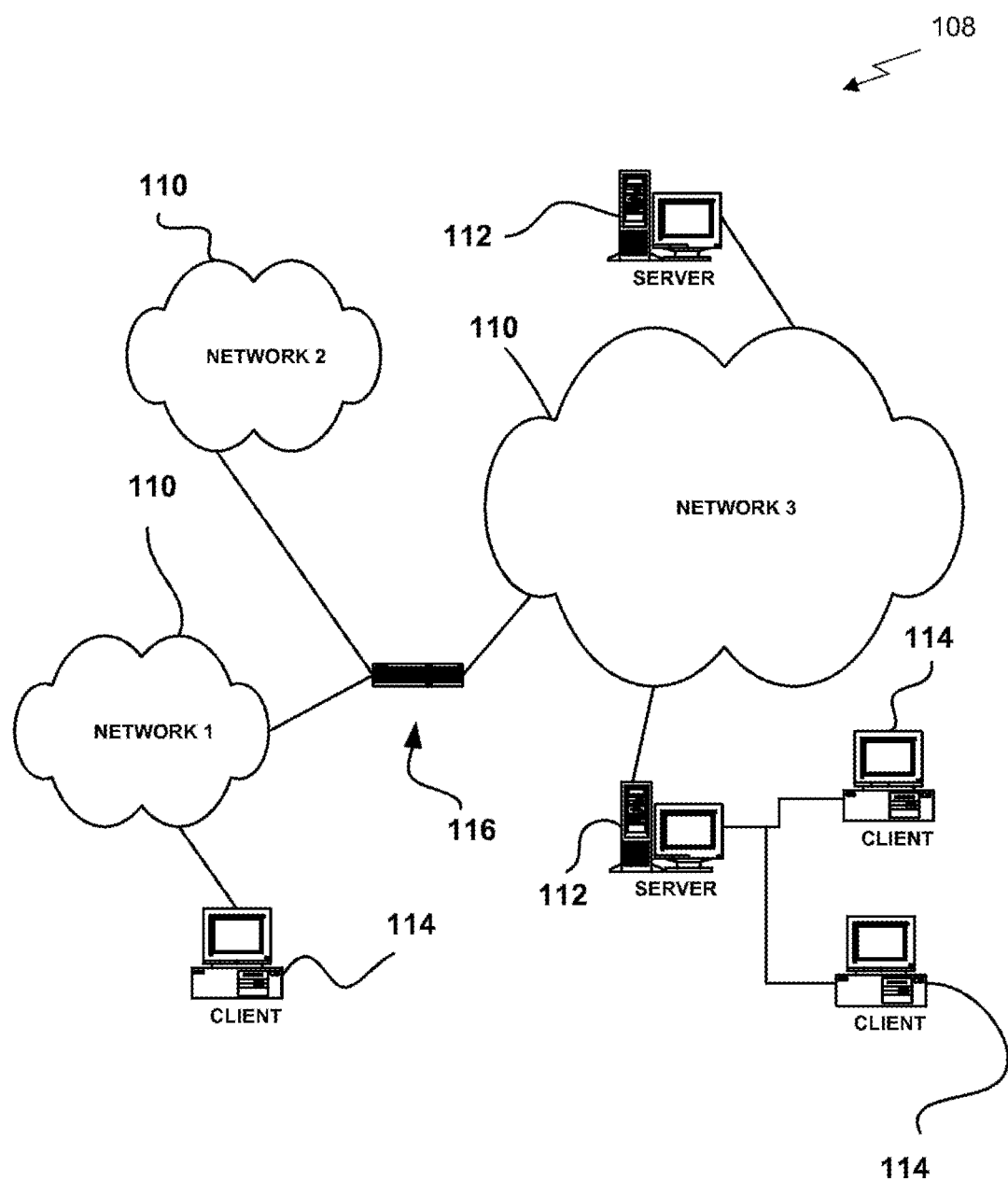
FIG. 1A illustrates a network architecture, in accordance with one possible embodiment.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

Each embodiment, option, and/or aspect of the subject matter disclosed herein (including any applications incorporated by reference) may or may not incorporate any desired feature from any other embodiment, option, and/or aspect described herein (including any applications incorporated by reference)

Definitions

Unless otherwise defined, all technical and scientific terms used in the present disclosure have the same meaning as commonly understood by one of ordinary skill in the art to which the present disclosure belongs. Although methods, components, and devices similar or equivalent to those described in the present disclosure can be used in the practice or testing of the subject matter described in the present disclosure, suitable methods, components, and devices are described below.

The materials, methods, and examples are illustrative only and not intended to be limiting.

The use of the terms "a" and "an" and "the" and similar referents in the context of describing the subject matter (particularly in the context of the following claims) are to be construed to cover both the singular and the plural, unless otherwise indicated in the present disclosure or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided in the present disclosure, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The use of "including", "comprising", "having", and variations thereof are meant to encompass the items listed thereafter and equivalents thereof as well as additional items and equivalents thereof.

Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided to", "received from", "identified to", "interoperated" and similar terms and their variants.

As used in the present disclosure, any reference to an entity "in" an association is equivalent to describing the entity as "included in and/or identified by" the association, unless explicitly indicated otherwise.

An "operating environment", as used in the present disclosure, is an arrangement of hardware and/or software that may be further modified, transformed, and/or otherwise configured to include and/or otherwise host an arrangement of components including logic that is executed to perform a method of the subject matter described in the present disclosure. An operating environment includes or is provided by one or more devices that include one or more processors to execute instruction(s) included in logic in such an arrangement. The operating environment is said, in the present disclosure, to be the operating environment "of" the device and/or devices. A device may be a virtual device realized in one or more physical devices. At least some of the logic may be a translation of source code written in a programming language.

As used in the present disclosure a "processor" is an instruction execution machine, apparatus, or device. A processor may include one or more electrical, optical, and/or mechanical components that when executed operate in interpreting and executing logic, typically generated from code written in a programming language. Exemplary processors include one or more microprocessors, digital signal processors (DSPs), graphics processing units, application-specific integrated circuits (ASICs), optical or photonic processors, and/or field programmable gate arrays (FPGAs). A processor in an operating environment may be a virtual processor emulated by one or more hardware processors.

A "virtual operating environment" (VOE) operates in another operating environment. Linux and Windows virtual machines are examples of VOEs. The term "virtual machine" (VM) as used in the present disclosure refers to a software implementation that includes an emulation of a physical machine (e.g., a computer). A VM that includes an emulation of a processor is an operating environment provided by a host operating environment where the host operating environment includes a processor realized in hardware. Virtual machines provide hardware virtualization. Another category of VOE is referred to, in the present disclosure, as a "process virtual environment" (PVE). A PVE includes a single computing process. A JAVA virtual machine is an example of a process virtual environment. PVEs are typically tied to particular programming languages. Still another exemplary type of VOE is a "container operating environment" (COE). As used in the present disclosure a COE refers to a partition of a host operating environment that isolates an executing of an executable entity from other partitions. For example, a single physical server may be partitioned into multiple small partitions that each execute logic for respective web servers. To an executable entity, such as a web server, operating in a partition (COE) the partition appears to be an operating environment. COE's are referred to in other contexts outside the present disclosure as virtual environments (VE), virtual private servers (VPS), guests, zones, containers (e.g. Linux containers), etc.

The terms "network node" and "node" in the present disclosure both refer to a device having network interface hardware capable of operatively coupling the device to a network. Further, the terms "device" and "node" in the context of providing and/or otherwise being included in an operating environment refer respectively, unless clearly indicated otherwise, to one or more devices and nodes.

A "user interface element", as used herein refers to a user-detectable output of an output device of an operating environment. More specifically, visual outputs of a user interface are referred to in the present disclosure as "visual interface elements". A visual interface element may be a visual output in a graphical user interface (GUI) presented via a display device. Exemplary visual interface elements include icons, image data, graphical drawings, font characters, windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes, and radio buttons. An application user interface may include one or more of the elements listed. Those skilled in the art will understand that this list is not exhaustive. The terms "visual representation", "visual output", and "visual interface element" are used interchangeably in the present disclosure. Other types of user interface elements include audio outputs referred to as "audio interface elements", tactile outputs referred to as "tactile interface elements", and the like. As such, the term "output" as used herein refers any type of output.

A visual output may be presented in a two-dimensional presentation where a location may be defined in a two-dimensional space. For example one dimension may be a vertical dimension and the other a horizontal dimension. A location in a first dimension, such as the horizontal dimension, may be referenced according to an X-axis and a location in the second dimension (e.g. the vertical dimension) may be referenced according to a Y-axis. In another aspect, a visual output may be presented in a three-dimensional presentation where a location may be defined in a three-dimensional space having a depth dimension in addition to a vertical dimension and a horizontal dimension. A location in a depth dimension may be identified according to a Z-axis. A visual output in a two-dimensional presentation may be presented as if a depth dimension existed allowing the visual output to overlie and/or underlie some or all of another visual output.

An order of visual outputs in a particular dimension is herein referred to as an order in that dimension. For example, an order with respect to a Z-axis is referred to as a "Z-order". The term "Z-value" as used herein refers to a location in a Z-order. A Z-order specifies the front-to-back and/or back-to-front ordering of visual outputs in a presentation space with respect to a Z-axis. In one aspect, a visual output with a higher Z-value than another visual output may be defined to be on top of or closer to the front than the other visual output. In another aspect, a visual output with a lower Z-value than another visual output may be defined to be on top of or closer to the front than the other visual output. For ease of description the present disclosure defines a higher Z-value to be on top of or closer to the front than a lower Z-value.

A "user interface element handler" component, as the term is used in the present disclosure, refers to logic that when executed operates to send information to present a user-detectable representation of a processed entity by an output device, such as a display. A user interface element handler, additionally or alternatively, may also include logic to process input information that corresponds to a user interface element. The input information may be received by the user interface element handler in response to a user input detected via an input device of an operating environment. Information that is transformed, translated, and/or otherwise processed by logic in presenting a user interface element by the output device is referred to in the present disclosure as "presentation information" with respect to the logic. Presentation information may include and/or may otherwise identify data that is valid according to one or more schemas (defined below). Exemplary schemas for include raw pixel data, JPEG for image data, video formats such as MP4, markup language data such as defined by a schema for a hypertext markup language (HTML) and other XML-based markup, a bit map, and/or instructions such as those defined by various script languages, byte code, and/or machine code. For example, a web page received by a browser from a remote application provider may include HTML, ECMAScript, and/or byte code processed by logic to present one or more user interface elements included in a user interface of the remote application.

A user interface element may be stored and/or otherwise represented in a presentation space. As used in the present disclosure, the term "presentation space" refers to memory and/or other medium allocated and/or otherwise provided to store and/or otherwise represent presentation information, which may include audio, visual, tactile, and/or other sensory data for presentation by and/or on an output device. For example, a memory buffer to store an image and/or text string may be a presentation space as sensory information for a user. A presentation space may be physically and/or logically contiguous or non-contiguous. A presentation space may have a virtual as well as a physical representation. A presentation space may include a storage location in a processor memory, in a secondary storage, in a memory of an output adapter device, and/or in a storage medium of an output device. A screen of a display, for example, is a presentation space. In various embodiments, display may be included in a mobile device (e.g., phone, tablet, mobile entertainment device, etc.), a fixed display device (e.g., within a vehicle, computer monitor, a non-portable television, etc.), and/or any other display element, screen, and/or projection device which may present a visual output to a user.

An "interaction", as the term is used herein, refers to any activity including a user and an object where the object is a source of sensory data detected by the user and/or the user is a source of input for the object. An interaction, as indicated, may include the object as a target of input from the user. The input from the user may be provided intentionally or unintentionally by the user. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input of the portable electronic device exemplifies the device, as an input target, receiving input from the user. Note that the user in providing input is receiving sensory information from the portable electronic. An interaction may include an input from the user that is detected and/or otherwise sensed by the device. An interaction may include sensory information that is received by a user included in the interaction that is presented by an output device included in the interaction.

A computer program may include one or more software components. As used in the present disclosure, the term "software component" refers to any data representation that may be and/or may be translated into logic that may be stored in a memory and accessed by a processor to execute in an operating environment. A software component may optionally include associated data that does not represent logic executable by a processor, but may be accessed by via processor executing logic in a software component. Software component representations include machine code, object code, byte code, and source code. Object code includes a set of instructions and/or data elements that either are prepared to link prior to loading or are loaded into an operating environment. When in an operating environment, object code may include references resolved by a linker and/or may include one or more unresolved references. The context in which this term is used will make clear the state of the object code when it is relevant. A software component may include one or more software components. As used in the present disclosure, the terms "application", "service", and "library" may be realized in one or more software components accessible to a processor via a data storage medium and/or may be realized in one or more hardware components.

Software components include instructions executed by a processor. The instructions may be executed in a computing context referred to as a "computing process" or simply a "process". A process may include one or more "threads". A "thread" includes a one or more instructions executed by a processor in a computing sub-context of a process. The terms "thread" and "process" may be used interchangeably in the present disclosure when a process includes only one thread.

A "programming language" is defined for expressing data and operations in source code written by a programmer and/or generated automatically from an identified design pattern and/or from a design language, which may be a visual language including drawings. The source code may be translated to instructions and data that are valid for processing by operating environment. For example, a compiler, linker, and/or loader may be included in translating the source code in machine code that is valid for a type or processor in an operating environment. A programming language is defined and/or otherwise specified by an explicit and/or implicit schema that identifies one or more rules that specify whether source code is valid in terms of its form (e.g. syntax) and/or its content (e.g. vocabulary such a valid tokens, words, and/or symbols). A programming language defines the semantics or meaning of source code written in the programming language with respect to an operating environment in which a translation of the source code is executed. Source code written in a programming language may be translated into a "representation language". As used in the present disclosure, a "representation language" is defined and/or otherwise specified by an explicit and/or implicit schema that identifies at least one of a syntax and a vocabulary for a target translation of source code that maintains the functional semantics expressed in the source language translated. Note that some programming languages may serve as representation languages.

Exemplary types of programming languages for writing and/or otherwise expressing source code include array languages, object-oriented languages, aspect-oriented languages, assembler languages, command line interface languages, functional languages, list-based languages, procedural languages, reflective languages, scripting languages, and stack-based languages. Exemplary programming languages include C, C#, C++, FORTRAN, COBOL, LISP, FP, JAVA®, APL, PL/I, ADA, Smalltalk, Prolog, BASIC, ALGOL, ECMAScript, BASH, and various assembler languages. Exemplary types of representation languages include object code languages, byte code languages, machine code languages, programming languages, and various other translations of source code.

A "compiler", also referred to as a "translator", as used in the present disclosure is a component or an arrangement of components that includes logic that when executed translates source code written in a programming language or a translation of the source code into a target translation of the source code expressed according to a representation language. A translator may translate a first translation of source code into a second translation of source code. A translation received as input to a translator is referred to in the present disclosure as a "source translation" or an "input translation" and is said to be expressed in a "source language". A translation generated by a translator is referred to in the present disclosure as a "target translation" or an "output translation" and is said to be expressed in a "target language". The term "source code" as used in the present disclosure refers to computer code written in a programming language. For example, source code is often written by a programmer as an original work.

The terms "compiling" and "translating" are used interchangeably in the present disclosure. Both terms refer to the operation of a compiler or translator in translating source code and/or a translation of source code into a target translation. Linkers and loaders may operate as translators as the term "translator" is used in the present disclosure.

Some source code includes one or more macros written in a macro language. Macro languages are not programming languages and are thus preprocessed rather than "compiled" or "translated" as the terms are defined in the present disclosure.

Addressable entities may be written in and/or translated to a number of different programming languages and/or representation languages. An addressable entity may be specified in and/or translated into source code, object code, machine code, byte code, and/or any intermediate language for processing by an interpreter, compiler, linker, loader, or analogous tool.

As used in the present disclosure, the phrase "translated from" includes direct translations and indirect translations. That is, a second translation, which is generated from a first translation translated from particular source code, is translated from the particular source code as the phrase "translated from" is used in the present disclosure.

For a network protocol, the term "hop", as used herein, refers to a pair of consecutive nodes in a network path to transmit, via the network protocol, data sent from a source node to a destination node. A "hop path" is thus a sequence of hops in a network that respectively include a sequence of pairs of consecutive nodes included in transmitting data from a first path end node of the network path to a second path end node of the network path.

The term "path-based protocol address" as used herein refers to a protocol address for a network protocol that includes one or more path segment identifiers that identify one or more respective portions of a network path identified by the path-based protocol address. A "node-based protocol address" is a path-based protocol address that includes a plurality of node identifiers that identify a sequence of nodes in a network path. A "network-interface-based protocol address" is a path-based protocol address that includes a plurality of network interface identifiers that identify a sequence of network interfaces in a network path. A "NIC-based protocol address" is a type of network-interface-based protocol address that includes a plurality of identifiers that identify a sequence of network interface. A "hop-based protocol address" is a type path-based protocol address since a hop is a type of network path.

Given the above definitions, note that the terms "network path" and "hop" may be defined in terms of network interfaces. A "network path" and a "hop path" include a sequence of network interfaces in a network that are included in transmitting data between a pair of path end nodes in the network. A "hop" refers to at least part of a network path that includes a pair of consecutive network interfaces in a sequence of network interfaces in a network path. A "network path" is thus a sequence of hops in a network that respectively includes a sequence of pairs of consecutive network interfaces included in transmitting data from a first path end node of the network path to a second path end node of the network path.

As used in the present disclosure, an "addressable entity" is a portion of a software component that is specifiable in a programming language in source code. An addressable entity is addressable by a processor in a program component translated from the source code when loaded into a processor memory in a compatible operating environment. Examples of addressable entities include variables, constants, functions, subroutines, procedures, modules, methods, classes, objects, code blocks, and labeled instructions. A code block includes one or more instructions in a given scope specified in a programming language. An addressable entity may include a value. Addressable entities may be written in and/or translated to a number of different programming languages and/or representation languages. An addressable entity may be specified in and/or translated into source code, object code, machine code, byte code, and/or any intermediate language for processing by an interpreter, compiler, linker, loader, or analogous tool.

A "metric" defines a unit of measure. For example, an "inch" is a unit of measure for measuring length. A "kilowatt-hour" (kWh) is a unit of measurement in a metric for measuring an amount of energy. Instead of or in addition to measuring an amount a metric may measure a rate. "Kilowatts per hour" (kWh/h) is energy or power metric for measuring a rate of energy used. A "measure" is a result of a particular measuring or measurement process. For example, 3 inches is a measure according to the length metric for inches, and 100 kWh is a measure of an energy metric identifying an amount of energy. As used in the present disclosure, a "measure of a cost" refers to a result of a measuring process for determining the cost according to a specified metric. Measuring may include estimating a measurement.

As used herein, the term "network protocol" refers to a set of rules, conventions, and/or schemas that govern how nodes exchange information over a network. The set may define, for example, a convention and/or a data structure.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data packet", and "packet" are used interchangeably herein. One or more data units of a first network protocol may transmit a "message" of a second network protocol. For example, one or more data units of the IP protocol may include a TCP message. In another example, one or more TCP data units may transmit a HTTP message. A message may be empty.

How data is packaged in one or more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the network protocol. For example, "192.168.1.1" is an IP protocol address represented in a human readable format that may be represented in an address portion of a header of an IP packet (i.e. an IP data unit) to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address "192.168.1.1". An identifier may be both a symbolic identifier and a protocol address depending on its role with respect to its use for a particular network protocol.

Since a protocol endpoint is accessible by way of a network via a network interface in a node, a protocol address may be processed to identify a node and may be processed to identify a network interface of the node. A network interface may include one or more NICs operatively coupled to a network.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses, HTTP URLS, TCP port and IP address pairs, and the like.

As used herein, the term "user communication" refers to data exchanged via a network along with an identifier that identifies a user as a sender of the data and/or as a receiver of the data. The identifier is included in a data unit of a network protocol and/or in a message of an application protocol transported by a network protocol. The application protocol is referred to herein as a "user communications protocol". The sender is referred to herein as a "contactor". The receiver is referred to herein as a "contactee". The terms "contactor" and "contactee" identify roles of "communicants" in a user communication. The contactor and the contactee are each a "communicant" in the user communication. An identifier that identifies a communicant in a user communication is referred herein as a "communicant identifier". The terms "communicant identifier" and "communicant address" are used interchangeably herein. A communicant identifier that identifies a communicant in a user communication exchanged via a user communications protocol is said to be in an identifier space or an address space of the user communications protocol. The data in a user communication may include text data, audio data, image data, and/or a software hardware, code, and/or data component.

A user communications protocol defines one or more rules, conventions, and/or vocabularies for constructing, transmitting, receiving and/or otherwise processing a data unit of and/or a message transported by the user communications protocol. Exemplary user communications protocols include a simple mail transfer protocol (SMTP), a post office protocol (POP), an instant message (IM) protocol, a short message service (SMS) protocol, a multimedia message service (MMS) protocol, a Voice over IP (VOIP) protocol. Any network protocol that specifies a data unit and/or transports a message addressed with a communicant identifier is or may operate as a user communications protocol. In a user communication, data may be exchanged via one or more user communications protocols. Exemplary communicant identifiers include email addresses, phone numbers, multi-media communicant identifiers such as SKYPE® IDs, instant messaging identifiers, MMS identifiers, and SMS identifiers.

A user in the role of a communicant interacts with a "user communications agent client" to receive data addressed to the user in a user communication. Alternatively or additionally, a user in the role of a communicant interacts with a "user communications agent client" to send data addressed to another communicant in a user communication. The term "user communications agent" refers to logic which may be included in an application that when executed operates in an operating environment to receive, on behalf of a contactee, a communicant message address to the contactee by a communicant identifier in the user communication. The user communications agent interoperates with a user communications agent client to interact with the contactee communicant in presenting and/or otherwise delivering the communicant message. Alternative or additionally, a user communications agent operates in an operating environment to send, on behalf of a contactor, a communicant message in a user communication addressed to a contactee by a communicant identifier in the user communication. The sending user communications agent interoperates with a user via a user communications agent client. A user communications agent and/or a user communications agent client that when executed operates on behalf of a communicant in the role of a contactor and/or a contactee as described above is said, herein, to "represent" the communicant.

A "user communications request", as the term is user herein, refers to request sent by a user communications agent via a user communications protocol. A "user communications response", as the term is user herein, refers to any response corresponding to a user communications request. A user communications response may be transmitted via the same user communications protocol as its corresponding user communications request, a different user communications protocol, a web protocol, and/or via any other suitable network protocol. A "user communications service", as the term is used herein, refers to a recipient of a user communications request that is included in performing the request. Performing the request may include sending a service request based on the user communications request to a service application included in performing the request. A user communications service and/or a service application included in performing a user communications request may generate a user communications response to the request.

A "web protocol", as the term is used herein, refers to any version of a hypertext transfer protocol (HTTP) and/or any version of a HTTP secure (HTTPS) protocol. A "web request", as the term is used herein, refers to a request initiated by a user agent. A "web service", as the term is used herein, refers to a recipient of a web request. A web service generates a response to the request. A "web response", as the term is used herein, refers to any response that corresponds to a web request. A web response may be transmitted via the same web protocol as its corresponding web request, a different web protocol, via a user communications protocol, and/or via any other suitable network protocol. A web request is a type of service request.

A "service provider", as the term is used herein, refers to any entity that owns, maintains, and/or otherwise provides a service application such as web service, user communications service, and/or other network accessible application. The term "service provider system" is used interchangeably with services and facilities that host a web service and/or other application of a service provider. For example, a service provider system may include a server farm, a content delivery network, a database, a firewall, etc.

The HTTP protocol is specified in "Request for Comments" (RFC) document RFC 2616 by R. Fielding, et al., titled "Hypertext Transfer Protocol—HTTP/1.1" (June 1999). Terms from RFC 2616 are defined below as used herein and are used in describing the subject matter in this document.

An "HTTP request", as used herein, is defined in section 5 of RFC 2616 along with adaptations and/or extensions described below. An "HTTP response" as used herein is defined in section 6 of RFC 2616 along with adaptations and/or extensions described below. A "resource" is a data object or service that can be identified by a universal resource identifier (URI). Accessing a resource may include accessing a data entity, a hardware component, a software component, and/or a service. A service request is a request to a service application to get, create, modify, delete, move, invoke, and/or otherwise process a resource identified by the service request. An "HTTP entity" is information transferred as the payload of an HTTP request or an HTTP response. The term "HTTP entity", as used herein, is defined as the term entity is defined in the RFC 2616. An HTTP entity includes meta-information in the form of entity-header fields and content in the form of an entity-body. An "HTTP representation" is an HTTP entity that is subject to content negotiation. The term "HTTP representation", as used herein, is defined as the term "representation" is used and defined in RFC 2616.

The terms "user agent" and "service application" refer to roles played by one or more components and/or devices operating in an operating environment, and/or systems in a communication. A "user agent" initiates and/or sends a command, such as HTTP request. A "service application" accepts a command identified in a request in order to process the command. Processing a command includes performing and/or otherwise providing for performing an operation based on the command. The performing of the command may be successful or unsuccessful. As defined and described herein a server node may send information in a response, such as an HTTP response, to a user agent in response to receiving a command from the user agent in a request. A service application may also send a message via an asynchronous protocol or a portion of protocol that allows an asynchronous exchange via a network. Examples of applications that may include and/or may otherwise interoperate with a user agent include web browsers, HTML editors, spiders (web-traversing robots), or other end user tools. Note also that a protocol service, such an HTTP protocol service, is a user agent as the term is defined herein. While the present disclosure focuses the use of HTTP by user agents and server nodes and in some cases user agent clients (defined below), those skilled in the art will understand based on the descriptions and drawings provided in the present disclosure that the methods described herein may be adapted to utilize other network protocols and/or other application s protocols instead of or in addition to HTTP and the logic in the systems described herein and their variants may be modified to operate to perform the adapted methods.

A "user agent client", as the term is used herein, refers to logic included in a user agent and/or that otherwise interoperates with a user agent to transform data received via a user agent into presentation information if the data is not suitable presentation information already and includes logic to send the presentation information to present output, based on the received data, via an output device as output for a user. For example, a user agent may provide data received in an HTTP message to a user agent client. The data received in the HTTP message may include markup language data such as HMTL, image data, video data, audio data, streaming data, script data, and the like. The user agent client includes logic to send the data and/or a transformation of the data to present output, such as a web page, via an output device. Web browsers such as Mozilla® Firefox, Microsoft® Internet Explorer, and Google® Chrome may include both a user agent as defined above and a user agent client as defined above.

The term "schema", as used herein refers one or more rules that define and/or otherwise identify a type of resource. The one or more rules may be applied to determine whether a resource is a valid resource of the type defined by the schema. Schemas may be defined in various languages, grammars, and/or formal notations. For example, an XML schema is a type of XML document. The XML schema identifies documents of that conform to the one or more rules of the XML schema. For instance, a schema for HTML defines and/or otherwise identifies whether a given document is a valid HTML document. A rule may be expressed in terms of constraints on the structure (i.e. the format) and content (i.e. the vocabulary) of documents of the type defined by the schema. Exemplary languages for specifying schemas include the World Wide Web Consortium (W3C) XML Schema language, Data Type Definitions (DTDs), RELAX NG, Schematron, the Namespace Routing Language (NRL), MIME types, and the like.

XML schema languages define transformations to apply to a class of documents. XML schemas may be thought of as transformations. These transformations take documents as input and produce a validation report, which includes at least a return code reporting whether the document is valid and an optional Post Schema Validation Infoset (PSVI), updating the original document's infoset (the information obtained from the XML document by the parser) with additional information (default values, data types, etc.). A general purpose transformation languages is thus a schema language. Thus, languages for building programming language compilers are schema languages and a programming language specifies a schema. A grammar includes a set of rules for transforming strings. As such, a grammar specifies a schema. Grammars include context-free grammars, regular grammars, recursive grammars, and the like. For context-free grammars, Backus Normal Form (BNF) is a schema language.

With respect to data and a schema for validating the data, a "data element" as the terms is used herein refers at least a portion of the data that is identifiable by a parser processing the data according to the schema. A document or resource conforming to a particular schema is said to be "valid", and the process of checking that conformance is called validation.

The term "criterion" as used herein refers to any information accessible to logic in an operating environment for determining, identifying, and/or selecting one option over another via the execution of the logic. A criterion may be information stored in a location in a memory and/or may be a detectable event. The information may be included in an addressable entity such as a variable, an executable instruction, a constant, a record, structured data, a time, a date, a field in a data unit or a message of a network protocol, a payload portion or a portion thereof of a data unit and/or a message, an interprocess communication mechanism, a signal carried via a data transmission medium, and the like.

A criterion may include, for example, an identifier of a user agent and/or an identifier of a user agent client. An identifier may identify a user agent and/or a user agent client directly. For example, a path in file system may identify a user agent client by identifying a file that is loaded and/or loadable into memory as machine code to initiate operation of logic in the file. The path identifier may identify a program that includes a user agent client and/or otherwise is included in creating an instance of the user agent client in a computing process of an operating environment. An identifier may identify a user agent and/or a user agent client indirectly. For example, a MIME type of a resource to be processed to present via an output device may be processed to identify a user agent client. The resource may have a MIME type that one user agent client is cable of processing to present output and that another user agent client is unable to process to present output. A criterion may include information that is processed in determining and/or selecting a user agent and/or a user agent client. A criterion may identify a measure and/or may be included in determining a measure such a measure of performance. Further details are provided below.

EMBODIMENTS

FIG. 1A illustrates a network architecture 108, in accordance with one possible embodiment. As shown, at least one network 110 is provided. In the context of the present network architecture 108, the network 110 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 110 may be provided.

Coupled to the network 110 is a plurality of devices. For example, a server node 112 and an end user computer 114 may be coupled to the network 110 for communication purposes. Such end user computer 114 which may operate as a client node 114 with respect to a server node 112. An end user computer 114 may include a desktop computer, lap-top computer, a tablet computer, a personal digital assistant (PDA) device, a mobile phone device, a television 112, and/or a smart appliance (e.g. a heating system, refrigerator, etc.)—to name a few examples.

Figure 1B:
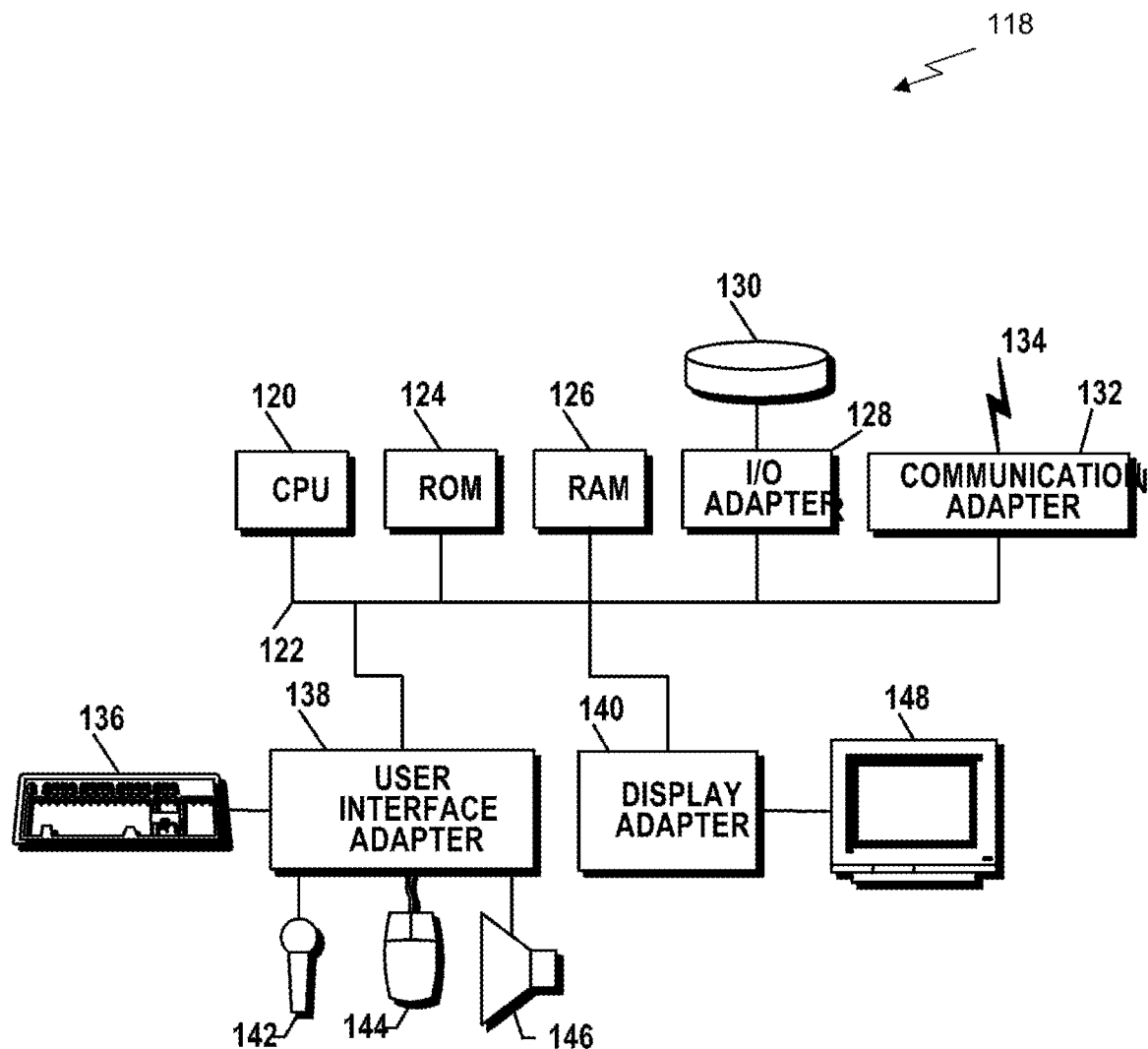
FIG. 1B illustrates an exemplary system, in accordance with an embodiment.

FIG. 1B illustrates an exemplary system 118, in accordance with an embodiment. As an option, the system 118 may be implemented in the context of any of the devices of the network architecture 108 in FIG. 1A. Of course, the system 118 may be implemented in any operating environment. FIG. 1B includes a typical hardware configuration of a workstation, server, desktop computer, notebook computer, tablet computer, handheld computer, and the like in accordance with an embodiment having a central processing unit 120 and/or processor as defined above, such as a microprocessor, and a number of other units interconnected via a system bus 122. The workstation shown in FIG. 1B includes a Random Access Memory (RAM) 126, Read Only Memory (ROM) 124, an I/O adapter 128 for connecting peripheral devices such as disk storage units 130 to the bus 122, a user interface adapter 138 for connecting a keyboard 136, a mouse 144, a speaker 146, a microphone 142, and/or other user interface devices such as a touch screen (not shown) to the bus 122, network adapter 132 for connecting the workstation to a network 134 (e.g., a data processing network) and a display adapter 140 for connecting the bus 122 to a display device 148. The workstation may have resident thereon any desired operating system.

It will be appreciated that an embodiment may also be implemented on platforms and operating systems other than those mentioned. An embodiment may be implemented using the JAVA, C, and/or the C++ programming languages, or other programming languages, along with an object oriented programming methodology. Object oriented programming (OOP) has become increasingly used to develop complex applications. Of course, the various embodiments set forth herein may be implemented utilizing hardware, software, or any desired combination thereof. For that matter, any type of logic may be utilized which is capable of implementing the functionality set forth herein.

Figure 2:
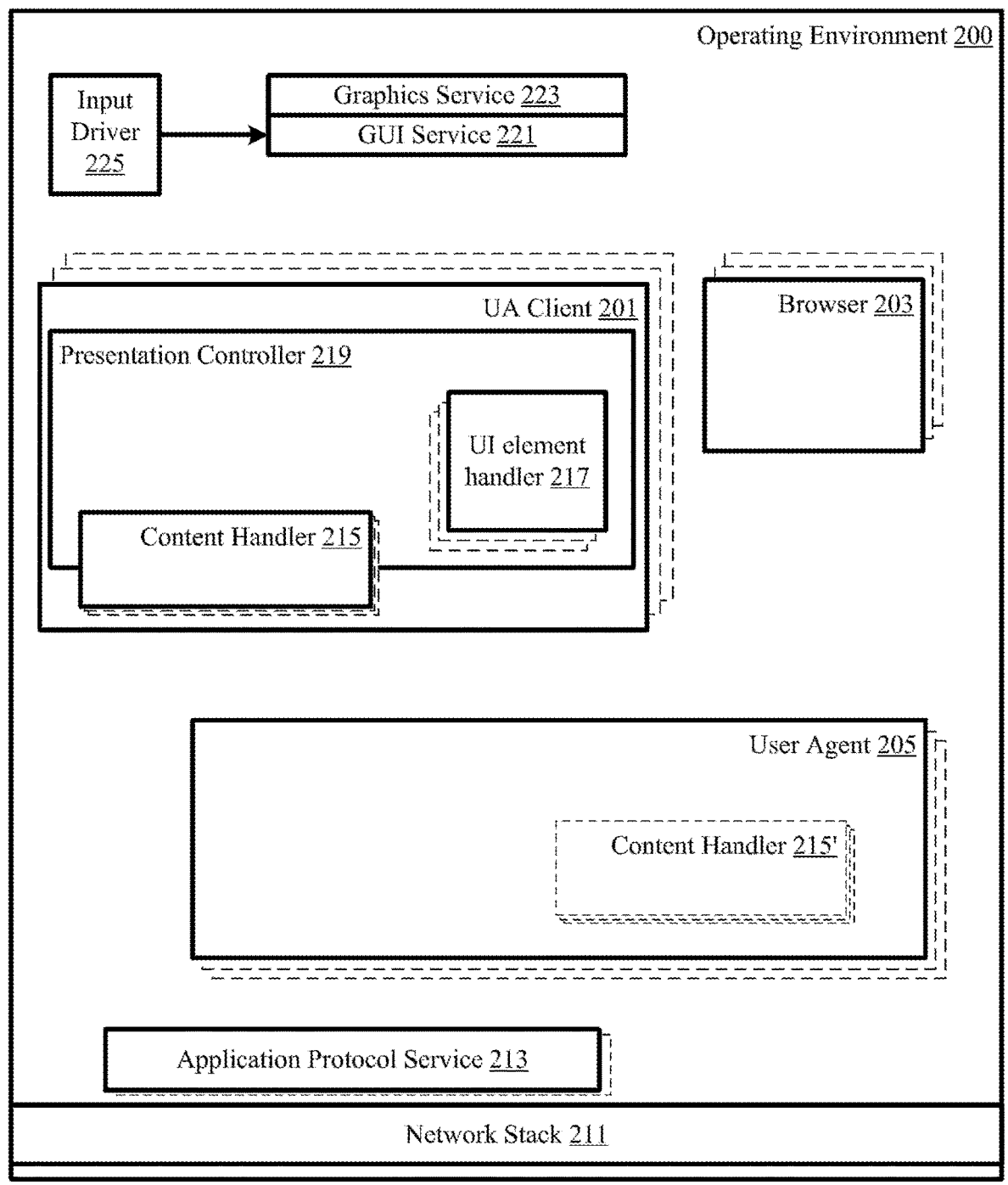
FIG. 2 shows a block diagram illustrating an operating environment that may include logic for performing one or more of the methods described herein.

FIG. 2 shows a block diagram illustrating an operating environment 200 that may include logic for performing one or more of the methods described herein. As an option the operating environment 200 may be implemented in the context of the details of any of the foregoing figures. Of course, however, the logic for performing the methods described herein may be in implemented in various embodiments in any suitable operating environment. Further, the aforementioned definitions may equally apply to the description below.

As shown in FIG. 2, the operating environment 200 hosts a plurality of web browsers 203 which may each include a user agent 201 and a user agent client 205 to perform one or more methods describe herein. As also shown in FIG. 2, the operating environment 200 includes multiple user agent clients 201, each of the multiple user agent clients 201 operating externally from a corresponding browser 203 as well as from an external user agent 205. The user agent clients 201 may each include an arrangement of components for performing one or more of the methods described herein. FIG. 2 further illustrates a user agent 205 that may interoperate with multiple user agent clients 201 including a user agent client 201 in one or more browser 203. The user agent 205 may include an arrangement of components for performing one or more of the methods described herein.

Figure 3:
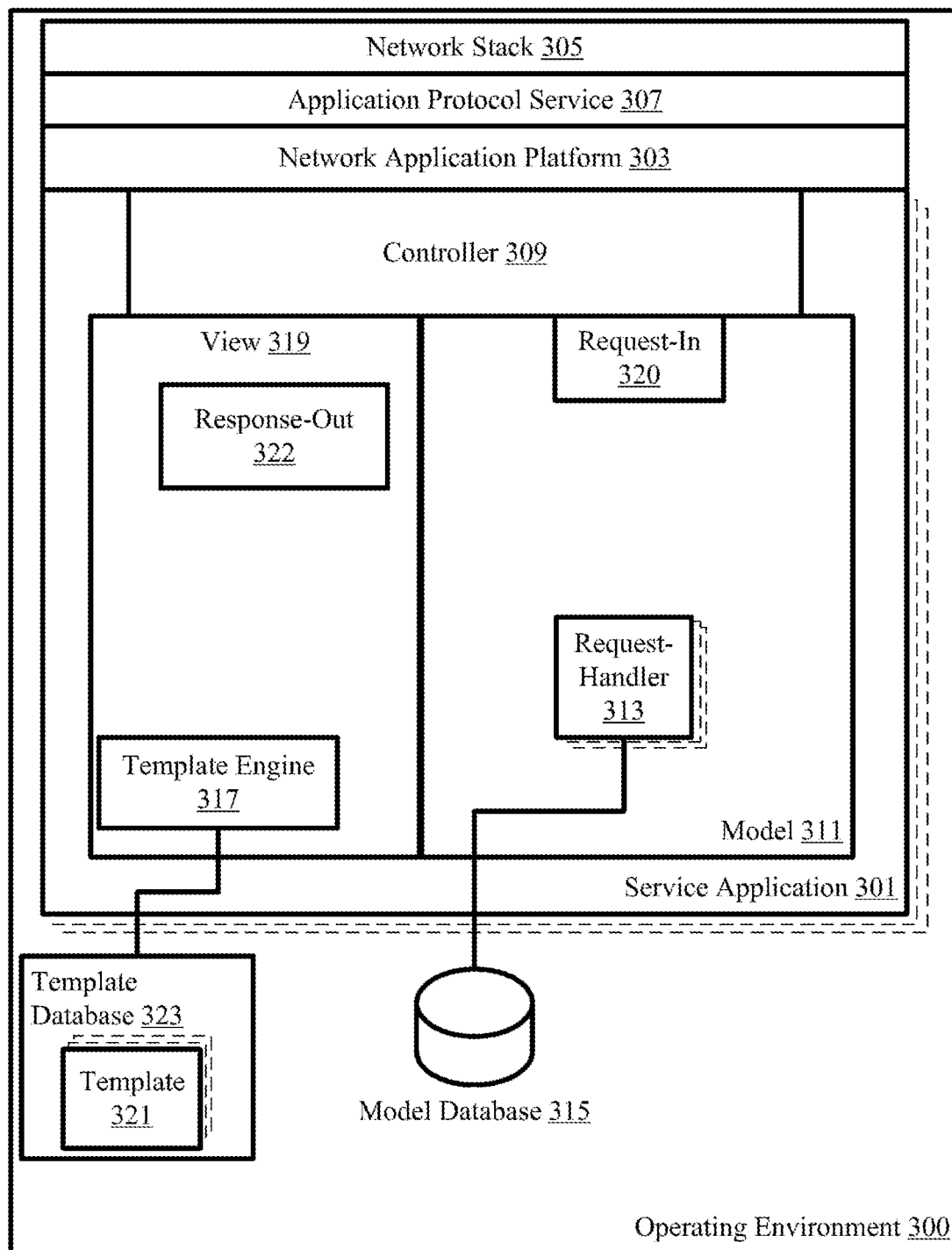
FIG. 3 shows a block diagram illustrating an operating environment that includes logic, in accordance with an embodiment.

FIG. 3 shows a block diagram illustrating an operating environment 300 that may include logic for performing one or more of the methods described herein. As an option the operating environment 300 may be implemented in the context of the details of any of the foregoing figures. Of course, however, the logic for performing the methods described herein may be in implemented in various embodiments in any suitable operating environment. Further, the aforementioned definitions may equally apply to the description below As shown in FIG. 3, an operating environment 300 may be configured to host one or more service applications 301, such as a web service. The operating environment 300 also includes a network application platform 303 that may provide services to one or more service applications 301. Each of the service applications 301 may include yet another arrangement of components for performing one or more of the methods described herein.

It will be appreciated that the various arrangements of components, logic, their adaptations, and analogs described herein are not exhaustive. For example, those skilled in the art will see, based on the description herein, that arrangements of components for performing the methods described herein may be at least partially included in an application and at least partially external to the application. Further, arrangements for performing the methods described herein may be distributed across more than one node and/or operating environment. For example, such an arrangement may operate at least partially in a browser 203 in operating environment 200 and at least partially in operating environment 300 in and/or external to service application 301. Further logic to perform the methods described herein and/or portions thereof may be written in any number of programming languages and a developer expressing any of the various embodiments has a range of design choices available to adapt an embodiment to a particular operating system, business requirement, and/or personal preference as those skilled in the art will understand based on the descriptions provided herein.

FIGS. 2 and 3 illustrate adaptations of respective network stacks 211 and 311 that operate to send and receive messages over a network, such as a network 110, via a network interface component, such as a network adapter, modem, and/or a line card. A network application platform 303 in FIG. 3 may provide services to one or more service applications 301. In various aspects, a network application platform 303 may include and/or interoperate with a web server. FIG. 3 also illustrates that a network application platform 303 may interoperate with a network stack 305. Network stacks in various nodes may support the same protocol suite, such as TCP/IP, or may exchange data via a network gateway and/or other protocol translation device and/or service. For example, a browser 203 in FIG. 2 and a network application platform 303 in FIG. 3 may interoperate via their respective network stacks; i.e., network stack 211 and network stack 305, respectively.

Software components and/or other components including logic operating in operating environments 200 and 300, respectively, may exchange data via one or more application layer protocols. As shown in FIGS. 2 and 3, the application protocol services 213 and 307 for exchanging data via one or more application layer protocols. Exemplary application layer protocols include hypertext transfer protocol (HTTP) and instant messaging and presence (XMPP-IM) protocol. Matching protocols in operating environments communicating via a network 110 is not required if data is exchanged is via a protocol gateway or other protocol translator.

In FIG. 2, browsers 203, user agent clients 201, and/or user agents 205 may receive some or all of a web page in one or more messages sent from a service application 301 via a network application platform 303, a network stack, a network interface component, and optionally an application protocol service. As shown in FIG. 2, a browser 203 may include a user agent component 205. A user agent component 205 may interoperate with one or more of application protocol services 213 and/or network stacks 211 to receive a message or messages from a service application 301 including, for example, a web page, an image, and the like.

Data received from a service application 301 by a browser 203 may include a web page for presenting some or all of a user interface for the service application 301. The web page may include and/or reference data represented in one or more formats including HTML and/or other markup language, ECMAScript or other scripting language, byte code, image data, audio data, and/or machine code.

In an example, in response to a request received from a browser 203 operating in a client node 114, a controller component 309, operating in an operating environment 300 of a server node 112, may invoke a model service 311 to perform request-specific processing. A model service 311 may include any number of request handlers 313 for dynamically generating data and/or retrieving data from, for example, a model database 315 based on the request. A controller component 309 may further invoke a template engine component 317 in a view service 319 to identify one or more templates and/or static data elements for generating a user interface for representing a response to the received request. As shown in FIG. 3, the operating environment 300 may include one or more templates 321 in a template database 323. The template engine 317 may operate to generate data to provide to a response-out component 325 that operates to send the data in a format suitable for a user agent such as a browser 203, for example. The view service 319 may provide the presentation information to the controller component 309 to send to the browser 203 in response to the request received from the browser 203. Some or all of a service application agent may be sent to the browser 203 via network application platform 303 as described above.

While the example describes sending data, such as a web page, in response to a request, a service application 301 additionally or alternatively may send data to a browser 203, a user agent client 201, and/or a user agent 205 via one or more asynchronous messages. In an aspect, an asynchronous message may be sent in response to a change detected by service application 301. Publish-subscribe protocols, such as the presence protocol specified by XMPP-IM, are exemplary protocols for sending messages asynchronously.

The one or more messages including information representing some or all of a web page or user interface of a service application may be received by a user agent 205 via one or more of application protocol service(s) 213 and a network stack 211 as described above. A browser 203 may include one or more content handler components 215 in a user agent client 201, in a user agent 205, and/or in a service application agent of a service application to process received data according to its data type, typically identified by a MIME-type identifier. Exemplary content handler components include a text/html content handler component for processing HTML documents; an application/xmpp-xml content handler component for processing XMPP streams including presence tuples, instant messages, and publish-subscribe data as defined by various XMPP specifications; one or more video content handler components for processing video streams of various types; and still image data content handler components for processing various images types. Content handler components may process received data and may provide a representation of the processed data to one or more user interface (user interface) element handler components, as illustrated by user interface element handler components 217 in FIG. 2.

As shown in FIG. 2, the user interface element handler components 217 may be included in a presentation controller component 219 included in the user agent client 201. A presentation controller component 219 in a user agent client 201 in an operating environment 200 as illustrated in FIG. 2 and/or their analogs may manage the visual, audio, and/or other types of output for the corresponding user agent client 201 as well as receive and route detected user and other inputs to components and extensions of the corresponding user agent client 201. In various aspects, a user interface element handler component 217 may be adapted to operate at least partially in a content handler component such as a text/html content handler component and/or a script content handler component. Additionally or alternatively, a user interface element handler component 217 in an operating environment 200 may operate in and/or as an extension of the corresponding user agent client 201 or a corresponding user agent 205. For example, a plug-in may provide a virtual machine, for a user interface element handler component 217 received as a script and/or byte code, that may operate as an extension in a user agent client 201 and/or external to and interoperating with a user agent client 201. The interoperating may be via a user agent 205.

A user agent client 201 may present output to a user via one or more presentation spaces associated with one or more output devices, such as an LCD display or the like. In some aspects, a user interface element may provide one or more presentation spaces for presenting a user interface of multiple interoperating applications and/or for presenting user interfaces of respective applications. For example, a user interface element may be presented via interoperation of a user agent client 201, a user agent 205, and a service application 301. A user agent client 201 and a user agent 205 may operate in a client node 114, and a service application 301 may operate in a server node 112. Data may be provided to the client node 114 by the server node 112 via network(s) 110, as described above.

Various user interface elements presented by a user agent client 201 may be presented by one or more user interface element handler components 217 operating in an operating environment 200 implemented in one or more client nodes 114 and/or by one or more template engines 317 in an operating environment 300 implemented in one or more server nodes 112. In an aspect, user interface element handler component(s) 217 of one or more user agent client(s) 201 may operate to send presentation information representing a visual interface element to a GUI service 221. A GUI service 221 may instruct a corresponding graphics service 223 to draw the visual interface element in a region of a presentation space of a display device, based on presentation information received from a corresponding user interface element handler component 217.

Input corresponding to a user interface element may be received via an input driver 225, as shown in FIG. 2 in various adaptations. For example, a user may move a mouse to move a pointer presented on the display and corresponding to a location in a presentation space over a user interface element representing an operation in a tool bar. A user may provide an input detected by the mouse. The detected input may be received by the GUI service 221 via an input driver 225 as an operation or command indicator based on the association of the shared location of the pointer and the user interface element representing the operation in the display presentation space.

Figure 4:
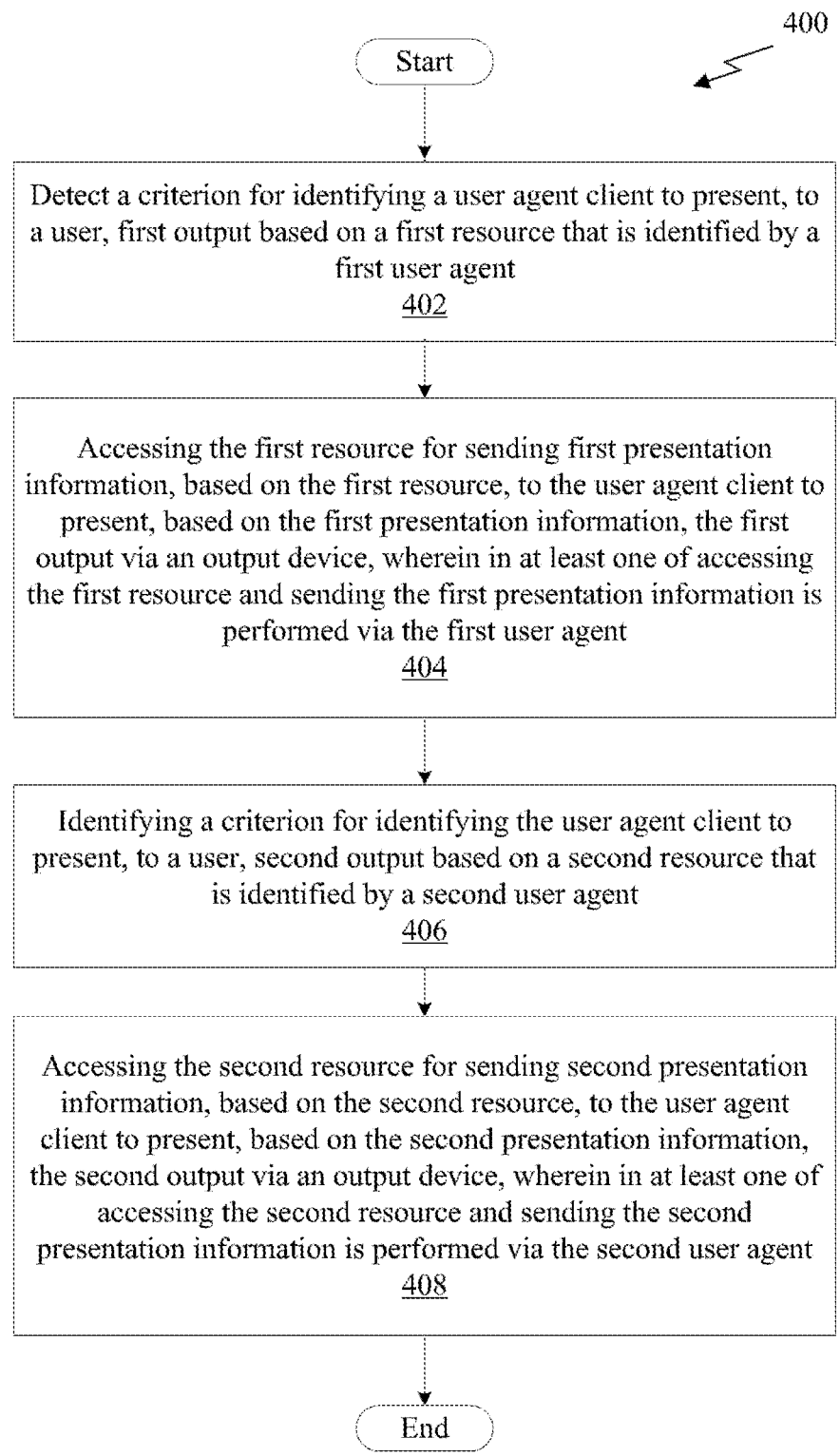
FIG. 4 shows a flow chart of a method in accordance with an embodiment of the subject matter described herein.

FIG. 4 shows a flow chart of a method 400 in accordance with an embodiment. As an option, the method 400 may be implemented in the context of the details of any of the foregoing figures. As shown in FIG. 4 at block 402, a criterion is detected to identify a user agent client to present, to a user, first output based on a first resource that is identified and/or otherwise detected by a first user agent. At block 404, the first resource is accessed to send first presentation information, based on the first resource, to the user agent client to present, based on the first presentation information, the first output via an output device, wherein at least one of accessing the first resource and sending the first presentation information is performed via the first user agent. At block 406, a criterion is identified to identify the user agent client to present, to a user, second output based on a second resource that is identified by a second user agent, is detected. At block 408, the second resource is accessed to send second presentation information, based on the second resource, to the user agent client to present, based on the second presentation information, the second output via an output device, wherein at least one of accessing the second resource and sending the second presentation information is performed via the second user agent.

Figure 5:
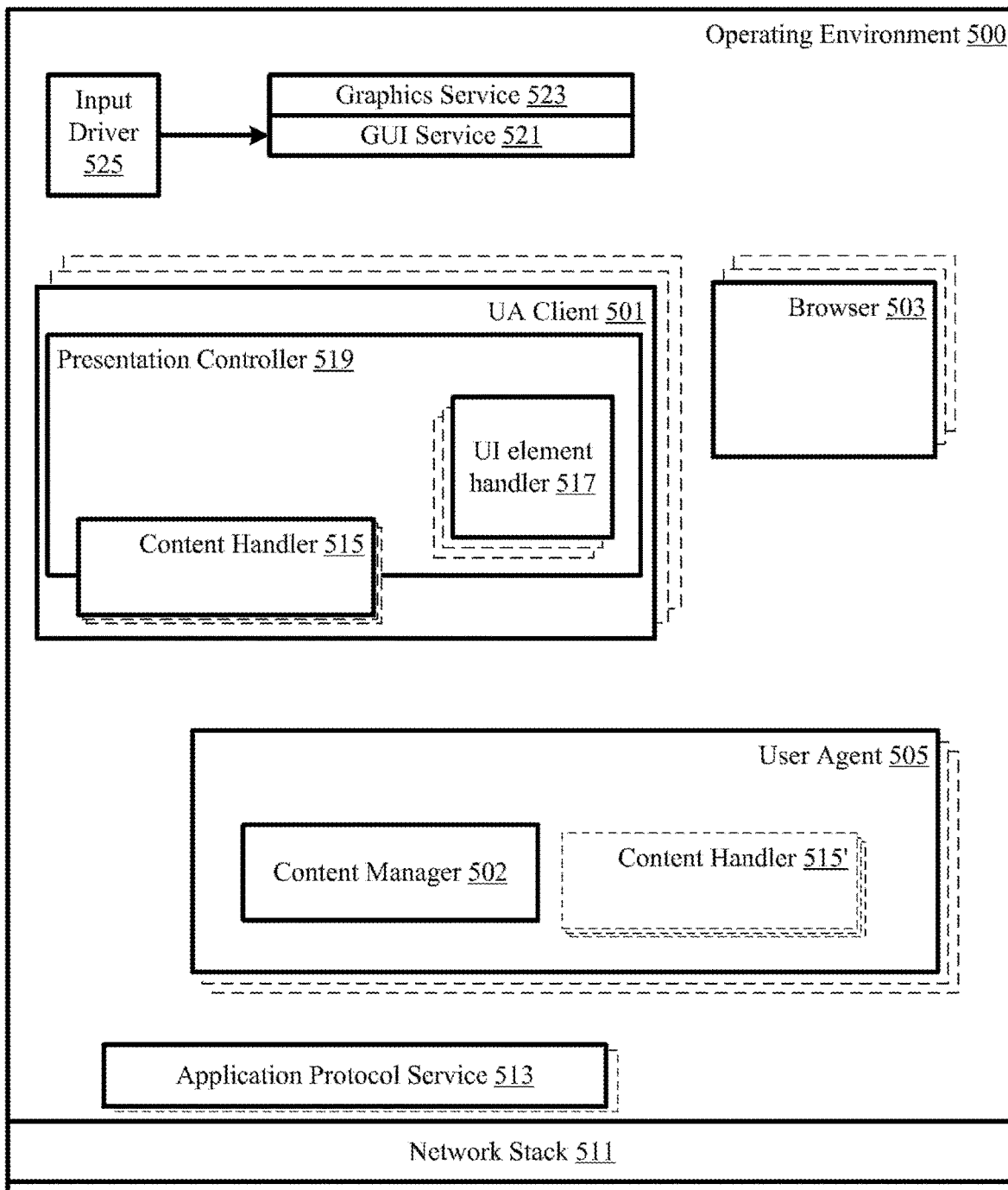
FIG. 5 shows a block diagram illustrating an arrangement of components that may include logic for performing one or more of the methods described herein.
Figure 6:
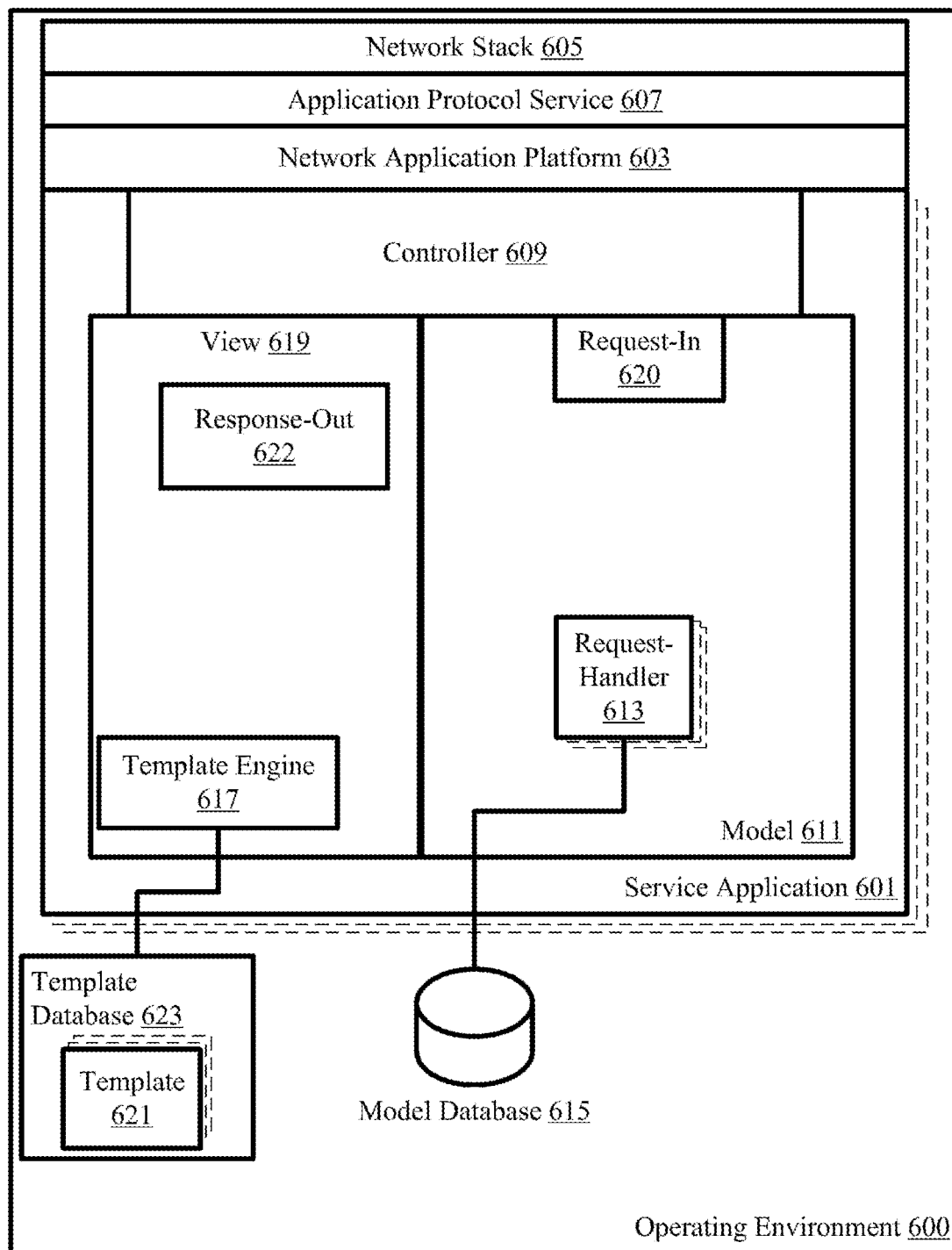
FIG. 6 shows a block diagram illustrating an arrangement of components that may include logic for performing one or more of the methods described herein.

An operating environment suitable for including logic that when executed operates to perform the method 400 may be implemented in and/or otherwise may include one or more client nodes 114 and/or server nodes 112 in FIG. 1A. FIGS. 5 and 6 illustrate operating environments that separately and/or together may include an arrangement of components including logic for performing the method 400 illustrated in FIG. 4, in accordance with an embodiment. FIG. 5 illustrates an operating environment 500 modified from an operating environment 200 to include an arrangement of components including logic for performing the method 400. FIG. 6 illustrates an operating environment 600 modified from an operating environment 300 to include an arrangement of components including logic for performing the method 400. Of course, however, logic for performing the method 400 may be implemented in various embodiments in any suitable operating environment. Further, the aforementioned definitions may equally apply to the description below.

An operating environment 500 may include logic to perform the method 400 in, for example, a user agent client 501, a user agent 505, and/or in an application protocol service 513. An operating environment 600 may include logic to perform the method 400 in, for example, a service application 601, a network application platform 603, and/or in an application protocol service 607. Logic to perform block 402 and/or block 406 may be included in a content handler component 515 in a user agent client 501, in a user agent 505, and/or in a browser 503. A content handler component may identify a criterion based on a schema for a particular content type. For example, a criterion may be specified in a schema for a markup language, such as HTML, in schema for image data such as metadata in a JPEG image, in a schema for source code and/or a translation of source code written in a programming language such as ECMAScript, and/or in schemas defining other valid resources. Logic to perform block 402 and/or block 406 may be included in logic for creating, modifying, sending, receiving, and/or otherwise processing an HTTP message or analogous logic for another application protocol. For example, an HTTP protocol service 513 and/or user agent 505 may detect a criterion in a header of an HTTP message, a request line, a status code, and the like. Logic to perform block 402 and/or block 406 may be included in logic for creating, modifying, sending, receiving, and/or otherwise processing MIME resource by a user agent 505 and/or a user agent client 501. For example, a content manager component 502, shown in a user agent 505, may detect parts of the multi-part MIME resource to route to suitable content handlers 515. The content manager 502 may include logic to detect a criterion in header in a part of the multi-part resource and/or in the content or resource of a specified MIME type. A criterion may be detected by logic in an application protocol service and/or a user agent in a message received from a service application. A criterion may be detected in a resource received in a message by a content manager 502, a user agent 505, and/or user agent client 501, for example, A criterion may be detected by logic in a user interface element handler 517, a presentation controller 519, a graphic service 521, and/or a content handler 515 while processing a received resource to present output via and output device and/or while output is presented. A criterion may be detected during presentation of output by a user agent client 501, for example. A user interaction detected by a user interface element handler 517 in a presentation controller 519 may identify a user interface element included in the interaction. The user interface element may include and/or may otherwise identify, a resource, such as markup element, that the user interface element is based on may include a criterion that is detected in response to the interaction. A criterion may be detected by a user agent client 501 in initiating a request to access a resource. A criterion may be detected by a user agent 503 invoked by the user agent client to build, modify, and/or send a request to a service application 601 to access resource. A criterion may be detected by an application protocol service 513 included in sending the request. A criterion may be detected by an application protocol service 607 included in receiving the request, by a network application platform 603 included in routing the request to a service application 601. A criterion may be detected by a controller 609 and/or logic in a model service 611 included in processing the request to access, generate, and/or modify resource provided to a view service 619. A criterion may be detected by a view service in generating, modifying, and/or otherwise processing a resource based on the resource from the model service 611. A criterion may be detected by the view service 619, the controller 609, the network application platform 603, and/or an application protocol service 607 included in generating, modifying, sending, and/or otherwise processing a response that includes the resource addressed to the sender of the request.

Logic to perform block 404 and/or block 408 may be included in a user agent client 501 that accesses a resource by interoperating with a user agent 505 to send a request for the resource, by the user agent 505 that interoperates with an application protocol service 513 to send the request to a service application 601, by the service application that returns the resource in a response, by a user agent 505 that receives the resource returned in the response, and by a user agent client 501 that may receive a receive the resource, a translation of the resource, a transformation of the resource, and/or other representation of the resource.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In FIG. 5, logic for performing the method 400 may be implemented in and/or may be otherwise accessible to a user agent 505 and/or a user agent client 501. A user agent 505 and user agent client 501 may be included in a same browser 503 or other type of application. Alternatively or additionally, a user agent 505 and user agent client 501 may interoperate and may be respectively included in separate browsers 501 and/or other types of application.

The method 400 may be performed by a user agent 505 and/or a user agent client 501 of a client node 114 of an operating environment 500 illustrated including logic in components, as described, illustrated in FIG. 5. With respect to FIG. 5, a first user agent 505 and/or a user agent client 501 may include logic that when executed operates to perform the method 400. Listing 1 below illustrates pseudo-code from which source code may be written that is translatable to logic that may be included and/or accessible to a user agent implemented to perform the method 400.

Listing 1—User Agent
1. handleResponse(resource) {
2. pInfo=prepare(resource);
3. uaInfo=getUAInfo( );
4. userAgentClient=identifyUAC(uaInfo);
5. userAgentClient.present(pinfo);
6.}

A first resource may be identified by a first URL. The first resource may be included in a message, such as HTTP response, received by a client node 114 from a server node 112 via a network 110. Logic that when executed operates in performing block 402 may be included a content manager 502 in the first user agent 505 and/or otherwise may be included to interoperate with the first user agent 505. The content manager 502 component may receive the first resource from logic in an HTTP protocol layer 513 that processes the message received by the client node 114 via a network interface. Content manager 505 may include logic that invokes a handleResponse( ) method, function, or other code block. See line 1 in listing 1. In line 2, a prepare( ) code block is invoked to translate, transform, and/or otherwise generate presentation information to provide to a user agent client 501. A content handler 515 may include and/or may otherwise be invoked by logic generated from source code for the prepare( ) code block and/or an analog. For example, HTML markup in a resource may be provided to an HTML content handler component 515 for validation. Validating the markup may include creating a document object model (DOM), known to those skilled in the art. Access to the presentation information may be provided by a pointer or other reference, identified as pinfo in listing 1. According to listing 1. User agent information is accessible to handleResponse( ) logic via invocation of a getUAInfo( ) code block. See line 3. getUAInfo( ) may be generated from source code that accesses a memory location, such as in a file, a database, and/or a data structure accessible to a computing process in which the first user agent operates. In an option, logic for getUAInfo( ) may be included in a code library accessible to one or more user agents 505, user agent clients 501, browsers 503, and/or other software components in operating environment 500. Line 4 illustrates an invocation to logic that determines, selects, and/or otherwise identifies a user agent client 501 to invoke providing access to the prepared presentation information based on the resource received. A user agent client may be identified based on a policy encoded in a code block, such as an identifyUAC( ) code block, may be identified based on an identifier, association, condition, and/or policy configured by a user of operating environment 500 and/or configured by some other user. In line 5 the user agent client 501 identified by execution of line 4 is invoked. The user agent client 501 is provided access to presentation information via the pinfo reference.

Listing 2 below illustrates alternative or additional pseudo-code from which source code may be written that is translatable to logic that may be included and/or accessible to a user agent implemented to perform the method 400. Listing 2 illustrates that logic may be generated from source code written to detect, determine, and/or otherwise identify one or more criteria in a message received by a user agent 505. Logic that processes a message, such as an HTTP response, may identify one or more criteria in an HTTP header and/or in body of the HTTP response message. See line 3.

Listing 2—User Agent
1. handleResponse(response) {
2. pInfo=response.prepare(resource);
3. uaInfo=response.getUAInfo( );
4. userAgentClient=identifyUAC(uaInfo);
5. userAgentClient.present(pinfo);
6.}

The logic generated from pseudo-code such as in listing 1 and/or in listing 2 may be included in an HTTP protocol layer component 513 which may interoperate with a user agent 505 via invoking a content manager 502 and/or a content handler 515. For example, logic for a prepare( ) code block may be included in a content handler. The HTTP protocol layer 513 may access one or more criteria in an received message and/or otherwise accessible via operating environment 500 to determine, select, and/or otherwise identify a user agent 505 to invoke in processing some or all of a resource included in received message. A web page may include multiple resources from one or more service applications. One or more application protocol services 513 may invoke one or more user agents and/or may identify one or more user agent clients to process the respective multiple resources received for the web page. That is, part of web page may be processed by a first user agent and part may be processed by a second user agent. For example, operating environment 500 may include a criterion that identifies a first user agent for processing one or more resources from a first service application (e.g. a first web site) and may identify a second user agent to process one or more resource providers form service applications identified as data collection and/or advertising services. Different user agent clients may be identified analogously based on the same and/or a different criterion.

In yet another variation, a resource and a criterion may be detected by an HTTP protocol layer 513 to pass to a user agent 505. The HTTP protocol layer may invoke, directly and/or indirectly, logic which may vary from that described above. A resource from a body of a received message, such as an HTTP response, and one or more criteria detected in the HTTP response may be made accessible to invoked logic. The first resource may include a web page, markup written in a markup language, instructions such as in a script, image data, audio data, and/or any other resource identified by the first URL directly and/or indirectly. Logic may be included, for example in a content manager 502, to parse the resource according one or more content types of data included in the resource. Based on the content types one or more content handlers 515 may be invoke to prepare respective portions of the resource to provide to a user agent client 501. Optionally, logic may be invoked that retrieves, generates, determines, and/or otherwise identifies one or more criteria in addition to one or more criteria provided as input. Logic that selects and/or identifies a user agent client based on the one or more criteria may be invoked. In an option, if a user agent client is identified that is not accessible to the operating environment 500, the first output may not be presented. In another aspect, a user agent client 501 may be invoked to display some of the resource deemed to be suitable for the user agent client 501, or all the resource may be provided to allow the user agent client 501 to present output on a best effort basis or to process in some other manner, per the logic of the user agent client 501. In another aspect, the first resource may not be provided to a user agent client. For example, a user agent 505 may operate to discard a resource or portion of the resource, present a message via an output device notifying a user, and/or to operate to perform some other action per the logic of the user agent 505, its hosting operating environment 500, and/or per configuration data accessible to the hosting operating environment 500. A resource received in a message, may be received in a response message to a request message sent to a service application of a server node 112 by the same user agent invoked to process some or all of the received resource or by a different user agent. In another embodiment a message including a resource may be received by a client node 114 asynchronously. In an option, the asynchronous message may be sent by a server node 112 as a result of a subscription that identifies that the client node 114 includes and/or represents a subscriber.

As described above, a content handler 515 in the user agent 505 and/or a content manager 512 may send some or all of the first resource to a selected user agent client 501 as presentation information. The user agent client may generate different presentation information based on the received presentation information. For example, a first user agent 505 may receive a first resource that includes HTML markup. The first user agent 505 may provide the markup via a content manger 502 to an HTML content handler component 515 in the user agent client 501. The user agent client 501 may include logic to send, via a user interface element handler component 517, presentation information, generated by the content handler 515, to present output for a user in a presentation space of an output device of the client node 114. Alternatively or additionally, the first user agent 505 may preprocess some or all of the markup to generate presentation information suitable for the particular user agent client 501 such as image data and/or audio data that may be relayed as presentation information to a device driver of a suitable output device. A second user agent 505 may include and/or may access logic in the first user agent 505 and/or analogous logic in receiving a second resource and identifying one or more user agent clients 501 to present output based on some or all of the second resource.

As described above, the subject matter described herein may be applicable to applications other than HTTP based applications. The subject matter described herein is applicable to user communications agents. Based on the descriptions and drawings of the present disclosure those skilled in the art will see that a user communications agent may be identified and/or otherwise selected in the same and/or analogous manner that a browser and/or user agent may be identified and/or selected. Further, those skilled in the art will also realize based on the descriptions and drawings of the present disclosure that a user communications agent client may be identified and/or otherwise selected in the same and/or analogous manner that a browser and/or a user agent client is identified and/or selected.

For example, a first resource may be received by first user communications agent, such as email agent in a first end user node 114. The first resource may be received in a message sent via a network from a remote user communications agent in a second end user node 114. In various embodiments a first resource may be received in an email, an instant message, an MMS message, an SMS message, a message including audio data and/or video data, and/or may be received via streaming protocol. Similarly, a second resource may be received by a second user communications agent via a network from a second user communications agent which may be the same remote user communications agent that sent the first resource or may be a different remote user communications agent in the same remote node or in a different remote node. The second resource may be received in an email, an instant message, an MMS message, an SMS message, a message including audio data and/or a video data, and/or may be received via streaming protocol (e.g. RTP). The first user communications agent may send some or all of the first resource and/or a transformation of the first resource to a user communications agent client as presentation information. The user communications agent client may send the presentation information as is and/or otherwise transform and generate the received presentation information to be sent, with respect to the user communications agent client, as presentation information to present second output via an output device. For example, first user communications agent may send plain text and/or HTML markup that encodes information to the user communications agent client to present to the user represented by the first user communications agent of the first end user node 114. The plain text and/or markup resource may include information sent by a remote user communications agent on behalf of a user by the remote user communications agent, such an email client. Some or all of the first resource may be preprocessed by the first user communications agent. The second user communications agent may represent the same user or a different user than the first user communications agent and may process the second resource in an analogous and/or functionally equivalent manner in sending presentation information, based on the second resource, to the same user communications agent client to present to a user.

A user agent client 501 may present output, based a resource sent from a service application in a server node 112 and received in a response via network interface and stack 511 communicatively coupling a client node 114 to a network 110. The output may be presented in a user interface element in a presentation space of an output device of the client node 114. The response may identify the user agent client 501 and/or may otherwise include information that is included in directing the resource included in the response and/or a transformation of the resource in the response to the user agent client 501 instead and/or in addition to another user agent client. In an option, the response may be directed to a first user agent 505 in the client node 114. As described above, the first user agent 505 may interoperate with the selected and/or identified user agent client 501 to present the output based on the resource in the response. Alternatively, the resource response may be directed to a second user agent 505 in the client node 114 to interoperate with the user agent client 501 to present the output.

A user agent client 501 may include and/or otherwise may interoperate with logic that when executed operates in performing the method 400. Listing 3 illustrates pseudo-code for generating logic that may be included and/or otherwise accessible to a user agent client implemented to perform the method 400.

Listing 3—User Agent Client
. . .
1. case (event.getType( )) {
. . .
2. Get:
3. Id=event.getResourceIdentifier( );
4. uaInfo=get("UAInfo");
5. userAgent=identifyUl(uaInfo)
6. userAgent.sendRequest(identifier, uaInfo);
. . .

A presentation controller 519 in a user agent client 501 may include and/or may interoperate with a content handler component 517 or a content manager component 502 to detect and/or receive data from a user agent 505 to present first output based on the data. The data may include and/or otherwise may be based on a resource received by the huser agent 505 in message received by a client node 114 from a server node 112. An user interface element handler component 517 may include logic such as logic generated from source code derived from pseudo-code in listing 3. A user interaction, such as user input detected via an input device, may be detected. Input information based on the detected input may be provided by a GUI service 521 to the presentation controller 519 in the user agent client 501. The presentation controller 519 may include and/or otherwise may invoke user interface element handler logic. Listing 3 specifies pseudo-code from which a number of embodiments of input handling logic may be derived and/or otherwise generated. Various user interactions may be reported as identifiable events. See line 1. An event specified as a "Get" event (see line 2) may be processed by logic corresponding to pseudo-code in lines 3-6. In line 3, logic in the event object is accessed to retrieve an identifier of a resource to access or "Get". Line 4 illustrates an instruction to access information that includes one or more criteria to identify a user agent 505 to send the request, a user agent 505 to process a response to the request, and/or a user agent client 501 to present output based on the response. In line 5, logic is invoked to identify a user agent to send the request. In line 6, the identified user agent is invoked to send the request. Note that user agent information is passed to the identified user agent 505. The identified user agent may detect a criterion in the user agent information that identifies a user agent 505 and/or a user agent client 501 to be included in processing the response to the request. The requesting user agent may include one or more criteria in the request and/or may store the user agent information and/or one or more criteria in a location accessible to the operating environment 500 to access to identify and/or select a user agent 505 and/or a user agent client 501 for processing the response. In some embodiments, the requesting user agent 505 may not receive user agent information from the user agent client 501. The user agent 505 may have access to user agent information stored in a memory accessible to the operating environment 500 and/or may determine one or more criteria based on the resource requested and/or based on any information accessible to the user agent 505 as coded per the desires of the programmer(s) of the user agent and/or a configured per the desires of a user with authority to provide configuration information for the user agent 505. Note also, that in an option, logic corresponding to line 5 may be absent. For example, the user agent client 501 may bound to a particular user agent 505. If logic for line 5 is absent and if no user agent information is provided by the user agent client 501, those skilled in the art will see that line 4 may excluded from an implementation of the user agent client 501.

Logic that when executed operates in performing the method 400 alternatively or additionally included in a user agent 505 may be invoked in an operating environment 500 of a client node 114 by a user agent client 501 to send a request for a resource to service application in an operating environment of a server node 112. The invocation of the user agent 505 by the user agent client 501 may be detected as an indicator to present output based on the resource identified by the invoking user agent client 501. Listing 4 illustrates pseudo-code for generating logic that may be included and/or accessible to a user agent implemented to perform the method 400.

Listing 4—User Agent
1. sendRequest(identifier, uaInfo) {
2. request=new Request(identifier);
3. // Option—criterion=determineCriterion( );
4. // UAC and/or UA criterion
5. request.addCriterion(uaInfo);
6. request.send( );
7. }

Line 1 in listing 4 identifies an invocation signature for a code block that may be written in source code and translated into logic included in a user agent 505. The sendRequest( ) code block may be invoked by a user agent client 501 as described above. A request object may be instantiated based on the identifier of the resource received from the user agent client 501. See line 2. User agent information included in and/or otherwise accessed via "uaInfo" may be provided to an "addCriterion( )" method of the request object. See line 5. Logic in the addCriterion( ) method may add one or more criteria in a request header, a payload or body portion, and/or in a request trailer if one exists and/or is valid according to the protocol. The comment in line 3 indicates that a user agent client 505 may be implemented to identify and/or determine one or more criteria based on information other than that provided by the invoking user agent client 501 as previously described. A criterion processed by a user agent 505 may be for identifying a user agent to process a response to the request and/or may be for identifying a user agent client 501 for presenting output based on the response. The request is sent via an invocation to a send( ) method of the request object. See line 6. A criterion may be included in the request and/or may be stored in a location of the operating environment 500 for processing to select a user agent 505 and/or a user agent client 501 for the response.

In FIG. 6, logic for performing the method 400 may be implemented in and/or may be otherwise accessible to a service application 601, a network application platform 603, and/or an application layer service 607 in an operating environment 600. An operating environment 600 may be an operating environment of a server node 112. The operating environment 600 may include logic to perform the method 400 arranged in components illustrated in FIG. 6. Listing 5 below illustrates pseudo-code from which source code may be written that is translatable to logic that may be included in and/or otherwise may be accessible to a service application implemented to perform the method 400.

Listing 5—Service application

```
1. {
   ...
2. identifier=request.getID( );
3. resource=model.getResource(identifier);
4. pinfo=view.template(resource);
5. uaInfo=getUAInfo( );
6. // uaInfo=request.getUAInfo( );
7. response=new Response(identifier, pinfo);
8. response. addCriterion(uaInfo);
9. response.send( );
   ...
10. }
```

In an option, logic to perform block 402 may be included in a request-in component 602. Line 1 illustrates an invocation to logic that accesses and returns a resource identifier in a request message, such as URL in an HTTP request. The request may be received by a service application 601 in an operating environment 600 of a server node 112 from a user agent, such as a first user agent, in a client node 114. The request may be detected as an indicator to present output based on a resource identified by the identifier returned in line 2. A first identifier (e.g. the first URL) may be sent by a client node 114 and received via a network adapter of a server node 112 of the service application 601. The resource identified by the identifier returned in line 2 may be access via an invocation to logic in a code block, getResource( ). See line 3. In an option, getResource( ) may be a method of a class that implements a model service 611. The method may include and/or may otherwise generate, receive, retrieve, and/or otherwise access the identified resource. Alternatively or additionally, such a method may access a resource to be transformed into presentation information to be sent as a resource in a response message to the client node 114. Line 4 shows a method, template( ), of a view service 619. The template( ) method may retrieve a template for generating the resource, such as a web page. The web page is presentation information with respect to the service application 601. The template may include server-side script instructions that process the input to the template( ) method to generate presentation information, returned in a pInfo pointer to a resource structure as line 4 specifies, to send as a resource in a response to the received request. Line 5 illustrates an invocation to a "getUAInfo( ) code block that identifies one or more criteria for identifying and/or selecting a user agent and/or a user agent client of the client node 114 to be invoked to process a response to the received request. Line 7 in listing 3 illustrates pseudo-code that creates a new instance of a "Response" object that is instantiated based on the identifier of the resource, accessed by the model service 611, and "pInfo" reference. Line 8 illustrates a method call to the "response" object to add one or more criteria for identifying and/or selecting a user agent and/or a user agent client of the client node 114 to be included in processing the response to send to the client node 114. As described above a response-out component 622 in view service 619 may send the generated presentation information to be received as a resource, identified by the identifier in the request, in a response sent via the network 110 to the client node 114 to present, by a user agent client identified based on one or more criteria identified in and/or based on the response (see line 9 which illustrates a send( ) method of the response object is invoked to send the response). Alternatively or additionally, one or more criteria for identifying and/or selecting a user agent and/or a user agent client of the client node 114 may be accessed from and/or otherwise determined based on the first request (see the comment in line 6 in listing 3).

Listing 6 illustrates pseudo-code for generating logic that may be included and/or accessible to an application protocol service that is implemented for an operating environment of a client node 114 to perform the method 400. The protocol layer may be included in communicatively coupling a service application in a server node 112 with a user agent in a client node 114. Those skilled in the art will know based on the descriptions and drawings of the present disclosure that logic included in and/or otherwise accessible to an application protocol service, a network application, and/or controller of service application may be written and/or derived from analogous pseudo-code modified for the role of the server node 112.

Listing 6—Protocol Layer

```
1. processResponse(response) {
2. resource=response.getResource( );
3. // Option–criterion=determineCriterion( )
4. criterion=response.getCriterion( );
5. userAgent=identifyUA(criterion);
6. // criterion is optional
7. userAgent.handleResponse(resource, criterion)
8.}
9. processRequest(URL, resource) {
10. request=new Request(resource, URL);
11. criterion=determineCriterion( );
12. request.addCriterion(criterion);
13. request.transmit( )
14.}
```

FIG. 7A illustrates a hypertext transfer protocol (HTTP) request 700, in accordance with an embodiment. As an option, the request 700 may be implemented in the context of the details of any of the foregoing figures. Of course, however, the request 700 may be created, modified, and/or otherwise processed in any desired operating environment. Further, the aforementioned definitions may equally apply to the description below.

In FIG. 7A, an exemplary request 700 is illustrated including one or more exemplary criteria for identifying and/or selecting a user agent and/or a user agent client in a client node 114 included in an exchange with a server node 112. The client node 114 may be a node of an operating environment, such as operating environment 500 in FIG. 5. A resource identified by a user agent 505 may be requested and received by the client node 114 from the server node 112. A user agent client 501 may operate to present output, based on the resource, via an output device accessible to the operating environment 500. The resource may be identified by a URL. For example, an HTTP request line 702 may include, for a user agent 505, an indicator to present output based on a resource identified by a URL 704. The URL 704 in the request line 702 is an example of one such indicator. The user agent 505 may interoperate with an HTTP application protocol service 513 to send the request 700 the server node 112 for further processing. In an option, the user agent and/or logic for performing the method 400 may be included in the application protocol service 513. The server node 112 receiving the request 700 may also process the request line 702 and/or portions of the request line 702 as one or more indicators to present output. The server node 112 may respond to the one or more indicators in the request by accessing a resource identified by the URL 704 and sending presentation information based on the accessed resource via the network 110 in an HTTP message as a response, such as HTTP message 721 in FIG. 7B, to the client node 114. Further the request 700 may be processed by the user agent

505 and processed by the server node 112 in response to an input corresponding to a user interface element presented by a user agent client 501. Input information received, in response to the detected input, by the user agent client 501 may be processed as an indicator to present output by accessing the resource identified by the URL 704

A user agent client 501 may respond to and/or may provide one or more criteria shown in the request 700 for identifying and/or otherwise selecting a user agent 505 and/or a user agent client 501. As described, a user agent client 501 may identify and/or otherwise detect in URL 704 or a portion thereof to provide to a user agent 505 to include in the request line 702. The URL may include a criterion. A domain identifier (e.g. www.otherSite.net in URL 704) may be processed by logic in a user agent client 501, a user agent 505, and/or a service application as a criterion and/or part of a criterion that identifies a user agent and/or user agent client to send the request 700 and/or to process the response 721. A user agent client 501 may process a domain identifier and/or other criterion by selecting a particular user agent 505 and/or determining one or more acceptable user agents for sending the request 700 and/or for receiving the response 721. For example, a specified domain identifier and/or a group of domain identifiers may be associated with a specified browser and/or a specified browser attribute such as a performance attribute, a security attribute, a content handler type, and/or support for a specified scripting environment or other operating environment (e.g. a Java Virtual Machine)— to name a few examples. A browser may include a user agent and a user agent client. For example, MICROSOFT.COM may be associated with INTERNET EXPLORER, LINKEDIN.COM may be associated with a user agent provided by GOOGLE and a user agent client provided by the MOZZILA FOUNDATION. Where no association for a particular domain exists or otherwise is accessible, a default user agent and/or user agent client may be identified or if logic is included to process another criterion, such as an HTTP Content-Type header, a user agent and/or a user agent client may be identified based on the secondary criterion. In an option, a criterion that is not associated with and/or otherwise does not identify a user agent and/or a user agent client may be detected. In response, the resource may be discarded or processed by a component and not provided to any user agent. Alternatively or additionally, criterion, for identifying a user agent to send a message to service application, that is not associated with and/or otherwise does not identify a user agent and/or a user agent client may be detected. In response, the request information may be discarded or processed by a component and not provided to any user agent. Similarly, a user agent included in sending a request and/or included in processing a response may be unable to identify a user agent client to present output based on a resource requested. The user agent sending the request may not send the request. Alternatively, the user agent may send the request to a server node, which may be identified by the request or may be another server node. The user agent receiving the response may discard some or all of the response and/or may invoke a component other than a user agent client to process some or all of the response and not invoke any user agent client in response to receiving the request.

A user agent client 501 included in presenting output based on a resource may identify one or more criteria in the resource and/or based on the resource (e.g. in metadata for the resource). The user agent client 501 may process such a criterion by selecting a user agent 505 to interoperate with to send a request for a resource to present output based on the requested resource. The user agent client 501 may alternatively or additionally, interoperate with a user agent 501 to identify a user agent 505 and/or to identify a user agent client 501 to be included in processing a response the request 700. Other exemplary criteria for selecting and/or otherwise identifying a user agent and/or a user agent client may alternatively or additionally be exchanged between and/or amongst a user agent client, a user agent, an application protocol service, a network application platform, and/or service application. Other examples of information in request 700 that may be processed as criteria and/or in combination as a criterion include a protocol identifier 706, a protocol version number, a host header 708, an accept header 710, a cookie 712, and/or URL parameter 714 in the body of request 700. A URL parameter may be included in a request line or in a body of the message according to the HTTP protocol.

A network protocol specification may be extended to define new criteria. FIG. 7A includes a "Target-UA" header 716 that may be defined for the HTTP protocol to identify a criterion for identifying a user agent to send an HTTP message to a server node 112. Target-UA header 716 illustrates that a name or alias may be a criterion for identifying a user agent and/or a user agent client. In another aspect a measure may be included as a criterion. The measure may be based on a metric for performance, power utilization, CPU utilization, security, and the like. In FIG. 7A, Target-UA header 716 identifies "IE" which may be defined as an alias for MICROSOFT INTERNERT EXPLORER and "MZ" which may be a criterion that identifies MOZILLA. Version information may also be included that identifies a particular version or more than one version. FIG. 7A illustrates other exemplary protocol extensions such a "Target-UAC" header 718 which may be defined as a criterion for identifying and/or otherwise selecting a user agent client to present output. The criterion may be included as directed by a user agent client 501 and/or may be included by a user agent 505 that sends the request 700. A "Route-UA" header 720 may be defined for the protocol as a valid criterion for identifying and/or selecting a user agent 505 to process a resource received in a response received by the client node 114. A user agent 505 that sends a request and/or a server node 112 that receives the request may process a criterion in the request as suggestive and may provide an equivalent and/or different criterion in a response transmitted from the server node 112 and received by the client node 114. A user agent that sends a request and/or a server node 112 that receives the request may process a criterion in a request as required and may provide the same criterion or an equivalent criterion in a response transmitted from the server node 112 and received by the client node 114. A user agent 505 that receives a criterion from and/or via a service application 601 may treat the criterion as suggestive or required, in an analogous manner. Those skilled in the art will see that additional tokens and/or syntax may be defined as valid for including a criterion for identifying a user agent in a network protocol resource unit or message.

Other portions of message may be defined as valid criteria or in combination as a valid criterion for an application protocol and/or for a network protocol. A criterion may identify and/or otherwise may be based on an attribute of a user agent, a user agent client, and/or a service application such as a licensing entity, a network protocol supported, a plug-in, a security setting, a content type of a resource included and/or identified in a request and/or in a response, a user of a user agent and/or of a user agent client, one or more attributes of other user agents and/or user agent clients available for processing the request and/or the response, a brand of web server node included in processing the request and the response, an operating system, a service provider of a service application, a geospatial location, a network location, a date, a time, a duration, an ambient condition, a cost, a performance metric, a power metric, a resource analytics result, a probability and/or other statistic, and a user input—to name a few examples.

Similarly, a user agent included in sending and/or otherwise causing the sending of an HTTP request may provide and/or otherwise identify one or more criteria that may be included in identifying a user agent to present output based on the request. The user agent included in sending the HTTP request and the user agent that presents the output may be the same or may be different user agents.

Alternatively or additionally, a user agent may process one or more criteria in the request 700. For example, user agent may identify and/or otherwise detect, in a URL 704 in the request line 702, a domain identifier. The user agent may process the criterion by selecting a particular user agent and/or determining a user agent type based on the identified domain. The user agent may include logic that is executed to send the request 700 to a server node 112. Alternatively or additionally, the user agent included in sending a request may identify a user agent to process a response to the request 700 based on any portion of the request 700 such as a protocol identifier 706, a host header 708, an accept header 710, a cookie 712, and/or URL parameter 714. The user agent included in sending the request may process, include, and/or modify a criterion that identifies a user agent client to present output based on the resource received in a response to the request. Analogously, a server node 112 receiving a request, such as request 700, may process, create, and/or modify one or more criteria received in the request to include one or more criteria in a response to the request. The criterion/criteria in the response may be included in identifying a user agent to process resource received in the response and/or a user agent client to present output based on the resource received in the response.

FIG. 7B illustrates an HTTP response header 721, in accordance with an embodiment. As an option, the header 721 may be implemented in the context of the details of any of the foregoing figures. Of course, however, the header 721 may be generated and/or otherwise processed in any operating environment. Further, the aforementioned definitions may equally apply to the description below.

As shown in FIG. 7B, a response, such as the illustrated HTTP response 721*b*, may include one or more criteria and/or in combination a criterion for identifying and/or otherwise selecting a user agent 505 and/or a user agent client 501. Exemplary criteria for identifying and/or selecting a user agent and/or a user agent illustrated in the response 721 include a response code 722, a MIME header 724, and/or a cookie header 726. The HTTP protocol may be extended, as may other protocols, to define one or more criteria to identify a user agent and/or a user agent client to process a response and/or to process resource in and/or generated from the response. FIG. 7B illustrates a "Target-UAC" header 728 and a "Target-UA" header 730, which may be respectively processed to identify a user agent client and/or to identify a user agent to process the response 721. For example, HTTP response code 722 may be processed by a server node 112, a user agent, and/or a user agent client as a criterion for selecting a user agent and/or a user agent client. An application protocol service 513 that receives the response may identify, based on one or more of criteria, a user agent 505 to process data in the response. The user agent receiving response 721 may also process the HTTP response code 722 as criterion for identifying a user agent client 501 to present output based on the response. A body (not shown) of response 721 may include an HTML document, image data, and/or data having other content types to provide to a user agent client 501. A user agent client 501 may also include logic to process one or more criteria in the response 721 to identify a user agent to request a resource identified by data in the response 721. A server node 112 may identify and/or provide a criterion for identifying a user agent to process some or all of response 721, such as Target-UA header 730. A server node 112 may process an identify and/or provide a criterion for identifying a user agent client to present output based on some or all of the resource transmitted in the response 721, such as Target-UAC header 728. Alternatively or additionally, a user agent may be selected to process a resource in response 721 based on a content-type header and/or a cookie header 726. The server node 112 may select and/or otherwise provide information for selecting a particular user agent and/or for determining a user agent type based on, for example, a value identified in the cookie header 726. The server node 112 may further process the criterion by sending the response 721 to the user agent to provide a resource in the response and/or presentation information based on the resource to a user agent client to present output. Alternatively or additionally, a user agent may be selected for sending and/or identifying presentation information to a user agent client based on any portion of the response 721 based on the logic and/or configuration of the user agent client as described in the present disclosure and drawings.

A user agent that processes the response 721 may include and/or may modify a Target-UAC header to identify a user agent client to receive presentation information identified in a response to the request. A server node 112 may include logic to send a criterion to a user agent to identify a user agent client to receive presentation information identified in a response to a request. Still further, information in a response such as response 721 may be processed to identify a user agent to include in presenting output based on a resource received and/or identified in a response received as a result of sending a request. A server node 112 included in sending the response 721 may provide and/or otherwise identify information that is included in identifying a user agent client to present the output. The user agent client included in presenting output identified the response 721 and the user agent client included in sending the corresponding request 700 may be different user agent clients. Similarly, a user agent included in receiving and/or otherwise processing the response 721 may provide and/or otherwise identify information that is included in identifying a user agent client to present the output. The user agent included in receiving the response 721 and the user agent included in sending the corresponding request 700 may be the same or may be different user agents.

Those skilled in the art will see that additional tokens and/or syntax may be defined as valid for including as a criterion for identifying a user agent and/or for identifying a user agent client in a network protocol resource unit or message.

Figure 8A:
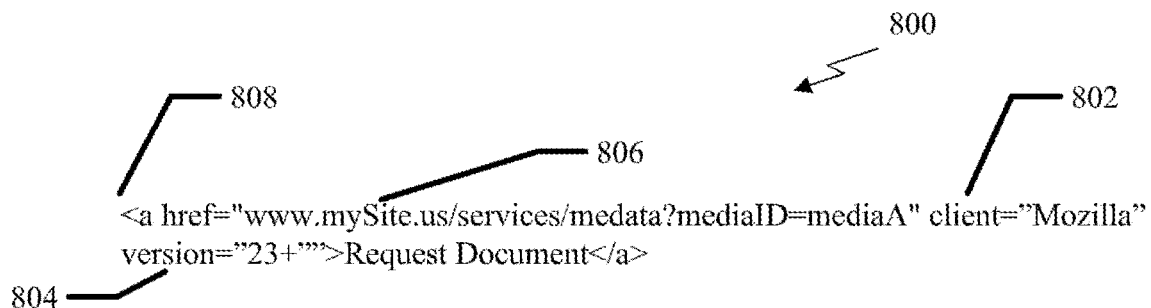
FIG. 8A shows a diagram illustrating a portion of a markup language document, in accordance with an embodiment.

FIG. 8A illustrates markup 800, written in a markup language in accordance with an embodiment, that may be included as a portion of a markup language document (e.g. such as web page). As an option, the markup 800 may be implemented in the context of the details of any of the foregoing figures. Of course, however, the markup 800 may be processed and/or generated in any operating environment. Further, the aforementioned definitions may equally apply to the description below.

As shown in FIG. 8A, the markup 800 may include one or more criteria, defined as valid by a schema for identifying a user agent and/or for identifying a user agent client included in processing a request and/or a response exchanged via a network 110 between a client node 114 and a server node 112. Exemplary criteria illustrated include a domain 806, a browser client 802, a browser version 804, and an HTML element (e.g. a tag, an attribute, an attribute value, and/or tag content) such as the <a> element 808. The markup 800 may be received in a message, such as a response, from a server node 112. The message and/or some or all of a resource included in the message may be received by a user agent. The user agent may provide the markup 800 to a user agent client as presentation information to present as output via an output device to a user. The user agent may transform, translate, and/or otherwise modify the markup to generate presentation information suitable for processing by the user agent client. The user agent client may process the markup 800 in sending a request to a server node 112, which may be the same server node 112 or a different server node 112 which sent the markup 800. For example, the user agent client may detect an input corresponding to a portion of the presented output that represents markup 800. The markup 800 may include a criterion or criteria processed in creating and/or modifying the request to send to a server node 112. The server node 112 that sent the markup 800 may include the one or more of the criteria in the markup 800. As described above with respect to FIGS. 7A and 7B, markup may identify a criterion for selecting and/or invoking a user agent to process the message and/or resource in the message such as the markup 800, to select and/or invoke a user agent client to process the markup 800, to select and/or invoke a user agent to create, modify, and/or send a request identified based on the markup 800 to a server node 112, and/or to select and/or identify a user agent client to process a response to the request identified based on the markup 800. Markup 800 may be included in a body portion of a message, such as response 721 (not shown), received by a client node 114. A user agent for processing the message or a portion thereof may be selected and/or invoked based on a domain 806, an attribute such as a "client" attribute 802 and/or a "version" attribute, and/or based on the content of a markup element, such as the <a> element 808 to be presented to a user via an output device. Alternatively or additionally, a user agent client may be identified or selected by a user agent based on one or more criteria in markup 800. A user agent client for presenting output based on the markup 800 may be selected and/or invoked based on a domain 806, an attribute such as a "client" attribute 802 and/or a "version" attribute, and/or based on a particular markup tag such as the <a> tag 808. Further, a user agent may be identified or selected by a user agent client based on one or more criteria in markup 800 to send a request identified based on markup 800 to a server node 112. A user agent client for processing markup 800 may select and/or invoke a user agent to create, modify, and/or send the request based on a domain 806, an attribute such as a "client" attribute 802 and/or a "version" attribute, and/or based on content in a markup element (e.g. <a> element 808). Further still, a user agent client and/or a user agent included in sending the request may select and/or identify a user agent and/or a user agent client to process a response to the request received from the server node 112. A user agent client and/or a user agent included in processing the response to the request may be selected and/or otherwise identified based on a domain 806, an attribute such as a "client" attribute 802 and/or a "version" attribute, and/or based on content of an element (e.g. <a> element 808).

Figure 8B:
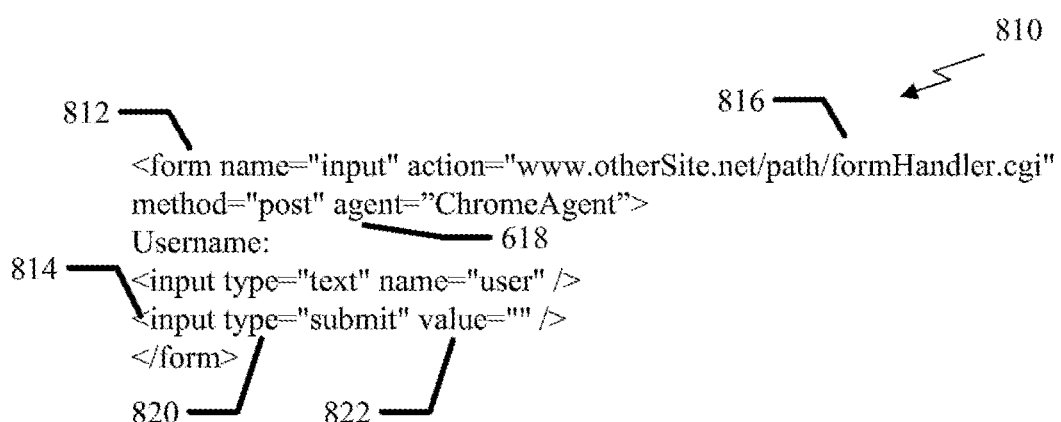
FIG. 8B shows a diagram illustrating a portion of a markup language document, in accordance with an embodiment.

FIG. 8B illustrates other markup 810 that may be included in a markup language document, in accordance with an embodiment. As an option, the markup 810 may be implemented in the context of the details of any of the foregoing figures. Of course, however, the markup 810 may be processed and/or created in any operating environment. Further, the aforementioned definitions may equally apply to the description below.

The markup 810 in FIG. 8B illustrates information that may be processed as one or more criteria along with and/or instead of those illustrated in FIGS. 7A, 7B, and 8A. FIG. 8B illustrates that a type of markup language element, such as a form element 812 and/or an input element 814, a path portion 816 of a URL, an "agent" attribute 818, a type attribute 820 of an input element such as input for submitting a form, and/or a value attribute 822 may each be processed as a criterion or a combination may be processed as a criterion for selecting and/or identifying a user agent to receive content from a server node 112, a user agent client to present output received from a server node 112, a user agent to send a request to a server node 112, and/or a user agent client to include in sending a request to a server node 112.

Those skilled in the art will see that additional tokens and/or syntax may be defined as valid for including a criterion for identifying a user agent and/or a user agent client in markup written in a markup language, image data, audio data, script resource, and the like.

FIG. 9A shows MIME resource 900 that may be sent between client nodes 114, from a client node 114 to a server node 112, and/or that may be received in a message from a server node 112 to a client node 114. The MIME resource 900 illustrates various MIME types for formatting a resource suitable for embodiments of the subject matter described herein. As an option, the MIME resource 900 may be implemented in the context of the details of any of the foregoing figures. Of course, however, the MIME resource 900 may be created, modified, and/or otherwise processed in any operating environment. Further, the aforementioned definitions may equally apply to the description below.

In an option, an application may include a user communications agent such as an email agent, an audio messaging agent, an instant messaging agent, a video messaging agent, and the like. A system including the user communications agent may also include a messaging service application operating on a server node 112 such as email server node or relay node. As shown in FIG. 9A, the MIME resource 900 includes one or more criteria for identifying a user communications agent and/or a user communications agent client to include in processing a messages exchanged between two nodes via a network. The exchange may be via server node 112. Exemplary criteria illustrated include a first content type header 902 identifying a content type of corresponding resource, illustrated by a text message, a first agent header 904 identifying a criterion for determining a user communications agent, a user agent, a user communications agent client, and/or a user agent client to include in presenting the content, a second content type header 906 to identify a type, which may be an attachment such as a photograph, and a second agent header 908 to identify a user communications agent, a user agent, a user communications agent client, and/or a user agent client to process the resource. In various embodiments, the first content type header and second content type header may relate to text, one or more images, one or more videos, and/or any other media file type. Additionally, in other embodiments, the first agent header 904 and the second agent header 908 may relate to a program associated with a type identified by a corresponding content type header (e.g., a MIME type, etc.). A content type may identify an image data type and an agent header may provide a criterion included in identifying a program capable (i.e. a user agent client) of displaying images, such as a web browser and/or a photo album program. A client node 114 may associate programs with respective content types with a user agent and/or with a user communications agent to create configured associations. A criterion, such as agent header may override and/or otherwise modify processing based on a default association of a program with a content type. In such an embodiment, for an image content type a software component may be selected which can open and/or edit the image. The software component may include code stored on the client node 114, code stored and/or executed in a cloud-based system, code received from another node such as a script, and/or any other program or code which may be used to open, modify, present, and/or otherwise process the content.

The MIME resource 900 may be detected in receiving a message from a remote user communications agent via a network 110. The message may be received via a server node 112 to present to a user by a user communications agent client in a client node 114. The message may be received by a user communications agent. The user communications agent may select a user communications agent client based on one or more criteria in MIME resource 900 to presentation information to present to a user. The user communications agent client may process the content based on its MIME type(s). In processing the resource, a user communications agent client may initiate a sending of a message to a server node 112, which may be the same server node 112 or a different server node 112 which sent the MIME resource 900. The MIME resource may include criteria processed in creating and/or modifying the message. The remote user communications agent and/or the server node 112 that sent the MIME resource 900 may include one or more of the criteria in the message. As described above with respect to FIGS. 7A, 7B, 8A, and 8B a criterion may be processed in identifying and/or invoking a user communications agent to process the message including the MIME resource, to select and/or invoke a user communications agent client to process the content included in the MIME resource 900, to select and/or invoke a user communications agent to create, modify, and/or send a message based on the MIME resource 900 to a server node 112 and/or another node with another user communications agent, and/or to select and/or identify a user communications agent client to process a response or other message received based on the MIME resource 900. MIME resource 900 may be included in a portion of an email message received by a client node 114. A user communications agent for processing the email message or a portion thereof may be selected and/or invoked based on the first content type header 902 and/or an agent header 904. A user communications agent may be selected and/or may be identified based on a identifier of a sender of the message, a recipient of the message, and/or relay in a network path included in transmitting the message from one user communications agent to another. The same user communications agent or another user communications agent for processing another portion of the message, such as the image in the attachment may be selected and/or invoked based on the second content type header 906 and/or the second agent header 908. Alternatively or additionally, a user communications agent client may be identified or selected by a user communications agent based on one or more criteria in MIME resource 900. Further, a user communications agent may be identified or selected by a user communications agent client based on one or more criteria in MIME resource 900 to send a message based on MIME resource 900 to another user communications agent directly or via a server node 112. A user communications agent client for processing MIME resource 900 may select and/or invoke a user communications agent to create, modify, and/or send the message based on any indicator included in the MIME resource 900. Further still, a user communications agent client and/or a user communications agent included in sending the message may select and/or identify a user communications agent and/or a user communications agent client to process another message received in response to the message sent to the other user communications agent.

As shown in FIG. 9B, the MIME resource 910 includes one or more criteria. The MIME resource 910 may be exchanged via a server node 112 or other type of relay node. Exemplary criteria illustrated include a client header 912 identifying a criterion for selecting a user communications agent client, and an agent header 914 to identify a user communications agent. In an option, the client node 114 may include a mail user communications agent (e.g., Mozilla Thunderbird, etc.) identified to present the text content type. In another embodiment, the agent header 714 may include one or more permissible browsers (e.g., Mozilla Firefox, Microsoft Internet Explorer, etc.). A browser that matches the agent header 914 criterion may operate as a user agent and/or as a user agent client in requesting a resource identified by a URL identified in MIME resource 910. The same or a different browser may operate as a user agent client in presenting output based on the requested resource. The MIME resource 910 in FIG. 9B illustrates criteria that may be included with and/or instead of those illustrated in FIG. 9A.

Those skilled in the art will see that additional tokens and/or syntax may be defined as valid for including a criterion for identifying a user agent and/or a user agent client in MIME typed resource.

Figure 10:
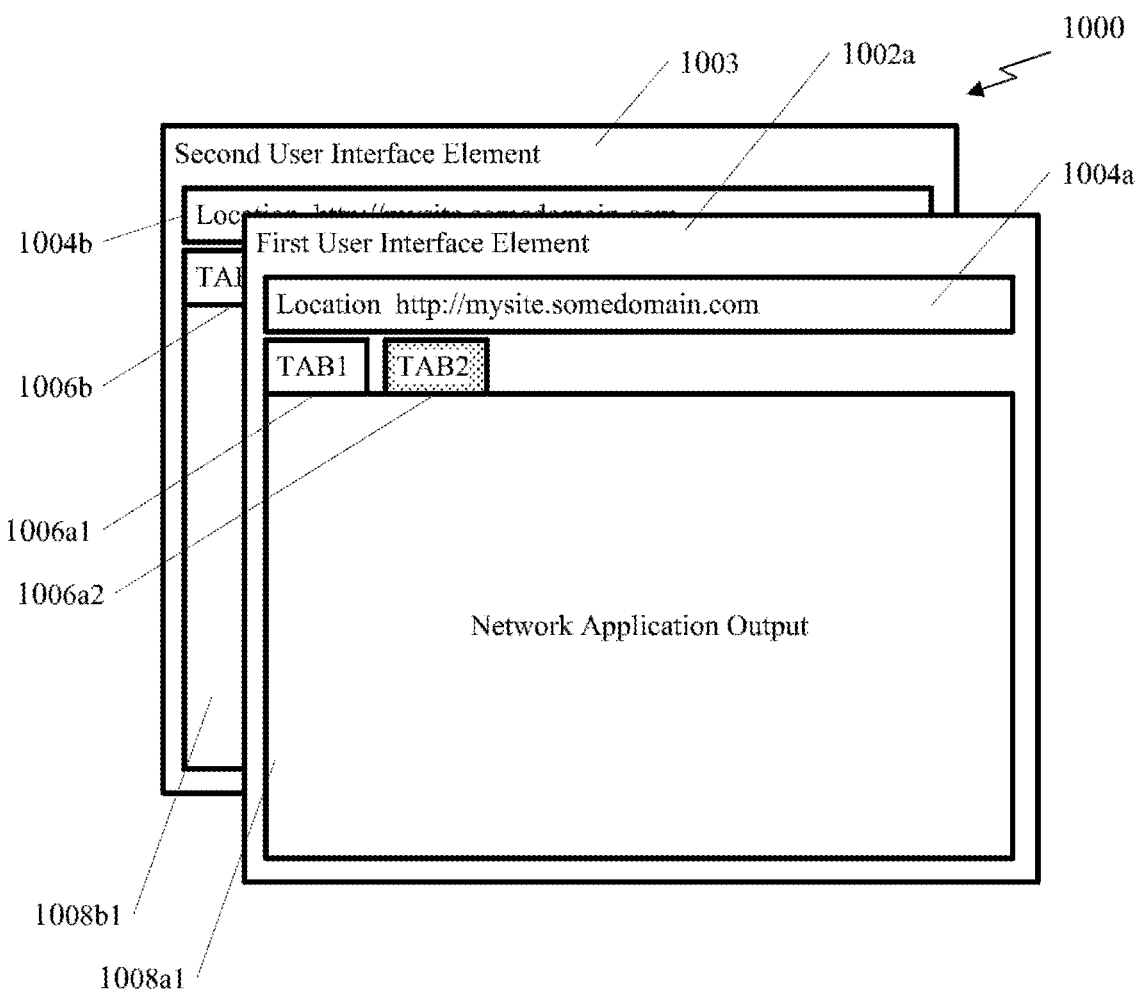
FIG. 10 shows a diagram illustrating user interface elements, in accordance with an embodiment.

FIG. 10 illustrates a user interface 1000, in accordance with an embodiment. As an option, the user interface 1000 may be implemented in the context of the details of any of the foregoing figures. Of course, however, the user interface 1000 may be included in, created, and/or otherwise accessed in any operating environment. Further, the aforementioned definitions may equally apply to the description below.

As shown in FIG. 10, the user interface 1000 may be presented in a presentation space of a display device such as an LCD (Liquid Crystal Display). A user agent client, such as the user agent client 501 in the FIG. 5, may present a first user interface element 1002 within the user interface 1000 for presenting output based on a first resource received from a service application 601 via a first user agent 505 and may present a second user interface element 1003 within the user interface 1000 to present output based on a second resource from the same service application 601 and/or from a different service application via a second user agent 505. Code for presenting the first user interface element 1002*a* may be developed and provided by a first provider such as a first legal entity (e.g. the Mozilla Foundation) and code for the second user interface element 1002*b* may be provided by a second provider such as a second legal entity (e.g. Microsoft Corporation). The user agent client 501 may be provided by one of the first provider, the second provider, and/or a third provider (e.g. Google, Inc., Apple, or Adobe). Resources from different service applications may be received from a same server node 112 and/or from different server nodes 112. In an option, the first user agent 505 may interoperate with a server node 112 via a first application protocol or other type of network protocol to receive the resource. The second user agent 505 may receive the second resource via the same protocol(s) and/or may receive the second resource via a different application protocol and/or other different network protocol than utilized in receiving the first resource.

Additionally, each user interface element 1002 may include other user interface elements, such as respective location bars 1004, tab controls 1006, and tab presentation spaces 1008, one or more of which may be for presenting output based on received resource. For example first service application output may be presented in a first tab presentation space 1008a1 and second service application output may be presented in the second tab presentation space 1008b1. The some or all of other user interface elements in the first user interface element 1002a may be based on the output presented in the first tab presentation space 1008a1 presented in response to receiving the first resource; and some or all of user interface elements in the second user interface element 1002b may be based on the output presented in the second tab presentation space 1008b1 presented in response to receiving the second resource. Various user interface elements and their respective attributes may be determined based on a user agent client that initiates a request, a user agent that provided resource to the initiating user agent client, a user agent that is included in sending the request, a server node 112 that receives the request and sends a response, a user agent client that interoperates with the user agent that receives the response to present output based on a resource in the response, a user, an order in which the resource is received with respect to other received resource, a role of user with respect to the content presented, a geospatial location associated with the content, and/or any other accessible resource to the client node 114 and/or to the one or more server nodes 112 responding to the requests from the client 114.

Figure 11:
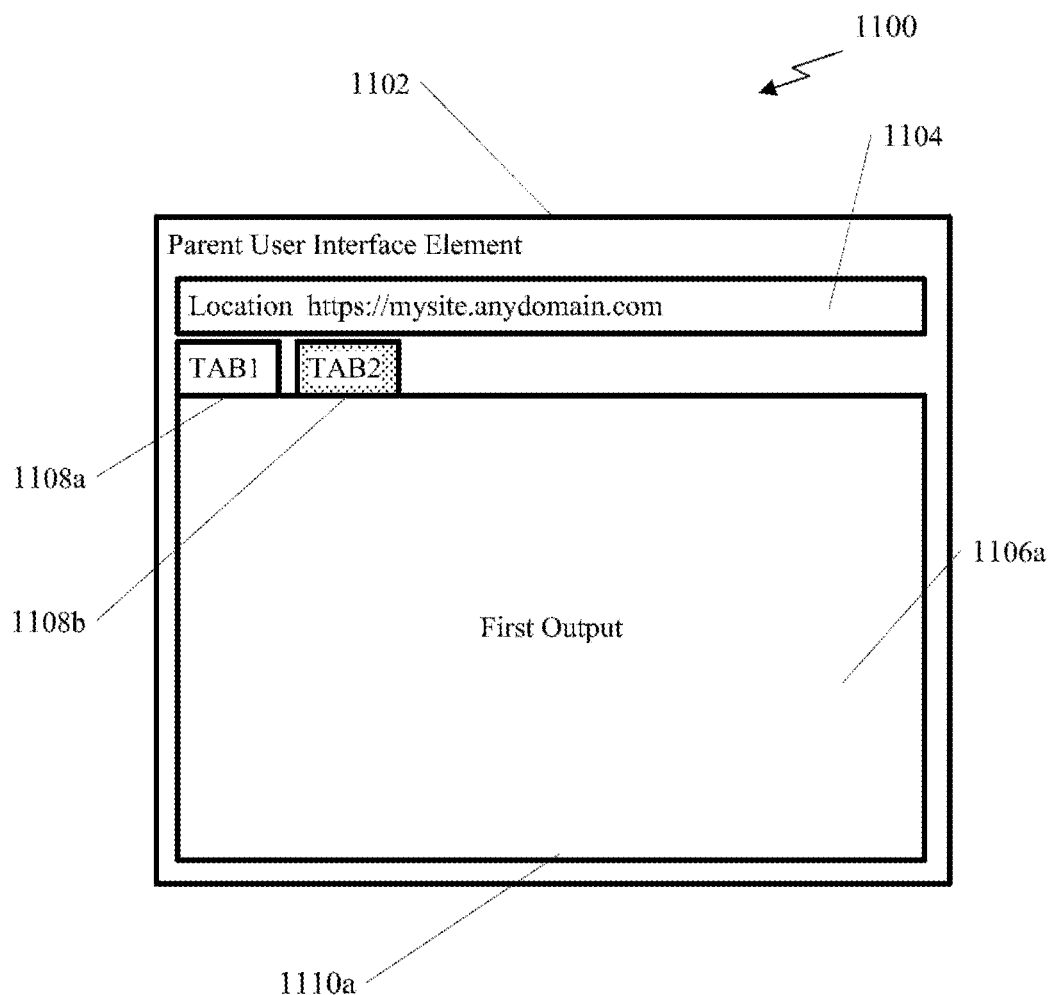
FIG. 11 shows a diagram illustrating user interface elements, in accordance with an embodiment.

FIG. 11 illustrates a user interface 1100 that implements a user interface of a user agent client, in accordance with an embodiment. As an option, the user interface 1100 may be implemented in the context of the details of any of the foregoing figures. Of course, however, the presentation space 1100 may be created, modified and/or otherwise processed in any operating environment. Further, the aforementioned definitions may equally apply to the description below.

As shown in FIG. 11, the user interface 1100 may be presented on a display device of a laptop computer, a smartphone, or other node. A user agent client, such as the user agent client 501 in FIG. 5 may present a parent user interface element 1102, which may include a location bar 1104 for presenting a URL that corresponds an active tab associated with a tab presentation space 1106. The parent user interface element 1102 may implement multiple tab presentation spaces including a first tab presentation space 1106a for a first tab 1108a. The first tab presentation space 1106a may be included in a first child user interface element 1110a, such as a pane. The user agent client 501 may present output based on a first resource received via a first user agent 505 from a service application 601 in the first-child user interface element 1110a and may present a second-child user interface element (not explicitly shown/shown in a hidden state) to present second output based on a second resource received via a second user agent from the same service application 601 and/or from a different service application.

As with FIG. 10, resource from different service applications may be received from a same server node 112 and/or from different server nodes 112. The user agents may be selected for processing the first resource and the second resource based on criteria included in the first resource, the second resource, a first node included in transmitting the first resource, a second node included in transmitting the second resource, a network interface included in receiving the first resource, a network interface included in receiving the second resource, a location of and/or otherwise associated with the client when the first resource is processed, a location of and/or otherwise associated with the client when the second resource is processed, a location of and/or otherwise associated with a sender of the first resource, a location of and/or otherwise associated with a sender of the second resource, a security policy, a user included in sending the first resource and/or the second resource, a user to present the first resource and/or the second resource to, a role played by a user in sending and/or receiving the first resource and/or the second resource, an cost associated with processing the first resource and/or the second resource (e.g. an energy cost, a time cost, a monetary cost, etc.), an encoding (e.g. encrypting) of the first resource and/or the second resource, and/or based on any suitable attribute and/or metadata of the first resource, the second resource, and/or any component included in processing the first resource and/or the second resource.

Figure 12:
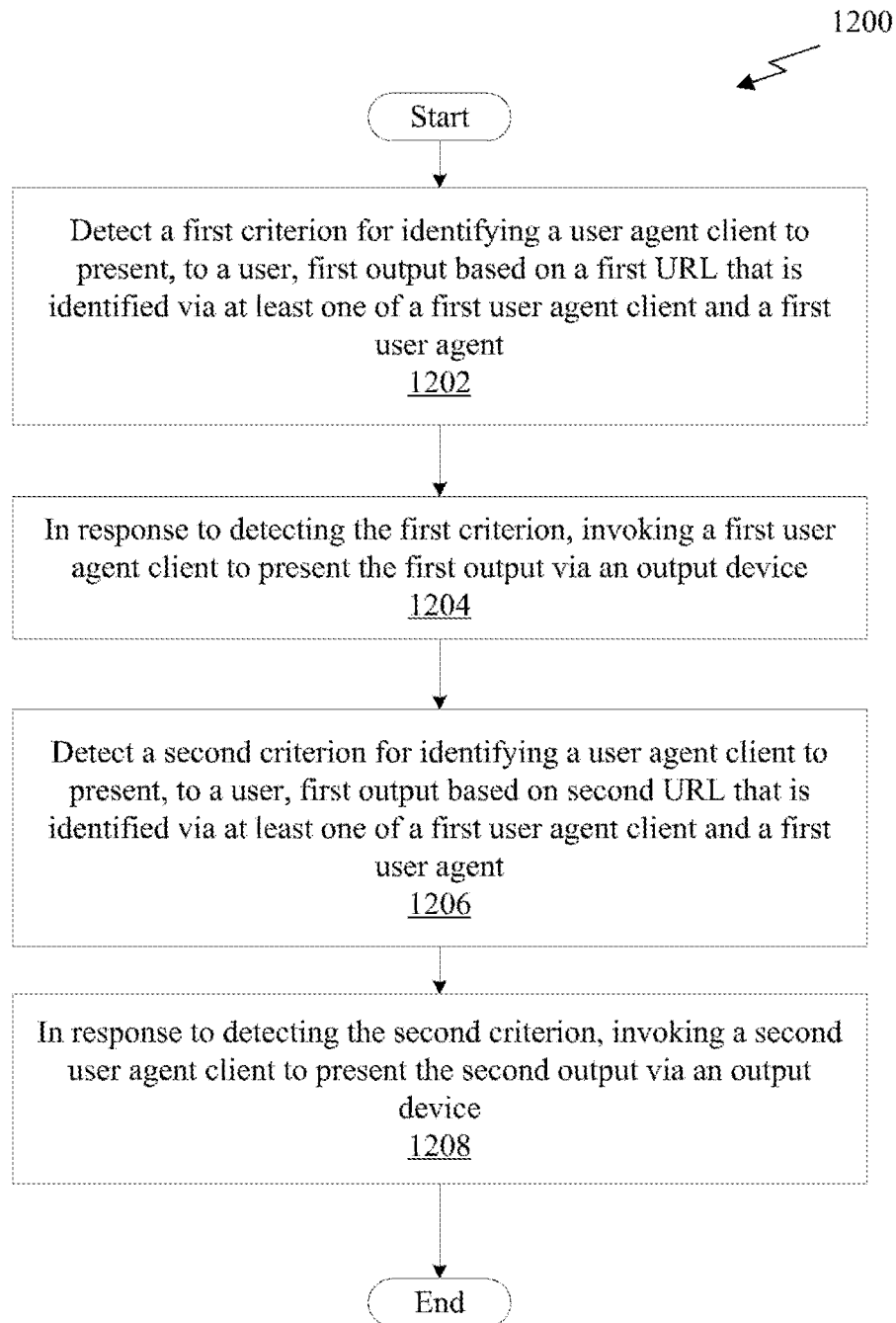
FIG. 12 shows a flow chart of a method in accordance with an embodiment of the subject matter described herein.

FIG. 12 shows a flow chart of a method 1200 in accordance with an embodiment. As an option, the method 1200 may be implemented in the context of the details of any of the foregoing figures. As shown in FIG. 12 at block 1202, a first criterion is detected for identifying a user agent client to present, to a user, first output based on a first URL. The first URL is identified via at least one of a first user agent client and a first user agent. At block 1204, in response to detecting the first criterion, a first user agent client is invoked to present the first output via an output device. At block 1206, a second criterion is detected for identifying a user agent client to present, to a user, first output based on second URL that is identified via at least one of a first user agent client and a first user agent. At block 1208, response to detecting the second criterion, a second user agent client is invoked to present the second output via an output device.

An operating environment suitable for including logic that when executed operates to perform the method 1200 may be implemented in and/or otherwise may include one or more client nodes 114 and/or server nodes 112 in FIG. 1A. FIGS. 5 and 6 illustrate operating environments that separately and/or together may include an arrangement of components including logic for performing the method 1200 illustrated in FIG. 12. For example, as described above, various embodiments of operating environment 500 in FIG. 5 may be modified from an operating environment 200 to include an arrangement of components including logic for performing the method 1200. Also as described above various embodiments of operating environment 600 in FIG. 6 may be modified from an operating environment 300 to include an arrangement of components including logic for performing the method 1200. Of course, however, logic for performing the method 1200 may be implemented in various embodiments in any suitable operating environment. Further, the aforementioned definitions may equally apply to the description below.

Figure 13:
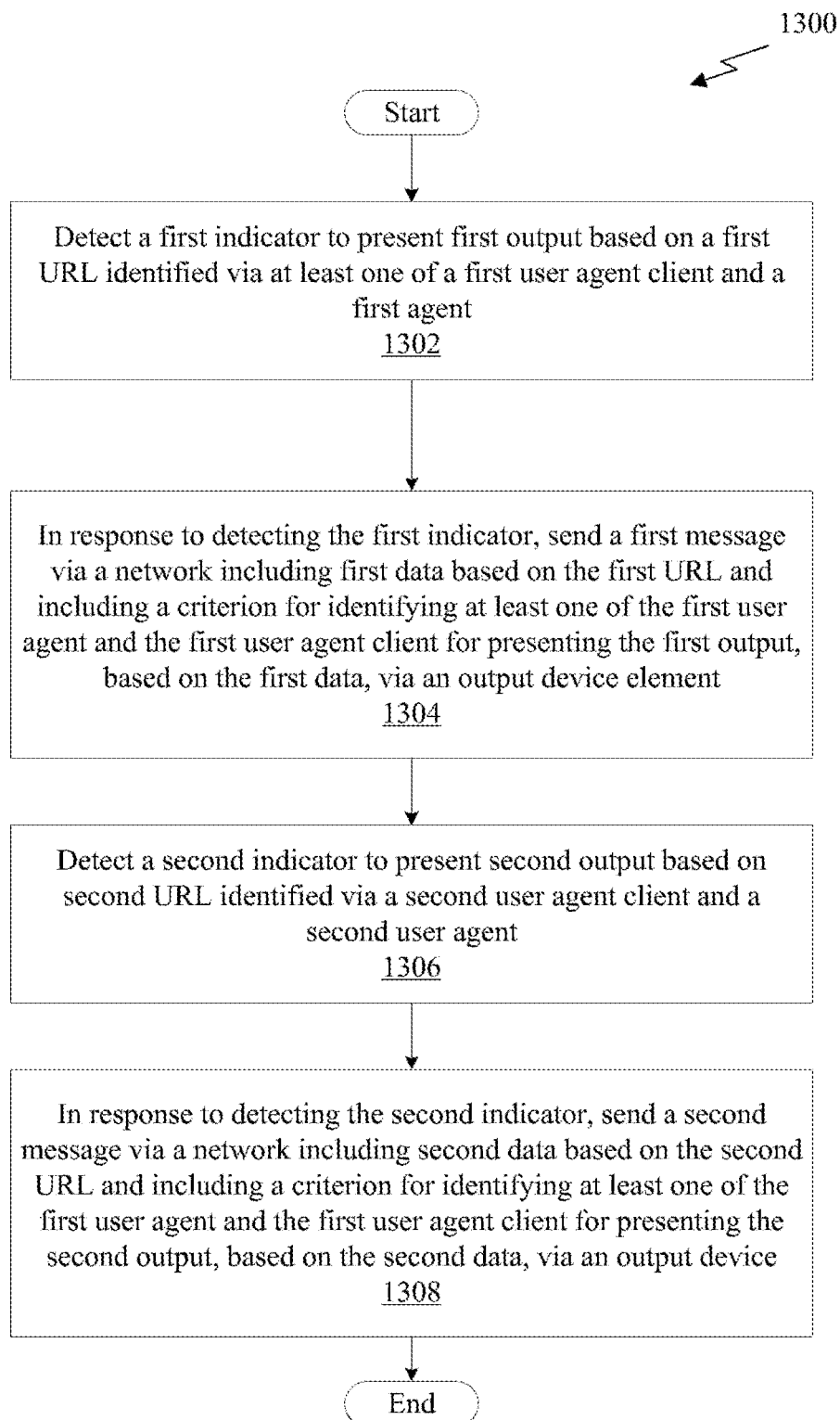
FIG. 13 shows a flow chart of a method in accordance with an embodiment of the subject matter described herein.

FIG. 13 shows a flow chart of a method 1300 in accordance with an embodiment. As an option, the method 1300 may be implemented in the context of the details of any of the foregoing figures. As shown in FIG. 13 at block 1302, where a first indicator to present first output based on a first URL identified via at least one of a first user agent client and a first user agent, is detected. At block 1304, in response to detecting the first indicator, a first message is sent via a network including first data based on the first URL and including a criterion for identifying at least one of the first user agent and the first user agent client for presenting the first output, based on the first data, via an output device. At block 1306, a second criterion to present second output based on second URL identified via at least one of a second user agent client and a second user agent, is detected. At block 1308, in response to detecting the second criterion, a second message is sent via a network including second data based on the second URL and including a criterion for identifying at least one of the first user agent and the first user agent client for presenting the second output, based on the second data, via an output device. The first data may include and/or otherwise identify the first URL and/or a first resource identified by the first URL. The second data may include and/or otherwise identify the second URL and/or a second resource identified by the second URL.

An operating environment suitable for including logic that when executed operates to perform the method 1300 may be implemented in and/or otherwise may include one or more client nodes 114 and/or server nodes 112 in FIG. 1A. FIGS. 5 and 6 illustrate operating environments that separately and/or together may include an arrangement of components including logic for performing the method 1300 illustrated in FIG. 13. For example, as described above, various embodiments of operating environment 500 in FIG. 5 may be modified from an operating environment 200 to include an arrangement of components including logic for performing the method 1300. Also as described above various embodiments of operating environment 600 in FIG. 6 may be modified from an operating environment 300 to include an arrangement of components including logic for performing the method 1300. Of course, however, logic for performing the method 1300 may be implemented in various embodiments in any suitable operating environment. Further, the aforementioned definitions may equally apply to the description below.

Figure 14:
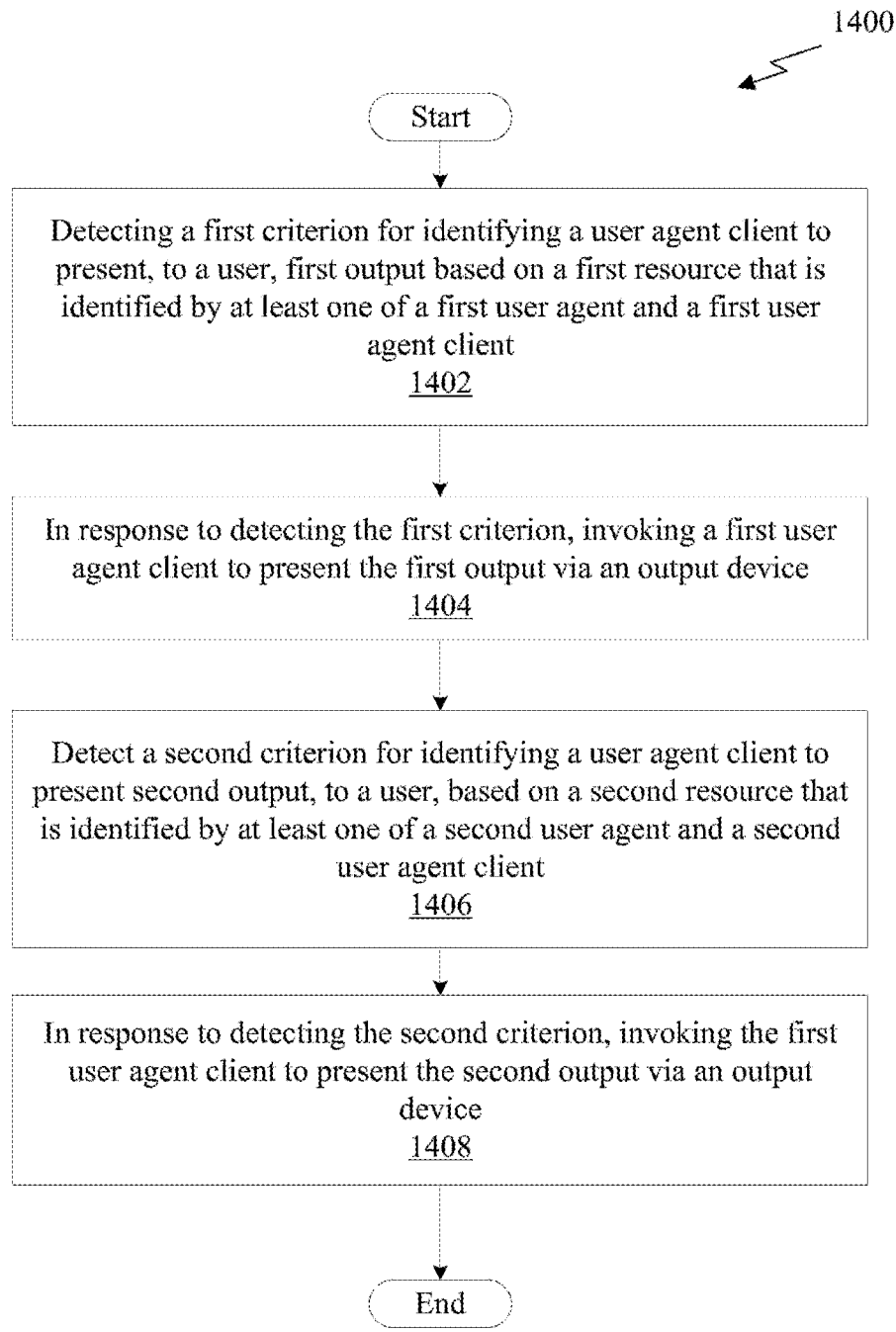
FIG. 14 shows a flow chart of a method in accordance with an embodiment of the subject matter described herein.

FIG. 14 shows a flow chart of a method 1400 in accordance with an embodiment. As an option, the method 1400 may be implemented in the context of the details of any of the foregoing figures. As shown in FIG. 14 at block 1402, a first criterion for identifying a user agent client to present, to a user, first output based on a first resource that is identified by at least one of a first user agent and a first user agent client, is detected. At block 1404, in response to detecting the first criterion, a first user agent client is invoked to present the first output via an output device. At block 1406, a second criterion for identifying a user agent client to present second output, to a user, based on a second resource that is identified by at least one of a second user agent and a second user agent client, is detected. At block 1408, in response to detecting the second criterion, the first user agent client is invoked to present the second output via an output device.

An operating environment suitable for including logic that when executed operates to perform the method 1400 may be implemented in and/or otherwise may include one or more client nodes 114 and/or server nodes 112 in FIG. 1A. FIGS. 5 and 6 illustrate operating environments that separately and/or together may include an arrangement of components including logic for performing the method 1400 illustrated in FIG. 14. For example, as described above, various embodiments of operating environment 500 in FIG. 5 may be modified from an operating environment 200 to include an arrangement of components including logic for performing the method 1400. Also as described above various embodiments of operating environment 600 in FIG. 6 may be modified from an operating environment 300 to include an arrangement of components including logic for performing the method 1400. Of course, however, logic for performing the method 1400 may be implemented in various embodiments in any suitable operating environment. Further, the aforementioned definitions may equally apply to the description below.

Figure 15:
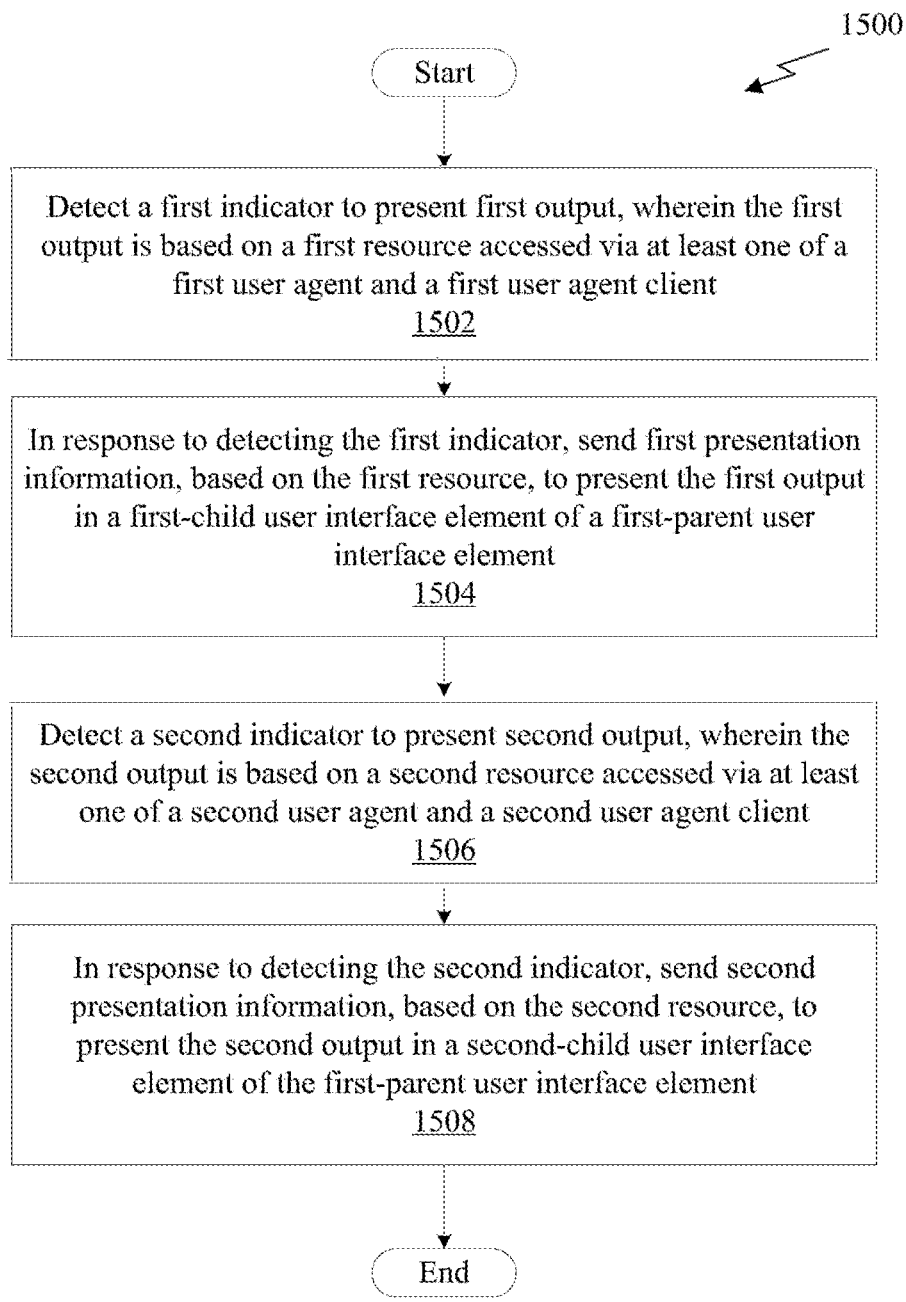
FIG. 15 shows a flow chart of a method in accordance with an embodiment of the subject matter described herein.

FIG. 15 shows a flowchart illustrating a method 1500, in accordance with an embodiment. As an option, the method 1500 may be implemented in the context of the details of any of the foregoing figures. As shown in FIG. 15 at block 1502 a first indicator is detected to present first output. The first output is based on a first resource accessed via at least one of a first user agent and a first user agent client. At block 1504, in response to detecting the first indicator, first presentation information, based on the first resource, is sent to present the first output in a first-child user interface element of a first-parent user interface element. At block 1506, a second indicator is detected to present second output. The second output is based on a second resource accessed via at least one of a second user agent and a second user agent client. At block 1508, in response to detecting the second indicator, second presentation information, based on the second resource, is sent to present the second output in a second-child user interface element of the first-parent user interface element.

Figure 16:
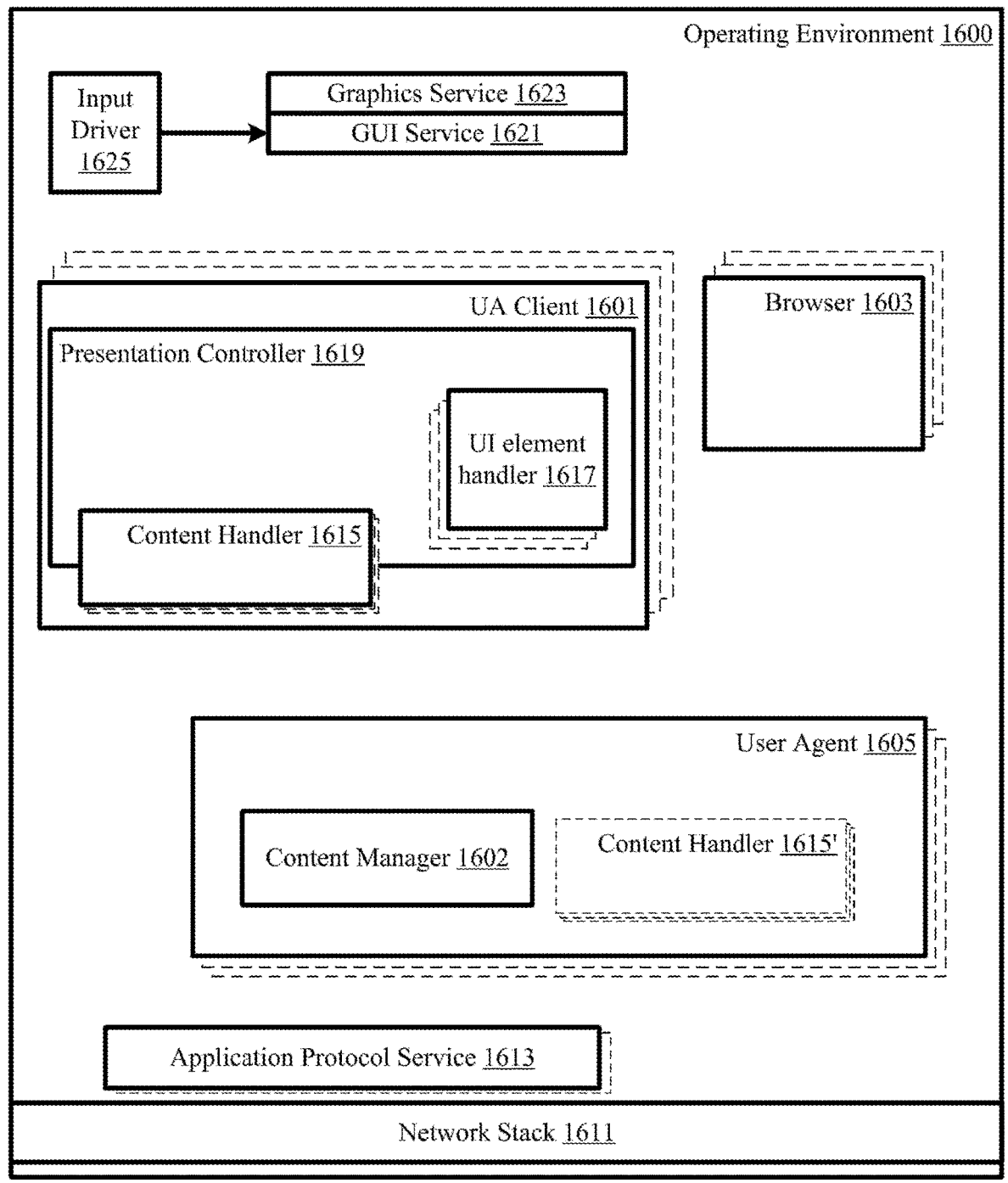
FIG. 16 shows a block diagram illustrating an arrangement of components that may include logic for performing one or more of the methods described herein.
Figure 17:
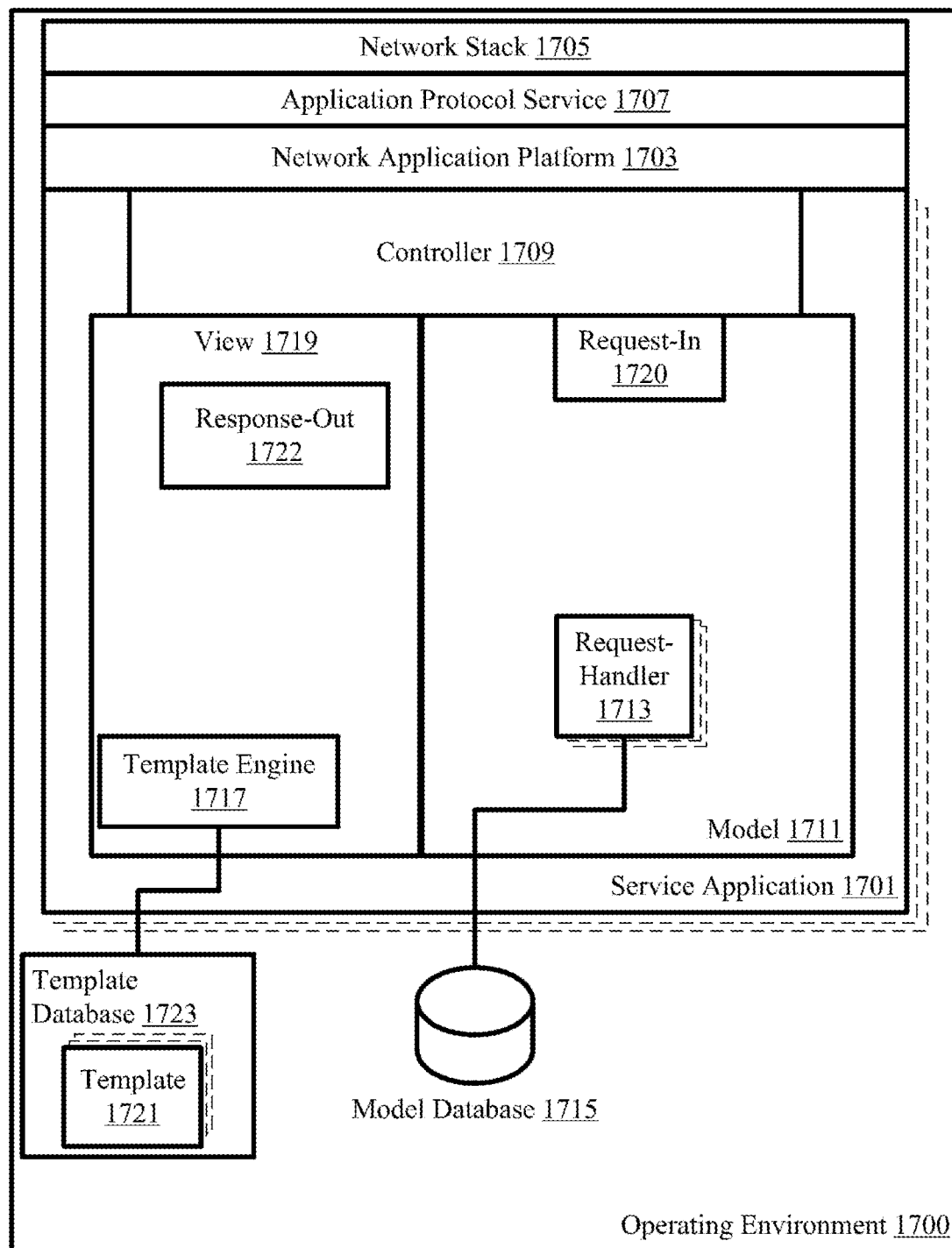
FIG. 17 shows a block diagram illustrating an arrangement of components that may include logic for performing one or more of the methods described herein.

An operating environment suitable for including logic that when executed operates to perform the method 1500 may be implemented in and/or otherwise may include one or more client nodes 114 and/or server nodes 112 in FIG. 1A. FIGS. 16 and 17 illustrate operating environments that separately and/or together may include an arrangement of components including logic for performing the method 1500 illustrated in FIG. 15. FIG. 16 illustrates an operating environment 1600 modified from an operating environment 200 to include an arrangement of components including logic for performing the method 1500. FIG. 17 illustrates an operating environment 1700 modified from an operating environment 300 to include an arrangement of components including logic for performing the method 1500. Of course, however, logic for performing the method 1500 may be implemented in various embodiments in any suitable operating environment. Further, the aforementioned definitions may equally apply to the description below.

As described with respect to operating environment 500, an operating environment 1600 may analogously include logic to perform the method 1500 in, for example, a user agent client 1601, a user agent 1605, and/or in an application protocol service 1613. An operating environment 1700 may include logic to perform the method 1500 in, for example, a service application 1701, a network application platform 1703, and/or in an application protocol service 1707. Logic to perform block 1502 and/or block 1506 may be included, for example, in a user interface element handler component 1617 in a user agent client 1601, a content handler component in a user agent 1605, and/or in a browser 1603.

Invoking a user agent client may be performed by interoperating with the user agent client directly and/or indirectly. As has been described above, logic to perform block 1504 and/or block 1508 may be included in a user agent client 1601 that accesses a resource by interoperating with a user agent 1605 to send a request for the resource, by the user agent 1605 that interoperates with an application protocol service 1613 to send the request to a service application 1701, by the service application 1701 that returns the resource in a response, by a user agent 1605 that receives the resource returned in the response, and by a user agent client 1601 that may receive a receive the resource, a translation of the resource, a transformation of the resource, and/or other representation of the resource. Logic to perform block 1504 and/or block 1508 may be included in a content handler component 1615 in a user agent client 1601, in content manager 1602 in a user agent 1605, and/or in a browser 1603.

The method 1500 may be performed by a user agent 1605 and/or a user agent client 1601 of a client node 114 of an operating environment 1600 illustrated including logic in components, as described, illustrated in FIG. 16. With respect to FIG. 16, a first user agent 1605 and/or a user agent client 1601 may include logic that when executed operates to perform the method 1500. Listing 1 and listing 2 above each illustrate pseudo-code from which source code may be written that is translatable to logic that may be included and/or accessible to a user agent implemented to perform the method 1500 as is listing 7 below.

Listing 7—User Agent
1. handleResponse(resource) {
2. pinfo=prepare(resource);
3. firstUserAgentClient.present(pinfo);
4. }

Logic that when executed operates in performing block 1502 may be included a content manager 1602 in the first user agent 1605 and/or otherwise may be included to interoperate with the first user agent 1605. The content manager 1602 component may receive the first resource from logic in an HTTP protocol layer 1613 that processes the message received by the client node 114 via a network interface. Content manager 1605 may include logic that invokes a handleResponse( ) method, function, or other type of code block. See line 1 in listing 7. In line 2 a prepare( ) code block is invoked to translate, transform, and/or otherwise generate presentation information to provide to a user agent client 1601 as described above. Access the presentation information may be provided by a pointer or other reference, identified as pinfo in listing 7. In the first user agent 505, line 3 specifies that logic is hardcoded to invoke a first user interface client 501. In one scenario, a criterion for identifying the first user agent 505 to receive a response to a request for the first resource may be identified by the first user agent client 501 and/or by the first user agent 505 included in sending a request for the first resource to a service application in a server node 112. Logic based on pseudo-code such as illustrated in listing 7 may be included in the first user agent 505 that processes the response. Similarly, a criterion for identifying the first user agent 505 to receive a response to a request for a second resource may be identified by a second user agent client 501 and/or by a second user agent 505 included in sending a request for the second resource to a service application in a server node 112. The logic in the first user agent 505 that processed the response including the first resource may also process the response including the second resource. In both cases, the first user agent client is invoked.

Logic generated from pseudo-code such as in listing 1 and/or in listing 2 may be included in an HTTP protocol layer component 1613 as described above. Alternatively, logic generated from pseudo-code in listing 7 may be included in an application protocol service 1613.

A user agent client 1601 may present output, based a resource sent from service application in a server node 112 and received in a response via network interface and stack 1611 communicatively coupling a client node 114 to a network 110. The output may be presented in a user interface element in a presentation space of an output device of the client node 114. The response may identify the user agent client 1601 and/or may otherwise include information that is included in directing the resource included in the response and/or a transformation of the resource in the response to the user agent client 1601 instead and/or in addition to another user agent client. In an option, the response may be directed to a first user agent client 1601 in the client node 114. The response may be sent to first user agent 1605 or to a second user agent 1605 to interoperate with the first user agent client 1601 as directed.

A user agent client 1601 may include and/or otherwise may interoperate with logic that when executed operates in performing the method 1500. Listing 3 above illustrates pseudo-code for generating logic that may be included and/or otherwise accessible to a user agent client implemented to perform the method 1500. Listing 8 provides another example of pseudo-code that may be included and/or otherwise accessible to a user agent client implemented to perform the method 1500.

Listing 8—User Agent Client
. . .
1. case (event.getType( ) {
. . .
2. Get:
3. Id=event.getResourceIdentifier( );
4. firstUserAgent.sendRequest(identifier);
. . .

Note that in listing 8, as opposed to listing 3, the user agent client 501 is hard-coded to invoke a first user agent 505 to send a request for a resource identified via an event, such as a user input detected via an input device. A response to the request from the first user agent 505 may automatically be returned to the first user agent 505 to process. Further the first user agent 505 may include logic that invokes the first user agent client 501. That is, the invocation of the first user agent client 501 may be hard-coded, as well. In one scenario, the first user agent client 501 or a second user agent client 501 may include logic derived from the pseudo-code in listing 8 and/or otherwise may include analogous logic to invoke the first user agent 501 to request a first resource. As a result, the first user agent 505 receives a response to the request for the first resource and invokes the first user agent client 501. The other one of first user agent client 501 or a second user agent client 501 that initiated the first request may include logic derived from listing 8 and/or functionally equivalent logic that invokes the first user agent 505 to send a request for a second resource to service application. As a result, the first user agent 505 receives a response to the request for the second resource and invokes the first user agent client 501.

A user agent 1605 may include and/or otherwise may interoperate with logic that when executed operates in performing the method 1500. Listing 4 above illustrates pseudo-code for generating logic that may be included and/or otherwise accessible to a user agent client implemented to perform the method 1500. Listing 9 below provides another example of pseudo-code that may be included and/or otherwise accessible to a user agent client implemented to perform the method 1500.

Listing 9 illustrates pseudo-code for generating logic that may be included and/or accessible to a user agent implemented to perform the method 1500.

Listing 9—User Agent 1. sendRequest(identifier, uaInfo) {
2. request=new Request(identifier);
3. targetUAC=uaId;
4. request.addCriterion(targetUAC, firstUAId);
5. request.send( );
6.}

Note that in listing 9, as opposed to listing 4, the user agent 501 includes logic to identify and/or otherwise create a criterion based on a value of an addressable entity such as "uaId" (see line 3 in listing 9). The addressable entity may be constant, as specified in source code, generated based on listing 9. The constant may be set to identify a first user agent client 501. In other logic implementing the pseudo-code in listing 9, the addressable entity, "uaId", may be variable. The variable may be set by a user, determined based on a location, a service application, a type of a resource, and the like. The variable may be set at run-time and/or may be read from data stored in persistent memory as configuration data and/or metadata for one or more user agents. In a scenario, the first user agent 501 may include logic derived from the pseudo-code in listing 9 and/or otherwise may include analogous logic to send a request. The addressable entity may include a value that identifies the first user agent client 501 for presenting output based on a response to the request. Line 4 corresponds to logic that adds a criterion for identifying a user agent client 501 and sets a value of the criterion to identify the first user agent client 501. Logic in the first user agent 501 that corresponds to line 1 may be invoked by a first user agent client. Similarly, a second user agent client 501 may invoke the first user agent 501 to send a request for a second resource. The addressable entity, "uaId", may be set to identify the first user agent client so that the first user agent 505 sends a request for the second resource where the request includes a criterion that identifies the first user agent client for presenting output based on the second resource. Alternatively or additionally, a second user agent 505 may include logic derived from the pseudo-code in listing 9 and/or otherwise may include analogous logic to send a request. The addressable entity may include a value that identifies the first user agent client 501 for present output based on a response to the request. Line 4 corresponds to logic that adds a criterion for identifying a user agent client 501 and sets a value of the criterion to identify the first user agent client 501. Logic in the second user agent 501 that corresponds to line 1 may be invoked by a first user agent client 501 or by a second user agent client 501.

In FIG. 17, logic for performing the method 1500 may be implemented in and/or may be otherwise accessible to a service application 1701, a network application platform 1703, and/or an application layer service 1707 in an operating environment 1700. An operating environment 1700 may be an operating environment of a server node 112. The operating environment 1700 may in include logic to perform the method 1500 arranged in components, as described, illustrated in FIG. 6. Listing 5 above illustrates pseudo-code for generating logic that may be included and/or otherwise accessible to a user agent client implemented to perform the method 1500. Listing 10 below provides another example of pseudo-code that may be included and/or otherwise accessible to a user agent client implemented to perform the method 1500.

Listing 10—Service application
1. {
. . .
2. identifier=request.getID( );
3. resource=model.getResource(identifier);
4. pInfo=view.template(resource);
5. targetUAC=requestGetTargetUAC( );
6. response=new Response(identifier, pinfo);
7. response.setTargetUAC(targetUAC);
8. response.send( );
. . .
9.}

Note that in listing 10, as opposed to listing 5, the service application 1701 includes logic to receive a criterion for identifying a user agent client from a request and sets a criterion identifying the user agent client in a response returned to a client node 114 that sent the request. In a scenario, the service application may receive a first request for a first resource identified by a first user agent client and/or sent by a first user agent in the client node 114. A criterion identified by one or both of the initiating user agent client and the sending user agent may result in a criterion set in the request for the first resource that identifies the first user agent client. As described, logic in the service application 1701 generated based on and/or functionally equivalent to the pseudo-code in listing 10 operates to send a criterion identifying the first user agent client in a response to the first request. Similarly, the service application may receive a second request for a second resource identified by a second user agent client and/or sent by a second user agent in the client node 114. A criterion identified by one or both of the initiating user agent client and the sending user agent results in a criterion set in the request for the second resource that identifies the first user agent client. As before, logic in the service application 1701 generated based on and/or functionally equivalent to the pseudo-code in listing 10 operates to send a criterion identifying the first user agent client in a response to the second request.

Listing 6 above illustrates pseudo-code for generating logic that may be included and/or otherwise accessible to an application protocol service may be written and/or derived from analogous pseudo-code for a client node 114 implemented to perform the method 1500. Those skilled in art will see, based on the descriptions and drawings of the present disclosure that other pseudo-code may be expressed for performing the method 1500 by an application protocol service as illustrated above with respect to pseudo-code for user agents, user agent clients, and service applications. Those skilled in the art will also know based on the descriptions and drawings of the present disclosure that corresponding additional and/or alternative pseudo-code may be expressed for logic in and/or otherwise accessible to an application protocol service, a network application, and/or controller of service application may be written and/or derived from analogous pseudo-code modified for the role of the server node 112 to perform the method 1500.

Figure 18:
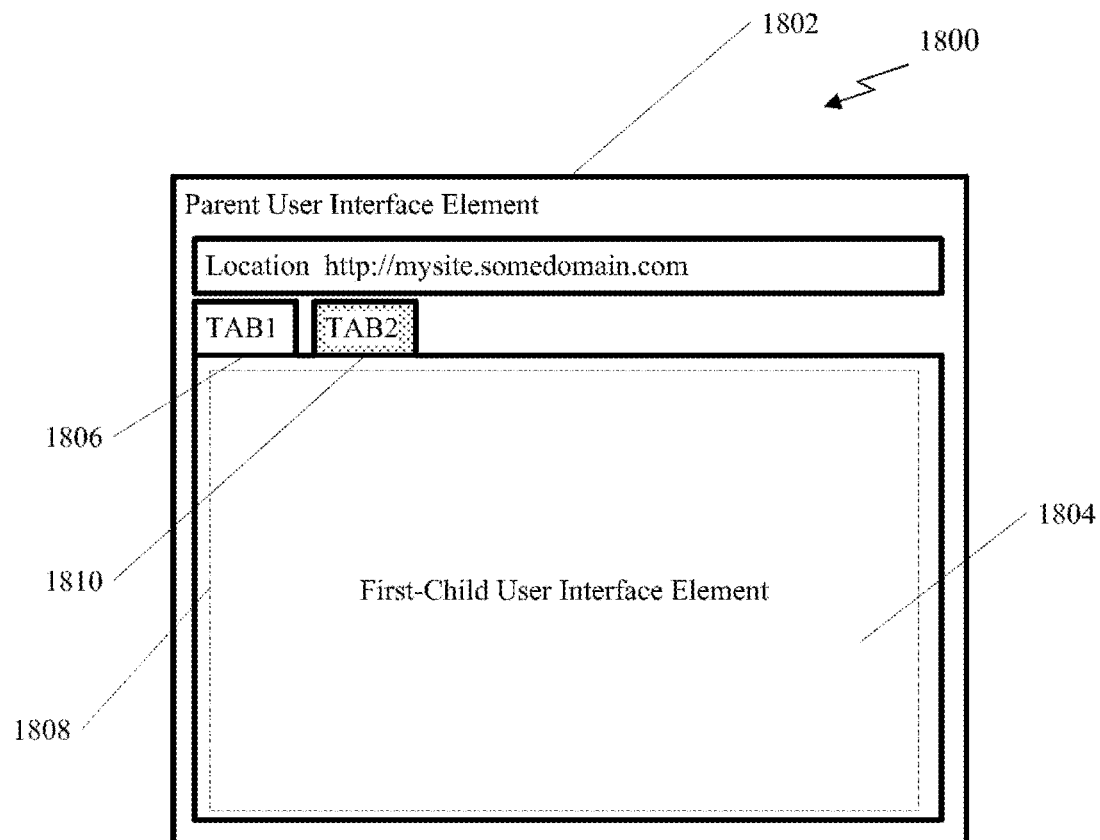
FIG. 18 shows a diagram illustrating user interface elements, in accordance with an embodiment.

FIG. 18 illustrates an exemplary user interface 1800 that may be presented by a user agent client according to the method in FIG. 15. With respect to FIGS. 16 and 18, a first user agent client 1601 may send presentation information to present a parent user interface element 1802. The first user agent client 1601 may operate in a first computing process of operating environment that also includes the first user agent client 1601 in FIG. 16. The first user agent 1605 may operate in the first process to detect and/or identify a criterion to present first output based on a first resource received and/or otherwise identified by the first user agent 1605 and/or thee first user agent client 501. The criterion may identify the first user agent client 501 for presenting the first output. The first user agent 1605 may invoke, for example via function call, logic in the first user agent client 1601 to send first presentation information based on the first resource to present the first output in a first child user interface element 1804 corresponding to a first tab user interface element 1806 of the first user interface element 1802. A second user agent 1605 may operate in a second computing process that includes a second browser 1603. The second user agent 1605 may detect a criterion for presenting second output based on a second resource received and/or otherwise identified by the second user agent 1605. In an option, the second user agent 1605 may interoperate, based on the criterion, with the first user agent client 1605, for example via an interprocess communication mechanism, to execute logic in the first user agent client 1605 operating in the first computing process to send second presentation information to present the output based on the second resource in a in a second child user interface element 1808 (hidden behind the first child user interface element 1804 in FIG. 18, The second child user interface element corresponds to a second tab 1810.

In another embodiment, the first user agent client 501 may present the first output in a first user interface element and the second output in a second user interface element that share no parent user interface element excluding a desktop user interface element. Still further, the first user agent client 501 may present the first output in a first user interface element and the second output in the first user interface element at different times. The first user interface element may a tab, pane, window, and/or any other user interface element including a presentation space suitable for the first output and the second output presented during time periods that do not overlap.

Figure 19:
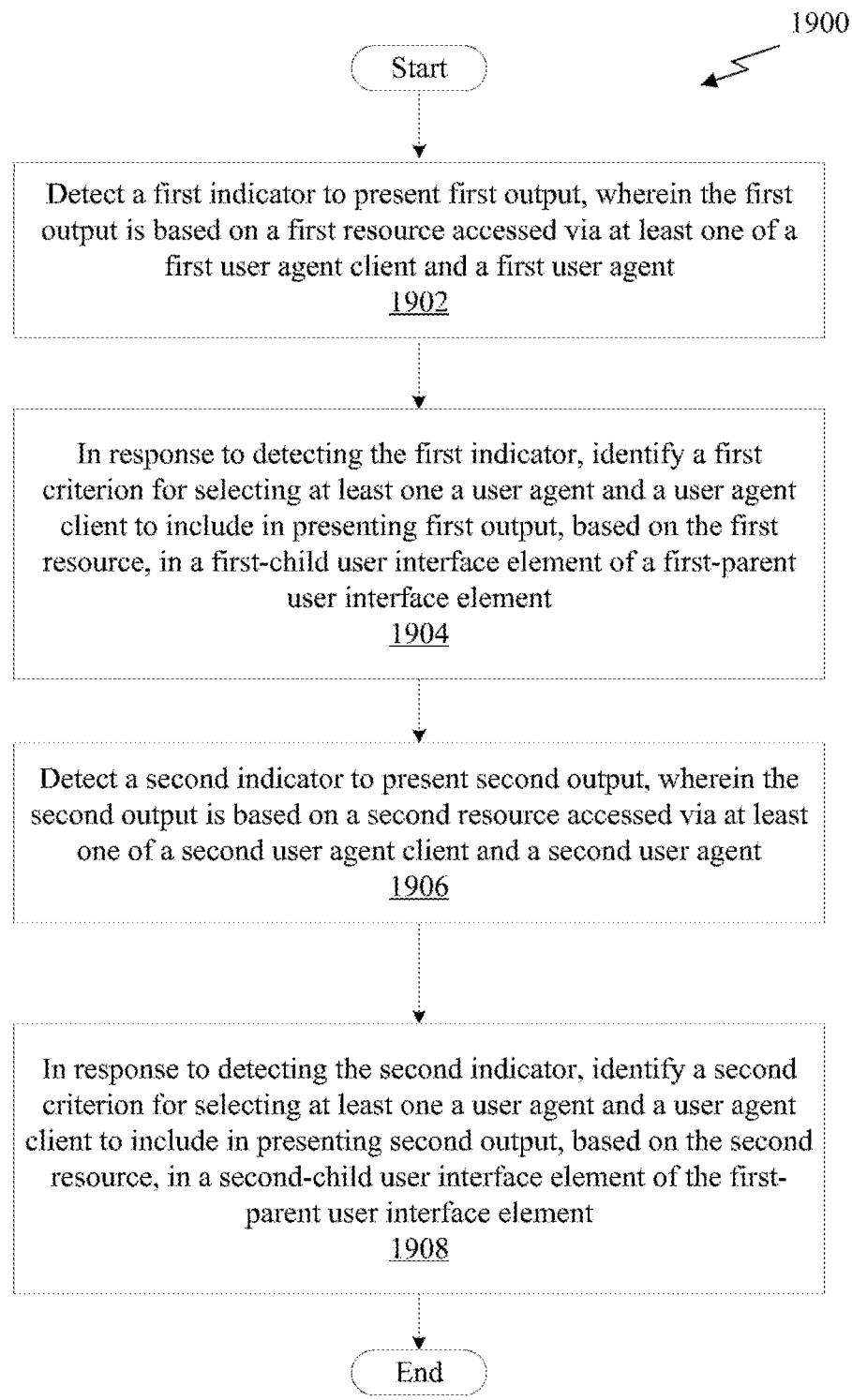
FIG. 19 shows a flow chart of a method in accordance with an embodiment of the subject matter described herein.

FIG. 19 shows a flow chart of a method 1900 in accordance with an embodiment. As an option, the method 1900 may be implemented in the context of the details of any of the foregoing figures. As shown in FIG. 19 at block 1902, a first indicator is detected to present first output is detected. The first output is based on a first resource accessed via at least one of a first user agent and a first user agent client. At block 1904, in response to detecting the first indicator, a first criterion is identified for selecting at least one a user agent and a user agent client to include in presenting first output, based on the first resource, in a first-child user interface element of a first-parent user interface element. At block 1906, a second indicator is detected to present second output. The second output is based on a second resource accessed via at least one of a second user agent and a second user agent client. At block 1919, in response to detecting the second indicator, a second criterion is for selecting at least one a user agent and a user agent client to include in presenting second output, based on the second resource, in a second-child user interface element of the first-parent user interface element.

An operating environment suitable for including logic that when executed operates to perform the method 1900 may be implemented in and/or otherwise may include one or more client nodes 114 and/or server nodes 112 in FIG. 1A. FIGS. 16 and 17 illustrate operating environments that separately and/or together may include an arrangement of components including logic for performing the method 1900 illustrated in FIG. 19. For example, as described above, various embodiments of operating environment 1600 in FIG. 16 may be modified from an operating environment 200 to include an arrangement of components including logic for performing the method 1900. Also as described above various embodiments of operating environment 1700 in FIG. 17 may be modified from an operating environment 300 to include an arrangement of components including logic for performing the method 1900. Of course, however, logic for performing the method 1900 may be implemented in various embodiments in any suitable operating environment. Further, the aforementioned definitions may equally apply to the description below.

Figure 20:
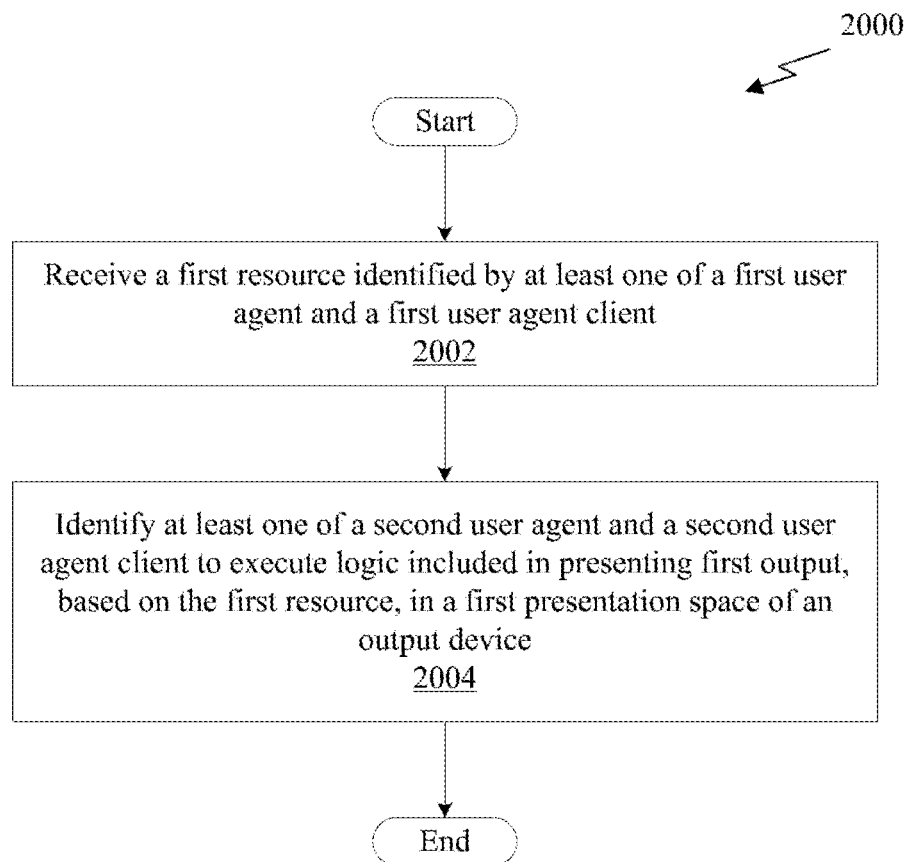
FIG. 20 shows a flow chart of a method in accordance with an embodiment of the subject matter described herein.

FIG. 20 shows a flow chart of a method 2000 in accordance with an embodiment. As an option, the method 2000 may be implemented in the context of the details of any of the foregoing figures. As shown in FIG. 20 at block 2002, a first resource, identified by a first user agent and/or identified by a first user agent client, is received. At block 2004, a second user agent and/or a second user agent client is identified to execute logic included in presenting first output, based on the first resource, in a first presentation space of an output device.

Figure 21:
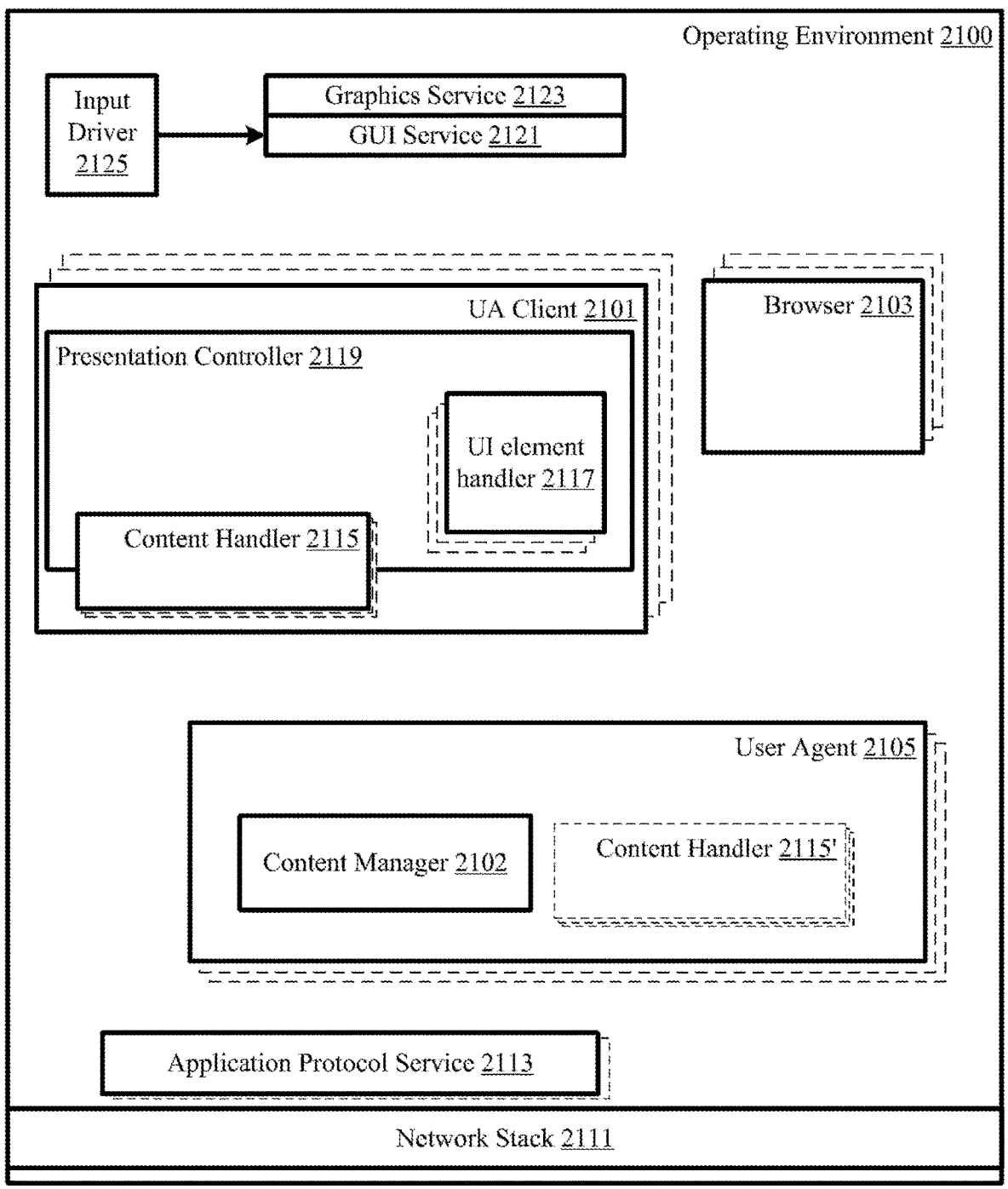
FIG. 21 shows a block diagram illustrating an arrangement of components that may include logic for performing one or more of the methods described herein.
Figure 22:
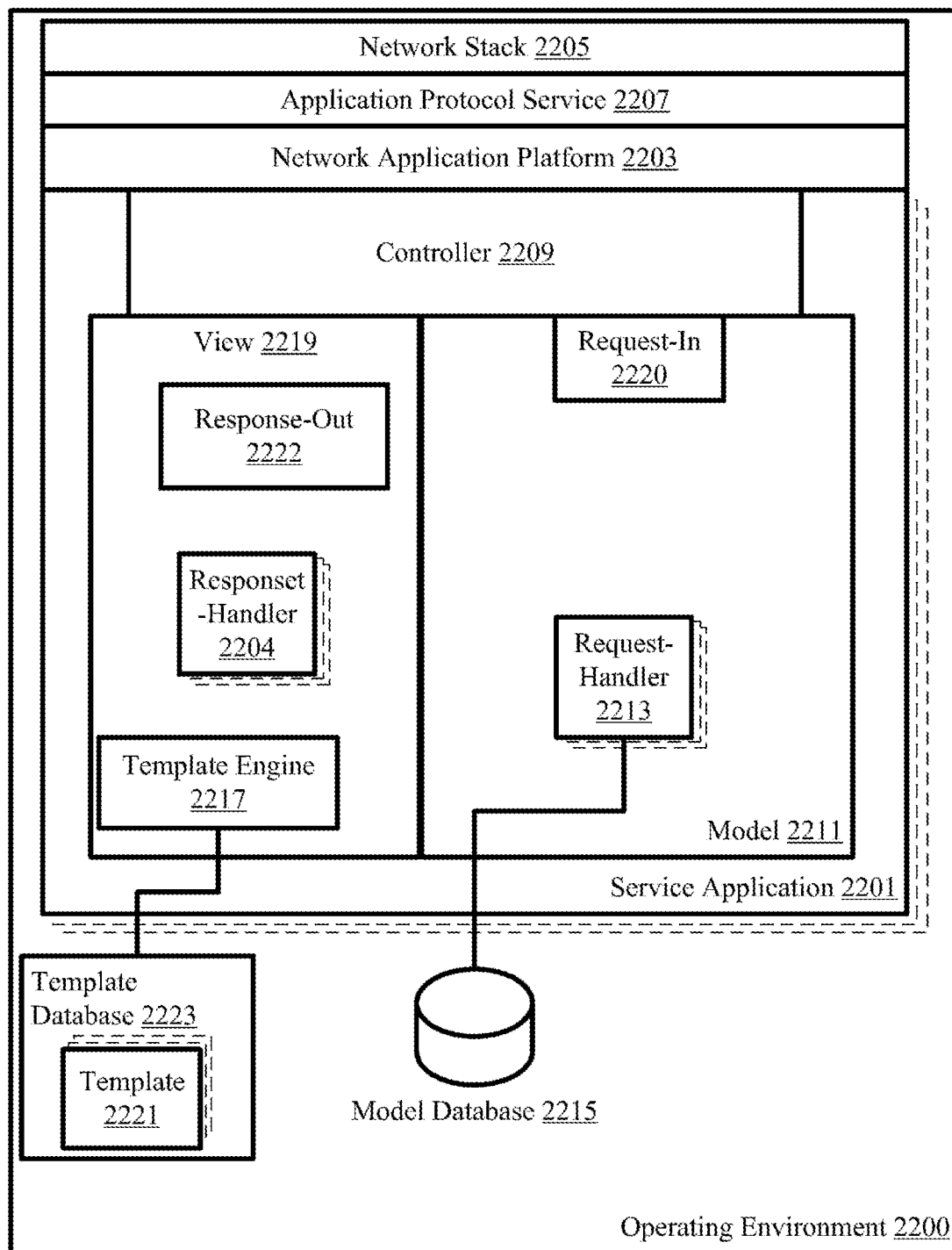
FIG. 22 shows a block diagram illustrating an arrangement of components that may include logic for performing one or more of the methods described herein.

An operating environment suitable for including logic that when executed operates to perform the method 2000 may be implemented in and/or otherwise may include one or more client nodes 114 and/or server nodes 112 in FIG. 1A. FIGS. 21 and 22 illustrate operating environments that separately and/or together may include an arrangement of components including logic for performing the method 2000 illustrated in FIG. 20. FIG. 21 illustrates an operating environment 2100 modified from an operating environment 200 to include an arrangement of components including logic for performing the method 2000. FIG. 22 illustrates an operating environment 2200 modified from an operating environment 300 to include an arrangement of components including logic for performing the method 2000. Of course, however, logic for performing the method 2000 may be implemented in various embodiments in any suitable operating environment. Further, the aforementioned definitions may equally apply to the description below.

As described with respect to operating environment 500, an operating environment 2100 may analogously include logic to perform the method 2000 in, for example, a user agent client 2101, a user agent 2105, and/or in an application protocol service 2113. An operating environment 2200 may include logic to perform the method 2000 in, for example, a service application 2201, a network application platform 2203, and/or in an application protocol service 2207. Logic to perform block 2002 may be included, for example, in a user interface element handler component 2117 in a user agent client 2101, a content handler component in a user agent 2105, and/or in a browser 2103.

For example, as shown in FIG. 21, the logic for performing the method 2000 may be implemented within a user agent 2105 and/or a user agent client 2101. A user agent 2105 and user agent client 2101 may be included in a same browser 2103 or other type of application. Alternatively or additionally, a user agent 2105 and user agent client 2101 that interoperate may be included in separate browsers 2101 and/or other types of application.

The method 2000 may be performed by a user agent client 2101 of a client node 114. With respect to FIG. 21, a first user agent client 2101 may include logic that when executed operates in performing block 2002 included in a user interface element handler component 2117 that identifies a first resource by receiving input information. The input information may be received and/or otherwise identified in response to a user input, that corresponds to a first hyperlink and/or other output presented in a user interface to a user. Alternatively or additionally, logic that when executed operates in performing block 2002 may be included in a content handler component 2115, such an HTML content handler that maintains a model of the markup that corresponds to a user interface element that represents the first hyperlink. The first hyperlink may identify a first URL. The logic in the first user agent client 2101 may detect an attribute associated with the hyperlink, such as described above and illustrated in FIG. 8. The first user agent client 2101 may determine that a first resource corresponding to the first hyperlink is to be represented in a user interface presented via a second user agent client 2101. The first user agent client 2101 may interoperate with a user agent 2105 to send via logic that when executed operates in performing block 2004 or analogous logic. Such logic may be included in a content handler component 2104 in and/or otherwise accessible to the first user agent client 2101. The logic may be executed to interoperate with the user agent 2105 to send a request to a server node 112. The request may identify the first URL and may include an HTTP header criterion and/or a criterion in a body portion of the request for identifying and/or selecting a second user agent client 2101 to present first output based on a first resource received in a response from the server node 112 in response to the request. HTTP criteria and criteria that may be included in a body of an HTTP message are described above and illustrated in FIGS. 7A, 7B, 8A, 8B, 9A, and 9B.

A first user agent client 2101 may similarly interoperate with a first user agent 2105 or with a second user agent 2105 to send an HTTP request. The first user agent client 2101 may identify a criterion to identify a second user agent client 2101 in interoperating with the first user agent 2105. The criterion may be included in a request to a server node 112. The first user agent client 2101 may identify, in interoperating with the second user agent 2105, a criterion that identifies the second user agent client 2101 for presenting output based on a response to the request sent to the server node 112. Alternatively or additionally, the first user agent client 2101 may interoperate with the first user agent 2105 to provide a criterion for identifying the second user agent 2105 for receiving the response to a request sent by the first user agent 2105. The second user agent client 2101 may be indirectly identified by the first user agent client 2101 via the criterion that identifies the second user agent 2105. Still further, in addition to providing one or more criteria directly and/or indirectly to the first user agent 2105 or to the second user agent 2105, the first user agent client 2101 may provide a criterion that indicates that the second user agent 2105 is to interoperate with the first user agent client 2101 to present output based on a resource received in the response from the server node 112.

Yet further, a user agent client 2101 may interoperate with a first user agent 2105 to send an HTTP request. The user agent client 2101 may identify a second user agent 2105 in interoperating with the first user agent 2105 to include a criterion in a request to a server node 112. In an option, the criterion may indicate that the second user agent 2105 is to receive the response to the request sent by the first user agent 2105. The second user agent 2105 may interoperate with the user agent client 2101 to present output based on a resource received in the response from the server node 112.

Alternatively or additionally, the method 2000 may be performed by a user agent 2105 of a client node 114 of an operating environment 2100 illustrated in FIG. 21. A user agent 2105 may include logic and/or otherwise may access logic for performing the method 2000 in one or more components in and/or otherwise accessed by a user agent client. A user agent client 2101 may identify a first URL to a first user agent 2105 to send a request to a server node 112 to access a first resource identified by the first URL. The first user agent 2105 may operate to identify a user agent to receive a response from the server node 112 to a request to be sent in response to receiving the first URL. In an option, logic in the first user agent 2105 may determine that a second user agent 2105 is to receive the response based on a criterion and/or criterion received from the user agent client 2101. Alternatively or additionally the first user agent 505 may include logic to determine a user agent based on a hyperlink accessed via the user agent client 2101, based on a resource identified by the hyperlink, and/or based on any suitable resource accessible to the first user agent 2105. The first user agent 2105 may determine that the first resource corresponding to the first URL that is returned in a response to the request to be sent is to be processed by the second user agent 2105. The first user agent 2105 may send the request that includes one or more criteria that indicates that the response is to be directed to the second user agent 2105. The second user agent 2105 may interoperate the user agent client 2101 to send presentation information to present output, based on a resource received in the response, via an output device.

In a variation, with respect to FIG. 21 a first user agent 2105 may similarly interoperate with a first user agent client 2101 to send an HTTP request. The first user agent 2105 may identify a second user agent client 2101 and/or a second user agent 2105 as has been described above. The first user agent 2105 or the second user agent 2105 may include a criterion in a request to a server node 112 that identifies and/or is otherwise included in selecting the second user agent client 2101 and/or the second user agent 2105. The first user agent 2105 may indicate that the second user agent client 2101 is to present output based on a response to the request sent to the server node 112. Alternatively or additionally, the first user agent 2105 may operate to include a criterion in the HTTP request corresponding to a response that the second user agent 2105 is to receive. The HTTP request may be sent by the first user agent 2105. The second user agent client 2101 may be indirectly identified by the first user agent 2105 via the criterion included in identifying the second user agent 2105. Still further, in an option, in addition to providing a criterion for identifying and/or selecting the second user agent 2105 to the server node 112, the first user agent 2105 may provide the same and/or a different criterion to direct that the second user agent 2105 is to interoperate with the first user agent client 2101 to present output based on a resource received in the response from the server node 112.

Yet further, with respect to FIG. 21, a user agent 2105 may interoperate with a first user agent client 2101 to send an HTTP request. The user agent 2105 may identify a second user agent client 2101 via a criterion included in a request to a server node 112. The criterion may be included in identifying that the user agent 2105 is to receive the response to the request and interoperate with a second user agent client 2101 to present output based on a resource received in the response from the server node 112.

Still referring to FIG. 21, a first user agent client 2101 may include and/or otherwise may interoperate with logic that when executed operates in performing block 2002. For example, a component including the logic may be included in and/or otherwise may interoperate with a content handler component 2115 or a content manager component 2102 to receive input information in response to a user input corresponding to a web page presented by the first user agent client 2101. The input information may identify a first URL that identifies a first resource. A resource for presenting the web page may be received from a user agent 2105 in response to receiving a message from a server node 112. The logic for block 2002 may interoperate with logic for block 2004 that when executed operates to identify at a second user agent client 2101 to execute logic included in presenting first output, based on the first resource, in a first presentation space of an output device.

Alternatively or additionally, the user agent 2105 may include and/or otherwise may interoperate with logic that when executed operates in and/or interoperates with an HTTP application protocol service 2113 to receive the first resource returned in a response to the request described in the previous paragraph or in some other message from a server node 112. The response may include a criterion processed by logic that when executed operates in performing block 2004, which may operate to identify the second user agent client 2101 to present first output, based on the first resource, in a first presentation space of an output device. The user agent 2105 may operate to select the second user agent client 2101 based on any data accessible to the user agent client 2105. The second user agent client 2101 may be selected and/or identified by an identifier included in the response. The second user agent client 2101 may be selected and/or identified based on detecting a condition determined based on a criterion included in the response and/or otherwise accessible to the user agent 2105.

Alternatively or additionally, the method 2000 may be performed by a service application 2201 of a server node 112 of an operating environment 2200. A service application 2201 may include logic, such as illustrated, for example by service application 2201 in FIG. 22, and/or may include additional and/or alternative logic that may be included in a different arrangement. A service application 2201 may include logic that when executed operates in performing block 2002 included in and/or otherwise accessible to a request handler component 2213. The request handler component 2213 may operate to receive and/or otherwise access a first resource identified by at least a first user agent and/or a first user agent client in a client node 114. The service application 2201 may receive a request identifying the first resource from the client node 114. The service application 2201 may include logic that when executed operates in performing block 2004 included in and/or otherwise accessible to a response handler 2204 in a view service 2219. The response handler 2204 may operate to identify a second user agent and/or a second user agent client to execute logic included in presenting first output, based on the first resource, in a first presentation space of an output device. A response to the request may be sent by a response out component 2222. The response may identify the second user agent and/or the second user agent client. The response may include one or more criteria for identifying and/or selecting, by the client node 112, the second user agent and/or the second user agent client.

Logic in a response handler component 2204 may identify a user agent and/or user agent client based on one or more identifiers and/or criteria included in a request message from a client node 114. Logic may be included that identifies and/or otherwise provides a criterion for identifying a different user agent and/or user agent client than indicated in a request message. Logic may be included to identify and/or otherwise provide a criterion for identifying a user agent and/or a user agent client based on a request from a client node, the client node, a user, a configuration setting of the service application, a network location, a network metric, a network path, and/or based on any resource accessible to the service application that is suitable for a desired objective of service application.

In an option, a request handler component 2204 and/or a response-out component 2222 may provide information to a controller 2209 to identify a network interface, a port, a session, and/or other network protocol attribute that may be included in identifying a user agent and/or a user agent client in a client node 114.

Figure 23:
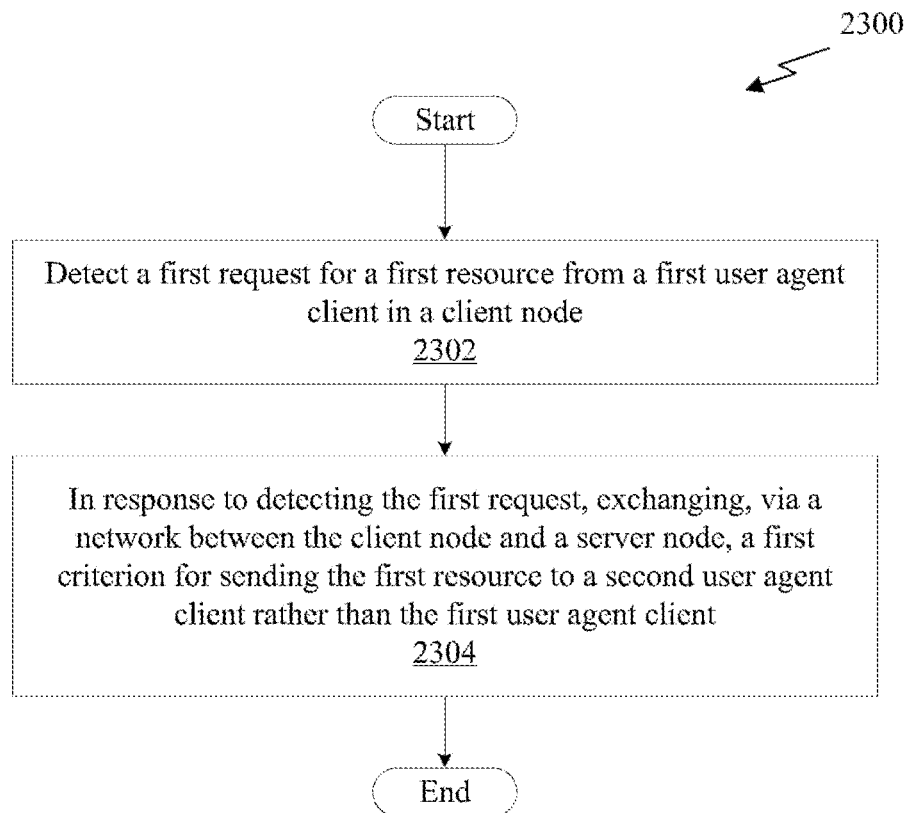
FIG. 23 shows a flow chart of a method in accordance with an embodiment of the subject matter described herein.

FIG. 23 shows a flow chart of a method 2300 in accordance with an embodiment. As an option, the method 2300 may be implemented in the context of the details of any of the foregoing figures. As shown in FIG. 23 at block 2302, a first request for a first resource from a first user agent client in a client node is detected. At block 2304, in response to detecting the first request, a first criterion is exchanged via a network between the client node and a server node. The first criterion is for sending the first resource to a second user agent client rather than the first user agent client.

An operating environment suitable for including logic that when executed operates to perform the method 2300 may be implemented in and/or otherwise may include one or more client nodes 114 and/or server nodes 112 in FIG. 1A. FIGS. 21 and 22 illustrate operating environments that separately and/or together may include an arrangement of components including logic for performing the method 2300 illustrated in FIG. 23. For example, as described above, various embodiments of operating environment 2100 in FIG. 21 may be modified from an operating environment 200 to include an arrangement of components including logic for performing the method 2300. Also as described above various embodiments of operating environment 2200 in FIG. 22 may be modified from an operating environment 300 to include an arrangement of components including logic for performing the method 2300. Of course, however, logic for performing the method 2300 may be implemented in various embodiments in any suitable operating environment. Further, the aforementioned definitions may equally apply to the description below.

Figure 24:
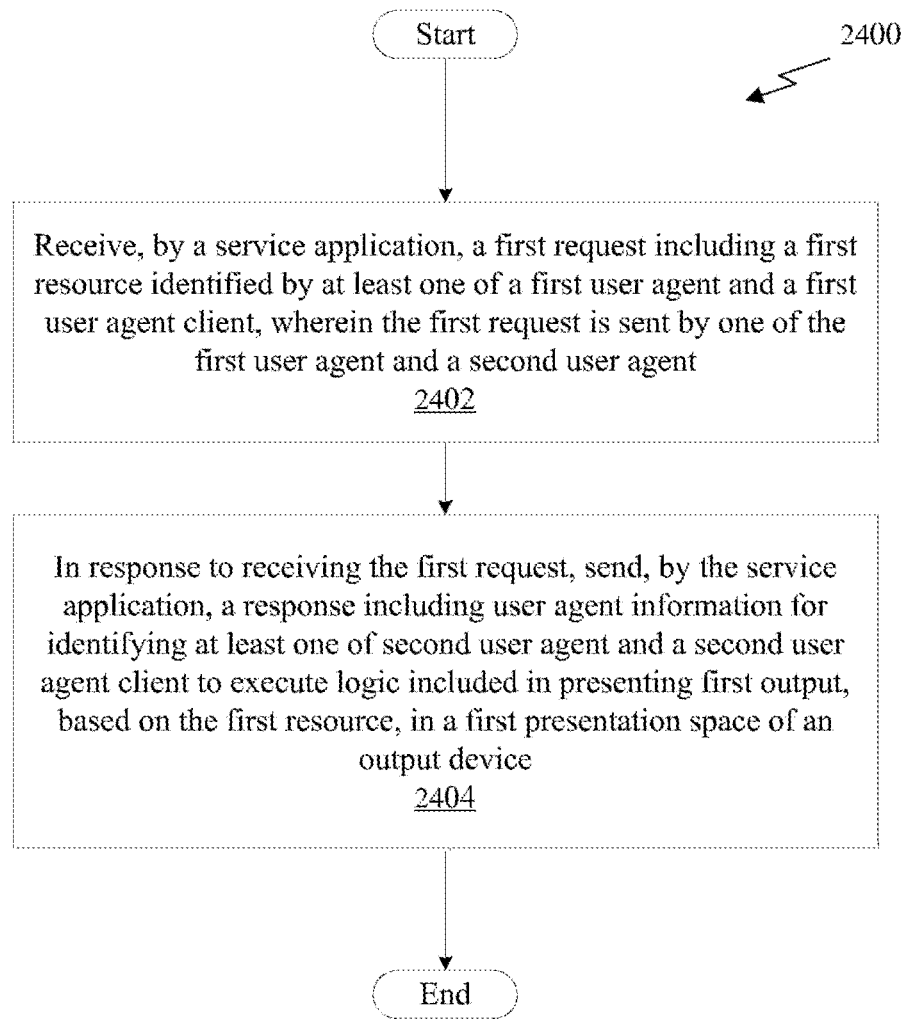
FIG. 24 shows a flow chart of a method in accordance with an embodiment of the subject matter described herein.

FIG. 24 shows a flow chart of a method 2400 in accordance with an embodiment. As an option, the method 2400 may be implemented in the context of the details of any of the foregoing figures. As shown in FIG. 24 at block 2402, a first request, is received by a service application. The first request includes a first resource identified by at least one of a first user agent and a first user agent client. The first request is sent by one of the first user agent and a second user agent. At block 2404, in response to receiving the first request, a response is sent by the service application. The response includes user agent information for identifying at least one of second user agent and a second user agent client to execute logic included in presenting first output, based on the first resource, in a first presentation space of an output device.

An operating environment suitable for including logic that when executed operates to perform the method 2400 may be implemented in and/or otherwise may include one or more client nodes 114 and/or server nodes 112 in FIG. 1A. FIGS. 21 and 22 illustrate operating environments that separately and/or together may include an arrangement of components including logic for performing the method 2400 illustrated in FIG. 24. For example, as described above, various embodiments of operating environment 2100 in FIG. 21 may be modified from an operating environment 200 to include an arrangement of components including logic for performing the method 2400. Also as described above various embodiments of operating environment 2200 in FIG. 22 may be modified from an operating environment 300 to include an arrangement of components including logic for performing the method 2400. Of course, however, logic for performing the method 2400 may be implemented in various embodiments in any suitable operating environment. Further, the aforementioned definitions may equally apply to the description below.

Figure 25:
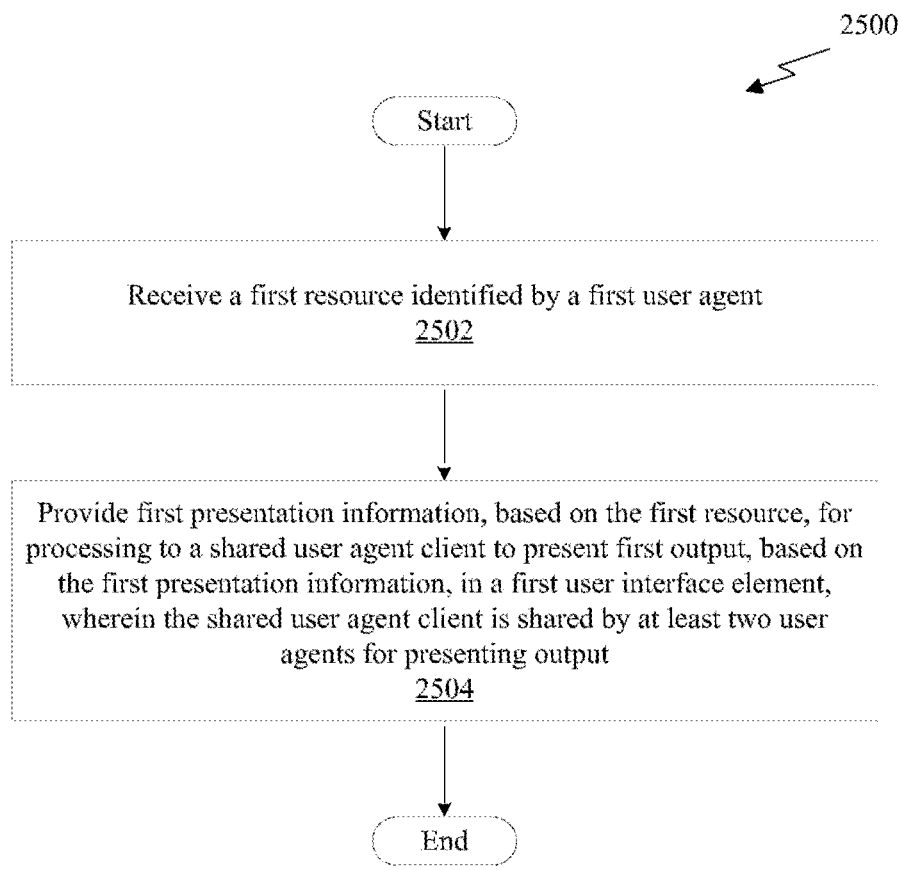
FIG. 25 shows a flow chart of a method in accordance with an embodiment of the subject matter described herein.

FIG. 25 shows a flow chart of a method 2500 in accordance with an embodiment. As an option, the method 2500 may be implemented in the context of the details of any of the foregoing figures. As shown in FIG. 25 at block 2502, a first resource is received that is received and/or otherwise identified by a first user agent. At block 2504, first presentation information, based on the first resource, is provided for processing to a shared user agent client to present first output, based on the first presentation information, in a first user interface element. The shared user agent client also presents second output, based on second presentation information based a second resource that is received and/or otherwise identified by a second user agent, in a second user interface element.

Figure 26:
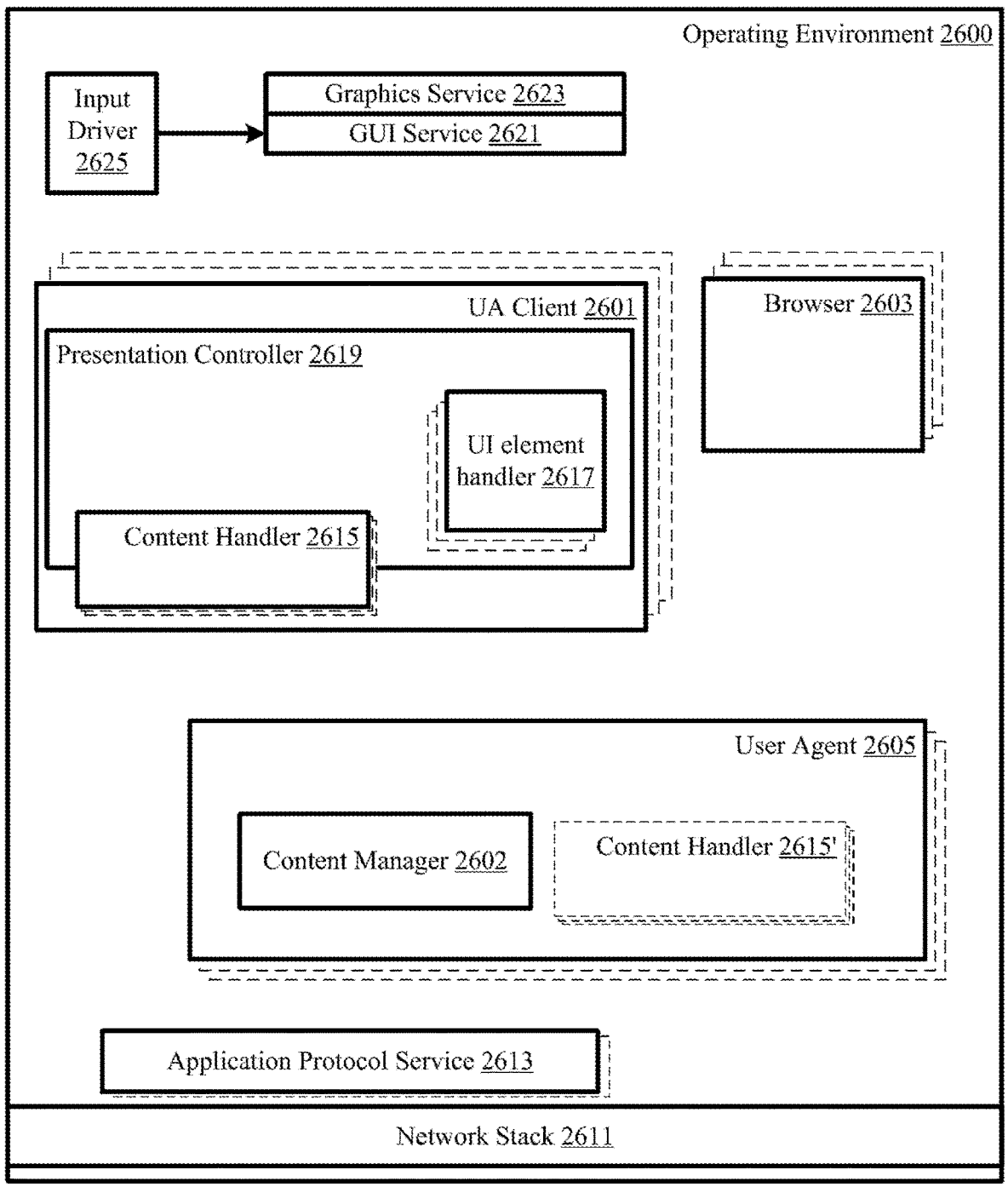
FIG. 26 shows a block diagram illustrating an arrangement of components that may include logic for performing one or more of the methods described herein.
Figure 27:
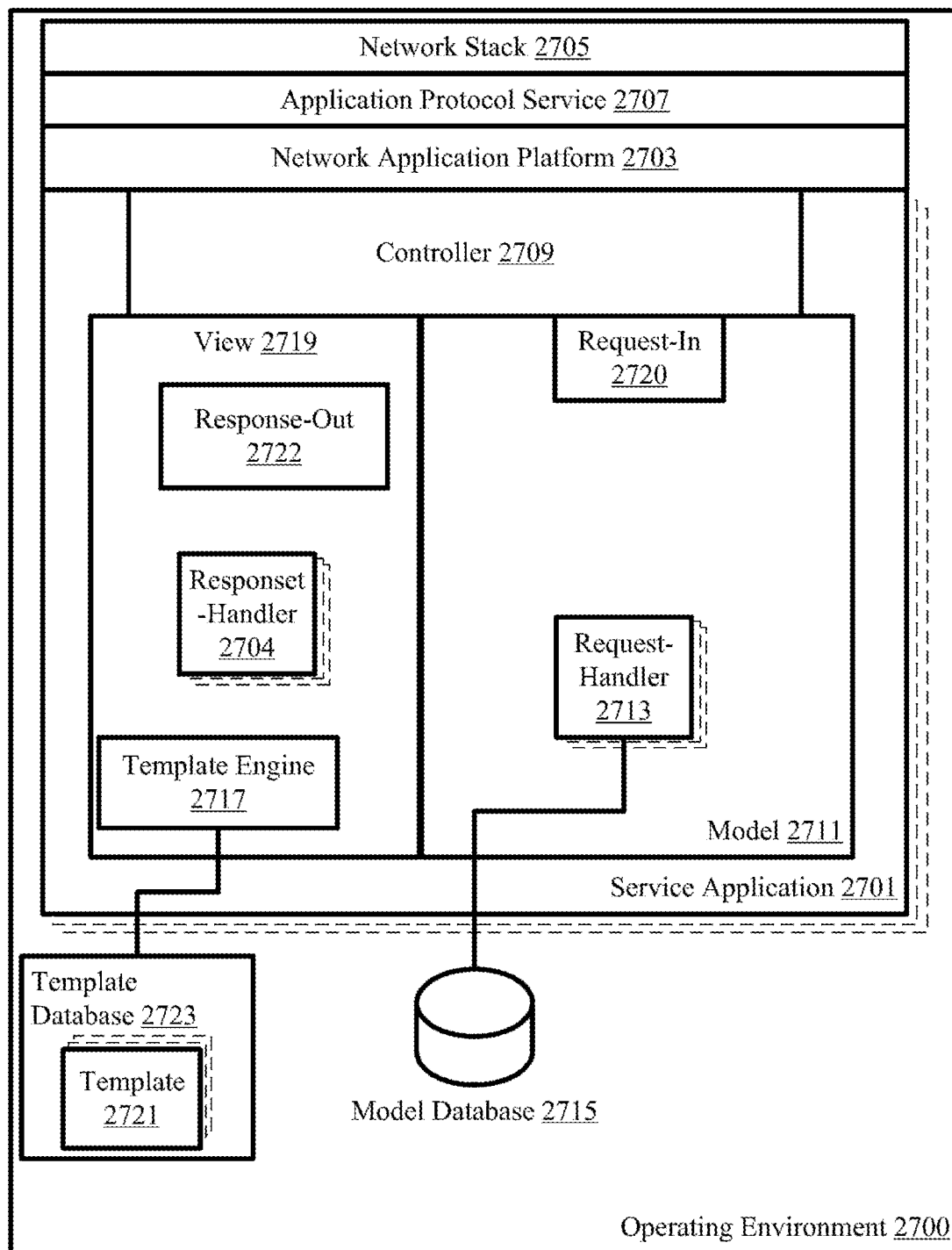
FIG. 27 shows a block diagram illustrating an arrangement of components that may include logic for performing one or more of the methods described herein.

An operating environment suitable for including logic that when executed operates to perform the method 2500 may be implemented in and/or otherwise may include one or more client nodes 114 and/or server nodes 112 in FIG. 1A. FIGS. 26 and 27 illustrate operating environments that separately and/or together may include an arrangement of components including logic for performing the method 2500 illustrated in FIG. 25. FIG. 26 illustrates an operating environment 2600 modified from an operating environment 200 to include an arrangement of components including logic for performing the method 2500. FIG. 27 illustrates an operating environment 2700 modified from an operating environment 300 to include an arrangement of components including logic for performing the method 2500. Of course, however, logic for performing the method 2500 may be implemented in various embodiments in any suitable operating environment. Further, the aforementioned definitions may equally apply to the description below.

In an operating environment 2600 logic to perform the method 2500 may be included in, for example, a user agent client 2601, a user agent 2605, and/or in an application protocol service 2613. In an option, logic to perform block 2502 may be included, for example, in a user interface element handler component 2617 in a user agent client 2601, a content handler component in a user agent 2605, and/or in a browser 2603. An operating environment 2700 may include logic to perform the method 2500 in, for example, a service application 2701, a network application platform 2703, and/or in an application protocol service 2707.

In FIG. 26, a first user agent 2605 may include and/or may interoperate with logic that when executed operates in performing block 2502. For example, logic executed to perform block 2602 may be included in a content handler component 2602 and/or may accessible to a content manager via an interface of an application layer service 2613. In an option, a content handler component 2602 interoperate with an HTTP application protocol service 2613 to receive a message from a server node 112 that includes a first resource identified by the first URL. The first user agent 2605 may also include logic and/or otherwise interoperate with logic that when executed operates in performing block 2504. For example, logic executed to perform block 2602 may be included in a content handler component 2615' that interoperates with one a presentation controller 2619 in a first user agent client 2601 to present first output, based on the first presentation information, in a first user interface element. A second user interface element may be presented by the first user agent client 2601 by processing second presentation information provided by a second user agent and based on a second resource, identified by a second URL. The second output may be presented prior to, during, and/or after the first output is presented. In an option, both the first output and the second output may be presented in a same user interface element.

In another embodiment, the method 2500 may be performed by a service application 2701 of a server node 112 implementing an operating environment 2700 illustrated in FIG. 27. For example, a service application 2701 may include logic that when executed operates in performing block 2502 included in and/or otherwise accessible to a request-handler component 2713 that accesses and/or receives a first resource, identified by a first URL. For example, a request handler component 2613 may access a HTML document, script instructions, image data, and the like identified directly and/or indirectly by the first URL. Such data may be accessed from model database 2715, some other data store, and/or may be created and/or otherwise generated by the request handler component 2613. The service application 2701 may include logic that when executed operates in performing block 2504 included in and/or otherwise accessible to a request handler 2704, a response-out component 2722, and/or a template engine 2707. A response-out component 2722 may include a first resource identified by the first URL in a message, such as an HTTP response, to send as presentation information with respect to the service application 2701 to a first user agent to present, via a user agent, first output based on the first resource by a user agent client in a client node 114. The second user agent in the client node 114 may present second output via the same user agent client. The second output may be based on based on a second resource, identified by a second URL. The second output may be presented prior to, during, and/or after the first output is presented. In an option, both the first output and the second output may be presented in a same user interface element.

Returning to FIG. 26, a shared user agent client 2601 may receive first presentation information, based on a first resource, identified by a first URL, from a first user agent 2605 and/or otherwise identified by the first user agent 2605, such as in a request to a server node 112 to retrieve the first resource. The shared user agent client 2601 may also operate to present, based on the first presentation information, first output in a first user interface element. A second user interface element may be presented by the shared user agent client 2601 by processing second presentation information based on a second resource that is received and/or otherwise identified by a second user agent 2605.

Returning to FIG. 27, a view service 2719 may receive, modify, and/or generate first presentation information, based on a first resource. The first resource may be identified by a first URL included in a request received from a first user agent in a client node 114. Alternatively or additionally, the first user agent in the client node 114 may be identified for receiving the first resource in a response to the request. Some or all of a request for the first resource may be processed by request handler logic as described above and further below. Response-out logic in the view service 2722 may send presentation information, generated and/or otherwise identified based on processing of the request by the request handler logic, via a network 110 to a user agent in the client node 114 to present, based on the first presentation information, first output in a first user interface element of a shared user agent client. The user agent that sent the request and the user agent that receives the response may be a first user agent. In another embodiment, one of the user agents that sent the request and that received the response may be the first user agent. A second user interface element may be presented by the shared user agent client by processing second presentation information based on a second resource that is received and/or otherwise identified by a second user agent in the client node 114.

Figure 28:
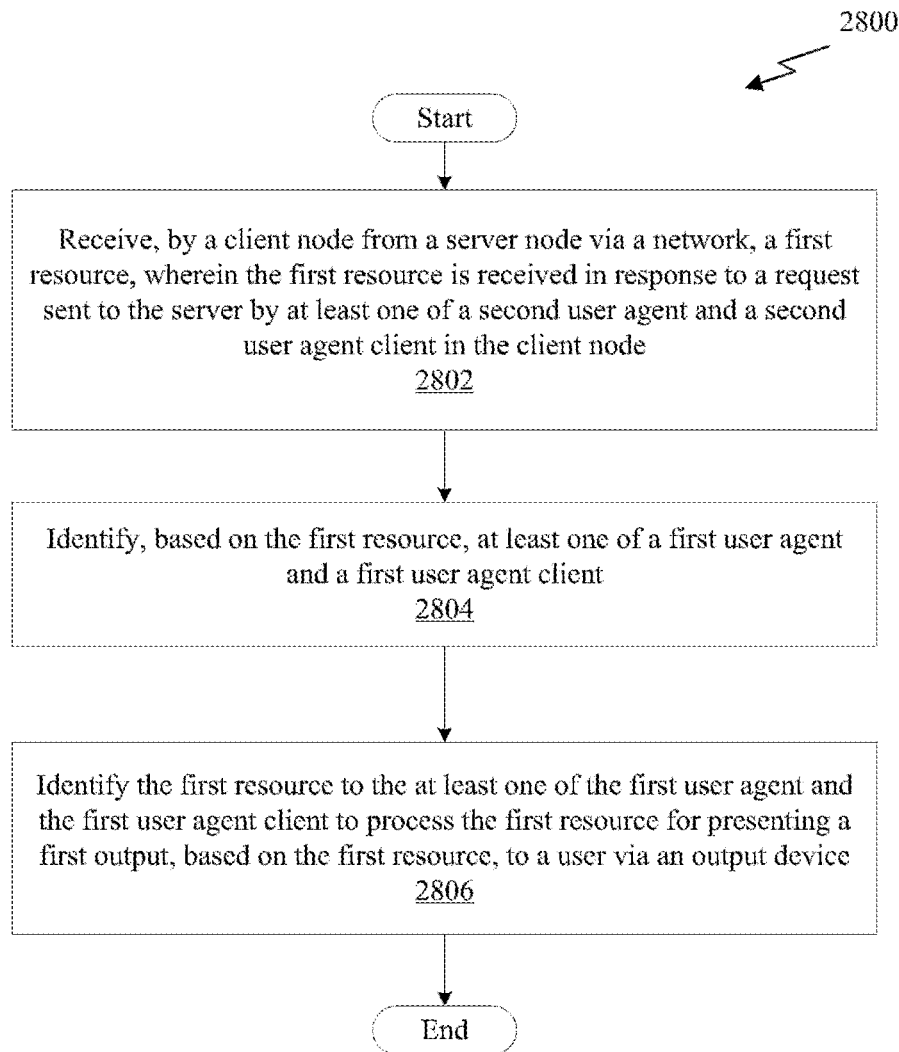
FIG. 28 shows a flow chart of a method in accordance with an embodiment of the subject matter described herein.

FIG. 28 shows a flow chart of a method 2800, in accordance with an embodiment. As an option, the method 2800 may be implemented in the context of the details of any of the foregoing figures. As shown in FIG. 28 at block 2802, a first resource is received by a client node from a server node via a network. The first resource is received in response to a request sent to the server by a second user agent and/or by a second user agent client in the client node. At block 2804, based on the first resource, a first user agent and/or a first user agent client is identified. The first user agent is included in a plurality of user agents in an operating environment and/or the first user agent client is included in a plurality of user agent clients in the operating environment. At block 2806, the first resource is identified to the at least one of the first user agent and the first user agent client to process the first resource for presenting to a user via an output device.

Figure 29:
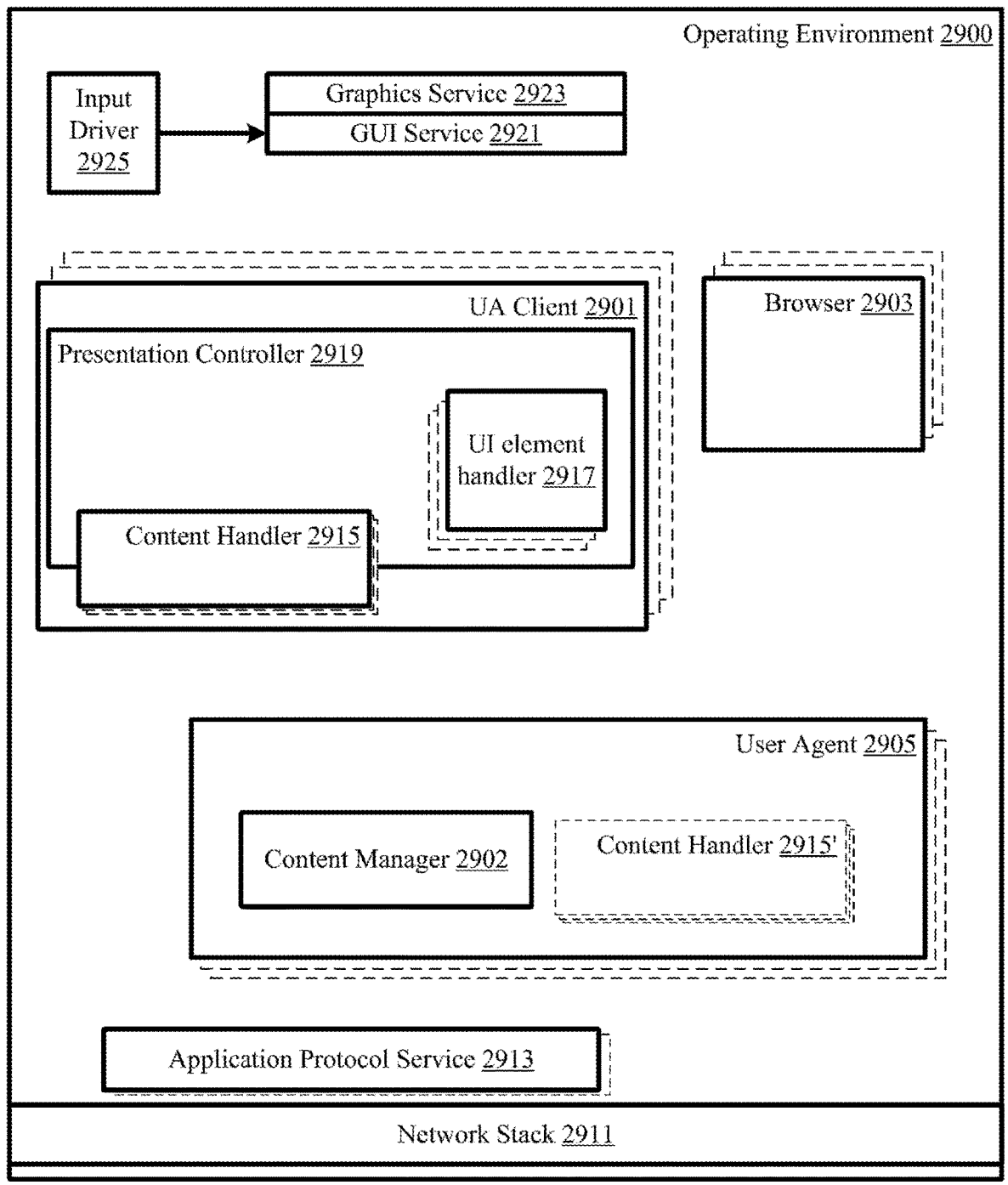
FIG. 29 shows a block diagram illustrating an arrangement of components that may include logic for performing one or more of the methods described herein.

An operating environment suitable for including logic that when executed operates to perform the method 2800 may be implemented in and/or otherwise may include one or more client nodes 114 and/or server nodes 112 in FIG. 1A. FIG. 29 illustrates an operating environment that separately and/or in combination with another operating environment may include an arrangement of components including logic for performing the method 2800 illustrated in FIG. 28. FIG. 29 illustrates an operating environment 2900 modified from an operating environment 200 to include an arrangement of components including logic for performing the method 2800. Of course, however, logic for performing the method 2500 may be implemented in various embodiments in any suitable operating environment. Further, the aforementioned definitions may equally apply to the description below. In an operating environment 2900, logic to perform the method 2800 in, for example, a user agent client 2901, a user agent 2905, and/or in an application protocol service 2913.

In FIG. 29, logic that when executed operates in performing block 2802 may be included in an application protocol service 2913, such an HTTP application service, to receive, via a network 110 from a server node 112, a first resource. The first resource may be a web page identified by first URL. The first resource may be received in response to a request sent to the server node 112 by a second user agent 2905 and/or a second user agent client 2901 in the client node 114.

Logic that when executed operates in performing block 2804 may be included in and/or otherwise accessible to the application protocol service 2913 enabling the application protocol service 2913 to identify a first user agent client 2901 from among two or more user agent clients. The first user agent client 2901 may be identified, based on any criterion included in the first resource, received along with the first resource, and/or otherwise accessible to the application protocol service 2913. For example, the first URL, a content header, and/or the first resource may be processed in identifying the first user agent client 2901. Alternatively or additionally, the application protocol service 2913 may operate to identify a first user agent 2905 from among two or more user agents. The application protocol service 2913a may invoke a first user agent 2905 from multiple user agents in the operating environment of the client node 114. Further, logic that when executed operates in performing block 2806 may also be included in and/or otherwise accessible to the application protocol service 2913 to identify the first resource to the identified first user agent 2905 via a criterion provided to a user agent to present first output based on the first resource Alternatively or additionally, the application protocol service 2913 may invoke and/or otherwise identify the first user agent client 2901 to invoke a user agent client to present the first output to a user via an output device.

In FIG. 29, logic that when executed operates in performing block 2802 may be included in a user agent 2905 to receive a first resource from a server node 112 via an application protocol service 2913. As described above, the first resource may be received in response to a request sent to the server node 112 by a second user agent 2905 and/or a second user agent client 2901 in the client node 114. Logic that when executed operates in performing block 2804 may be included in and/or otherwise accessible to the user agent 2905 enabling the application protocol service 2913 to identify a first user agent client 2901 from among two or more user agent clients. The first user agent client 2901 may be identified, based on any criterion included in the first resource, received along with the first resource, and/or otherwise accessible to the user agent 2905. Alternatively or additionally, a user agent 2905 may operate to identify a first user agent 2905 from among two or more user agents and/or to identify the first user agent client 2901 to provide data, such aa a resource that includes a web page, to a user agent client 2901. The web page may include one or more criteria that identifies the first user agent 2905 and/or the first user agent client 2901. A criterion may be included in the web page by the user agent in response to identifying the first user agent and/or in response to identifying the firs user agent client 2901. Alternatively or additionally, the user agent may identify the first user agent 2905 and/or the first user agent client 2901 based on one or more criteria included in the web page and/or in other data accessible to a user agent client in performing block 2806. The web page may identify a first resource to be accessed from a server node 112. The user agent client 2901 that processes the web page may invoke a user agent to send a request to access the first resource. The request may include a criterion that identifies the first user agent 2905 and/or the first user agent client 2901 to process the first resource. The server node 112 may as a result send the response to the first user agent 2905 and/or may provide information to the client node 114 to direct the client node 114 to invoke the first user agent client 2901 to present the first output based on the first resource.

Figure 30:
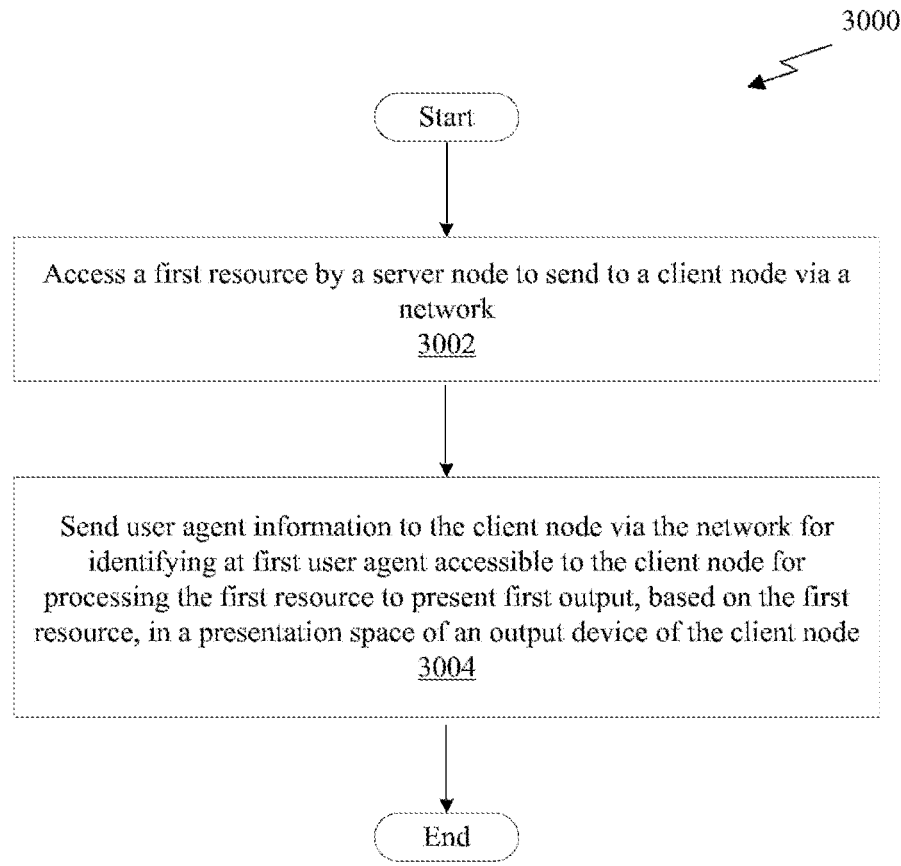
FIG. 30 shows a flow chart of a method in accordance with an embodiment of the subject matter described herein.

FIG. 30 shows a flow chart of a method 3000 in accordance with an embodiment. As an option, the method 3000 may be implemented in the context of the details of any of the foregoing figures. As shown in FIG. 30, at block 3002, a first resource is accessed by a server node to send to a client node via a network. At block 3004, user agent information is sent to the client node via the network for identifying at first user agent accessible to the client node for processing the first resource to present first output, based on the first resource, in a presentation space of an output device of the client node.

Figure 31:
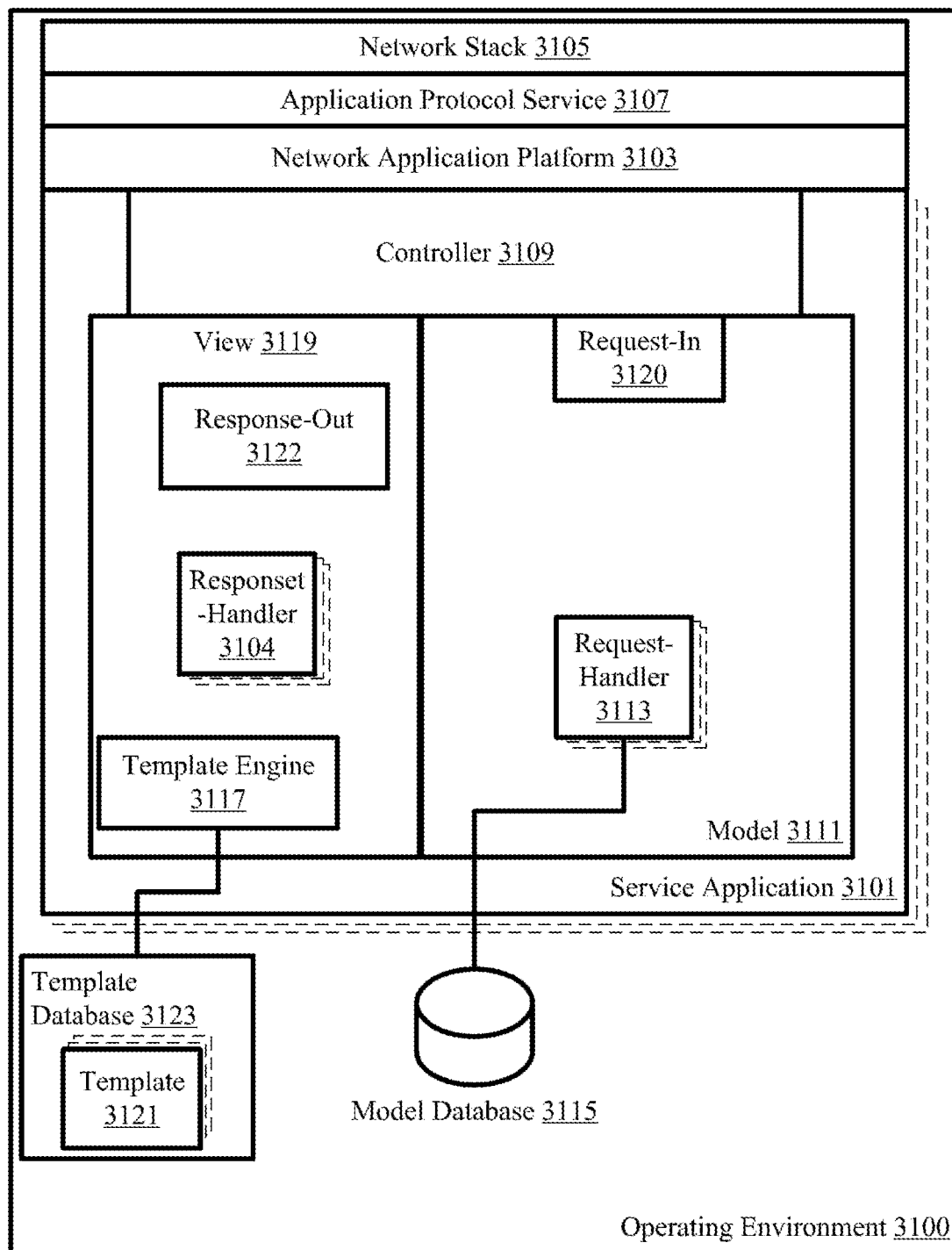
FIG. 31 shows a block diagram illustrating an arrangement of components that may include logic for performing one or more of the methods described herein.

An operating environment suitable for including logic that when executed operates to perform the method 3000 may be implemented in and/or otherwise may include one or more server nodes 112 in FIG. 1A. FIG. 31 illustrates an operating environment that separately and/or in combination with another operating environment may include an arrangement of components including logic for performing the method 3000 illustrated in FIG. 30, in accordance with an embodiment. FIG. 31 illustrates an operating environment 3100 modified from an operating environment 300 to include an arrangement of components including logic for performing the method 3000. Of course, however, logic for performing the method 3000 may be implemented in various embodiments in any suitable operating environment. Further, the aforementioned definitions may equally apply to the description below.

In an operating environment 3100, logic to perform the method 3000 may be included in and/or otherwise may be accessible to an application protocol service 3107, a network application platform 3103, and/or a service application 3101. In an option, a service application may include logic that when executed operates in performing block 3002 in a request-in component 3120. The request-in component 3120 may receive a URL sent in a request by a client node 114. The URL identifies a first resource to send in a response via a network 110 to the client node 114. The request-in component 3120 may invoke logic that when executed operates in performing block 3002 by invoking a request handler 3113 to generate and/or retrieve the first resource identified by the first URL. In performing block 3004, the service application 3101 may specifically identify and/or otherwise select a user agent and/or a user agent client in the client node 114 to process the first resource sent in the response. Alternatively or additionally, the service application 3101 may identify one or more criteria for determining, by the client node 114, a user agent and/or a user agent client to process the response. The identifier and/or criterion of a user agent and/or a user agent client may be included in user agent information included in the response. In performing block 3004, a view service 3119 in the service application 3101 may include logic that when executed operates to send the user agent information to the client node 114 in the response via the network 110. The some or all of the user agent information may be included in the request and/or may otherwise be identified based on the request. In an option, some or all of the logic for performing block 3004 may be included in and/or otherwise accessible to a request-out component 3104, a template engine 3117, server-side script instructions in a template 3123, and/or in a response-out component 3122. The client node 114 may identify a first user agent and/or a user agent client accessible to the client node 114 for processing the first resource to present first output, based on the first resource, in a presentation space of an output device of the client node 114. For example, a response-out component 3122 may send the first resource in a message that includes a header that identifies and/or otherwise provides a criterion included in identifying the first user agent by the client node 114.

User agent information in a header of a message as illustrated in FIGS. 7A and 7B and described above to identify by and/or to the client node 114, a user agent and/or a user agent client to process a resource received in a message from another node. User agent information may also be included in markup as illustrated in FIGS. 8A and 8B and described above which may be sent from a server node 112 to a client node 114 to identify a user agent and/or a user agent client in the client node 114. User agent information may also be included in a body of a message as illustrated in FIGS. 9A and 9B and described above which may be sent from a server node 112 to a client node 114 to identify a user agent and/or a user agent client in the client node 114.

Figure 32:
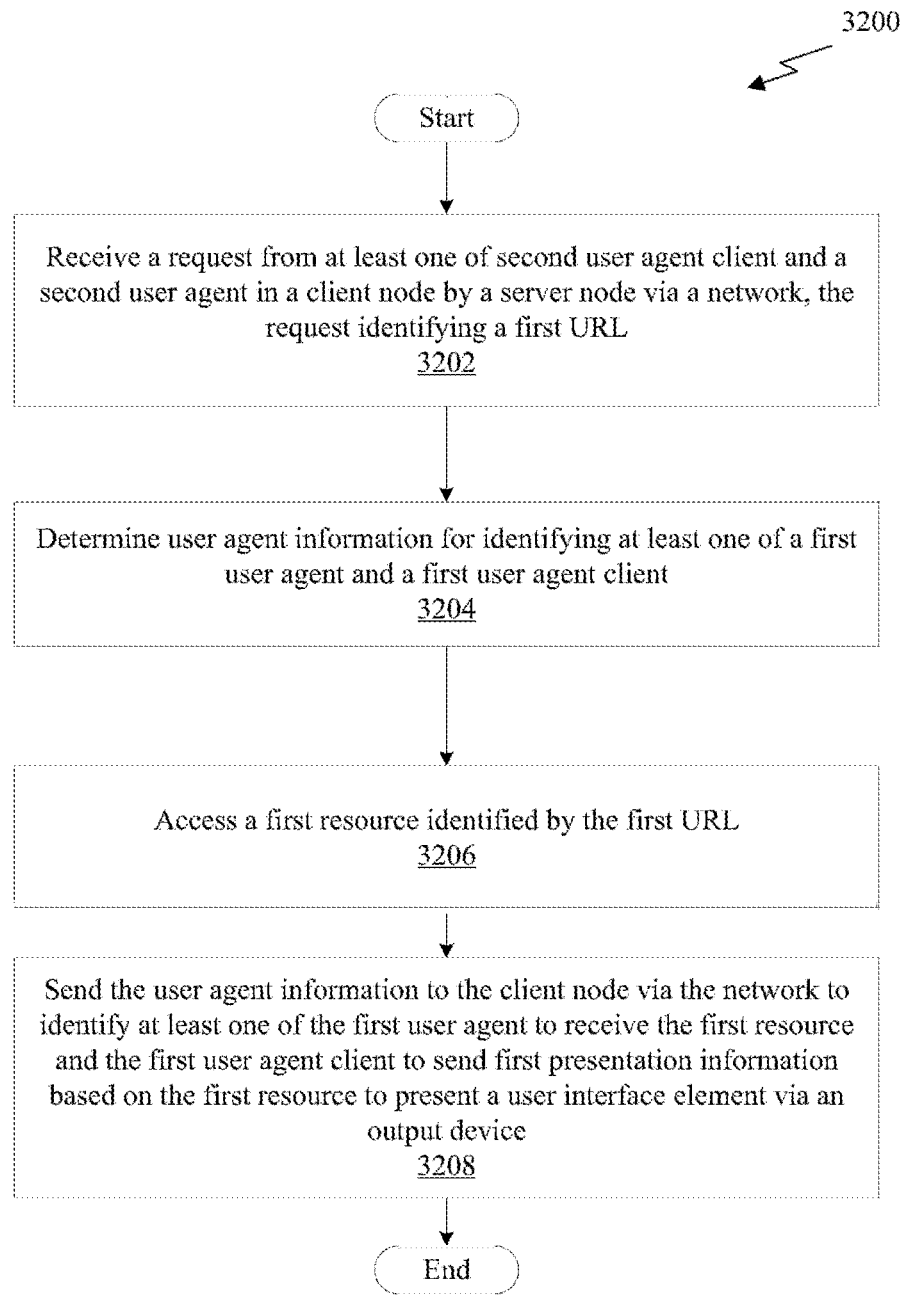
FIG. 32 shows a flow chart of a method in accordance with an embodiment of the subject matter described herein.

FIG. 32 shows a flow chart of a method 3200 in accordance with an embodiment. As an option, the method 3200 may be implemented in the context of the details of any of the foregoing figures. As shown in FIG. 32 at block 3202, a request is received from at least one of second user agent client and a second user agent in a client node by a server node via a network, the request identifying a first URL. At block 3204, user agent information is determined for identifying at least one of a first user agent and a first user agent client. At block 3206, a first resource identified by the first URL is accessed. At block 3208, the user agent information is sent to the client node via the network to identify at least one of the first user agent to receive the first resource and the first user agent client to send first presentation information based on the first resource to present a user interface element via an output device.

Figure 33:
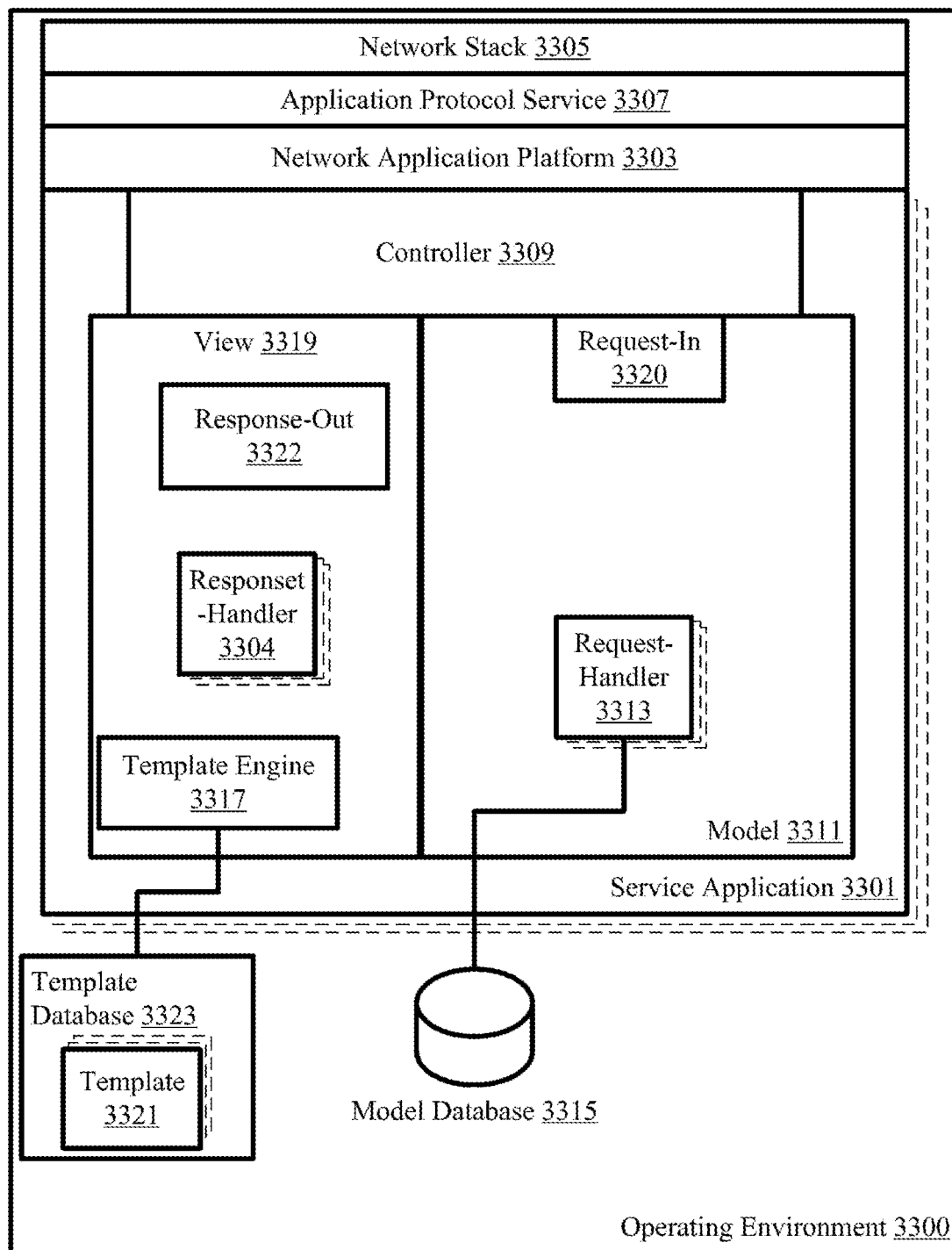
FIG. 33 shows a block diagram illustrating an arrangement of components that may include logic for performing one or more of the methods described herein.

An operating environment suitable for including logic that when executed operates to perform the method 3200 may be implemented in and/or otherwise may include one or more server nodes 112 in FIG. 1A. FIG. 33 illustrates and operating environments that separately and/or in combination with another operating environment may include an arrangement of components including logic for performing the method 3200 illustrated in FIG. 32, in accordance with an embodiment. FIG. 33 illustrates an operating environment 3300 modified from an operating environment 300 to include an arrangement of components including logic for performing the method 3200. Of course, however, logic for performing the method 3200 may be implemented in various embodiments in any suitable operating environment. Further, the aforementioned definitions may equally apply to the description below.

In an operating environment 3300 logic to perform the method 3200 may be included in and/or otherwise may be accessible to an application protocol service 3307, a network application platform 3303, and/or a service application 3301. A service application 3301 may include logic that when executed operates in performing block 3202 in and/or otherwise accessible to a request-in component 3320. The request-in component 3320 may receive a request from a second user agent in a client node 114. One or both of the second user agent and a second user agent client in the client node 114 may initiate and/or may otherwise be included in sending the request. The request may identify a first resource via a first URL included in the request in whole or in part. Model service 3311 in FIG. 33 may include logic that when executed operates in performing block 3204 in and/or otherwise accessible to a request handler component 3313 that may determine user agent information that identifies and/or otherwise provides one or more criteria for identifying a first user agent and/or a first user agent client in the client node 114 to be included in processing a response sent by the server node 112 to the client node 114. In another embodiment, some or all logic included in perform block 3204 may be included in and/or otherwise accessible to a view service 3319, such as in a response-out component 3322 and may be executed after the first resource is accessed. Logic that when executed operates in performing block 3206 may be included in and/or otherwise accessible to access a first resource identified by the first URL. The logic that operates in performing 3206 may be included in and/or otherwise may interoperate with logic that accesses a data store that includes the first resource and/or data for generating and/or otherwise accessing the first resource. Exemplary data stores include a data base management system, a file system, a directory system, and the like. Alternatively or additionally, logic for performing block 3206 may be translated from source code written to create and/or modify data in order to generate the first resource. For example, the first resource may be generated by a calculation, identified dynamically in response to an event, determined based on policy, determined based on a condition, and/or accessed based on some other criterion. For example, the first URL may identify a search request, the first resource may include a result of search operation. One or more resource items that match the search request may be combined in, for example, a list. Logic performing block 3206 may be generated from source code written to invoke a search engine to receive the first resource including the list and/or from source code written to be invoked asynchronously by logic that creates the list from one or more resources identified by the search engine. Logic that when executed operates in performing block 3208 may be included in and/or otherwise accessible to a response-out component 3322 that may be executed to send, via the network 110 to the client node 114, the user agent information in a response to the request. The response may include some or all of the first resource as well. In another embodiment, the user agent information may be sent in a separate message to the client node 114. The separate message may be sent via HTTP or via a different network protocol. The message may be sent in response to the request that identifies the first resource. The message may be sent in response to a previous HTTP request from the client node 114 and received by the server node 112. The message may be sent from the server node 112 to the client node 114 asynchronously. User agent information may be included in the request, based on information in the request, generated and/or modified by the server node, and/or based on any attribute accessible to the server node 112. See FIGS. 7A, 7B, 8A, 8B, 9A, and 9B and corresponding descriptions of each included herein.

Figure 34:
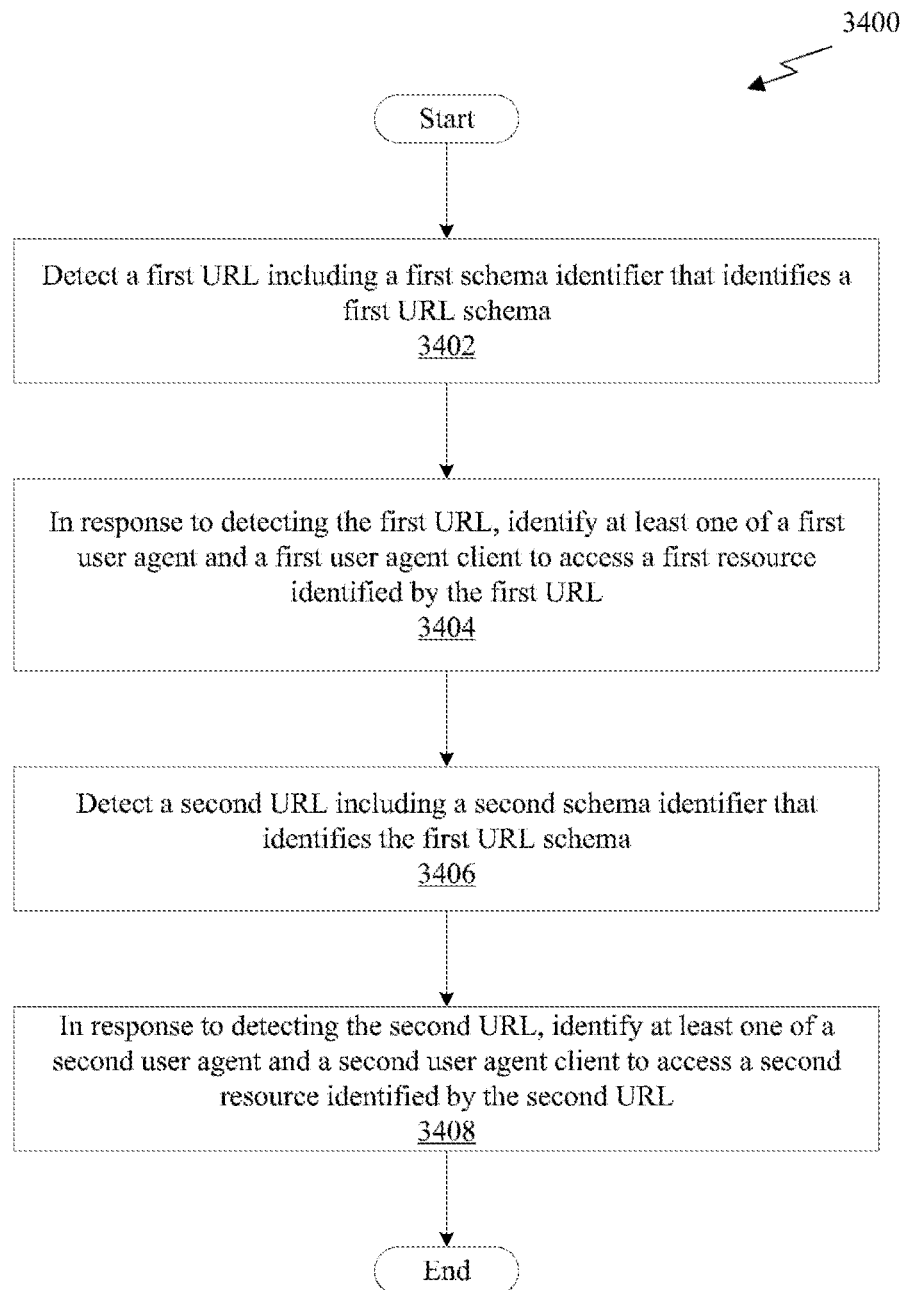
FIG. 34 shows a flow chart of a method in accordance with an embodiment of the subject matter described herein.

FIG. 34 shows a flow chart of a method 3400 in accordance with an embodiment. As an option, the method 3400 may be implemented in the context of the details of any of the foregoing figures. As shown in FIG. 34 at block 3402, a first URL, including a first schema identifier that identifies a first URL schema, is detected. At block 3404 in the method 3400, in response to detecting the first URL, a first user agent and/or a first user agent client is identified to access a first resource identified by the first URL. The first user agent may be identified automatically when the first URL is detected. At block 3406 in the method 3400, a second URL, including a second schema identifier that identifies the first URL schema, is detected. At block 3408 in the method 3400, in response to detecting the second URL, a second user agent and/or a second user agent client is identified to access a second resource identified by the second URL. The second user agent may be identified automatically when the second URL is detected. In an option, the detecting of the first URL is not performed by the first user agent, and the detecting of the second URL is not performed by the second user agent.

Figure 35:
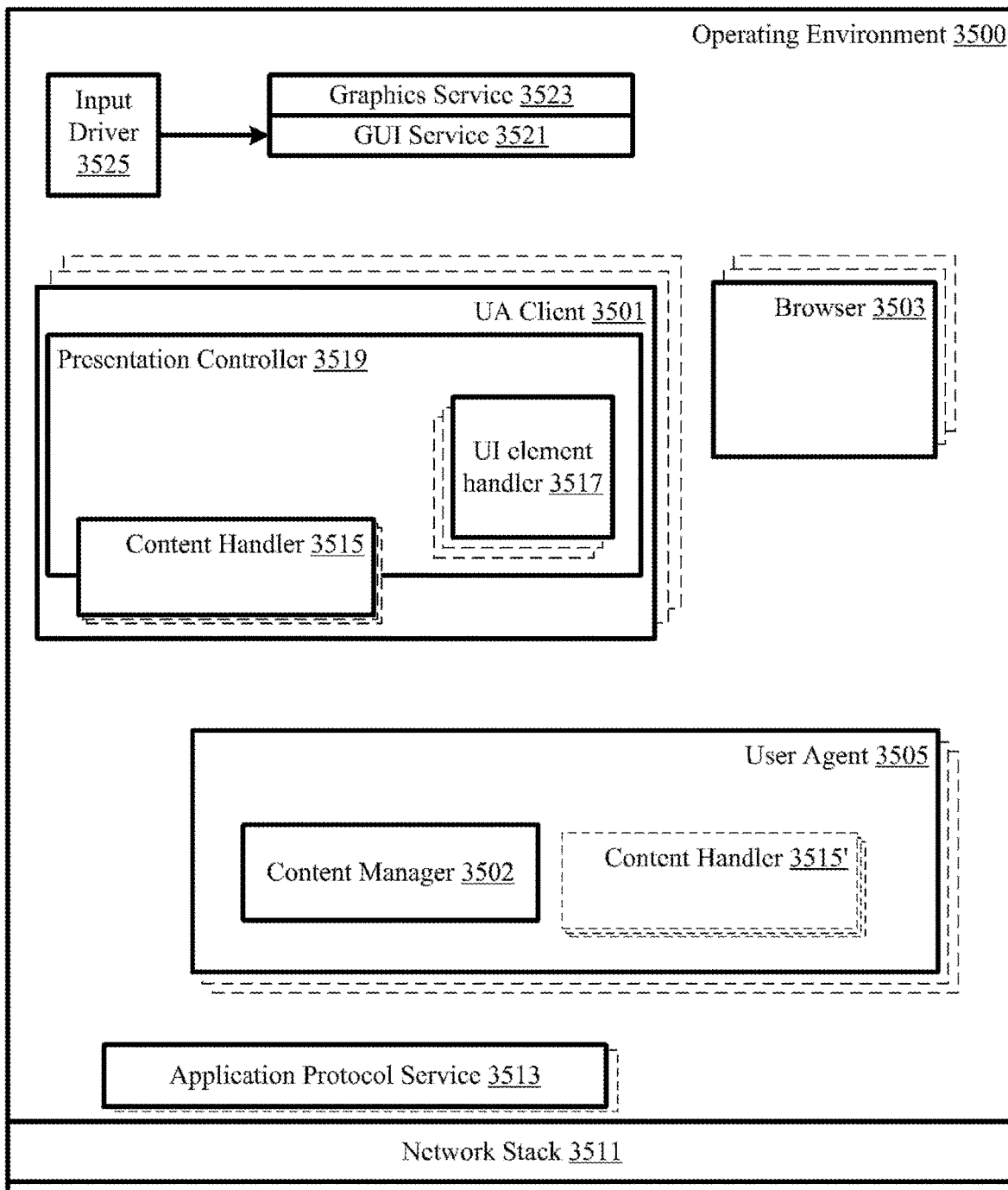
FIG. 35 shows a block diagram illustrating an arrangement of components that may include logic for performing one or more of the methods described herein.
Figure 36:
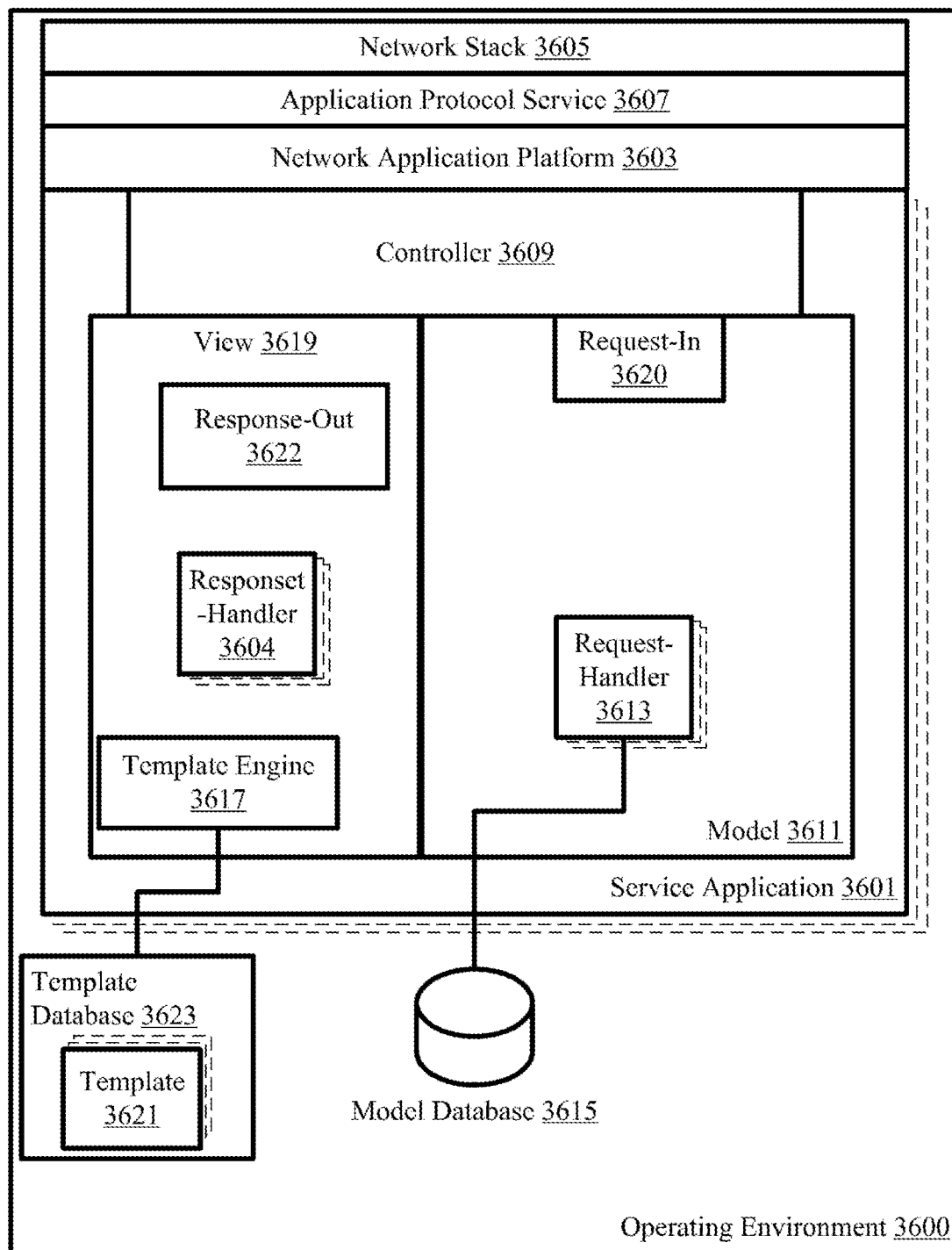
FIG. 36 shows a block diagram illustrating an arrangement of components that may include logic for performing one or more of the methods described herein.

An operating environment suitable for including logic that when executed operates to perform the method 3400 may be implemented in and/or otherwise may include one or more client nodes 114 and/or server nodes 112 in FIG. 1A. FIGS. 35 and 36 illustrate operating environments that separately and/or in combination may include an arrangement of components including logic for performing the method 3400 illustrated in FIG. 34. For example, as described above, various embodiments of operating environment 3500 in FIG. 35 may be modified from an operating environment 200 to include an arrangement of components including logic for performing the method 3400. Also as described above various embodiments of operating environment 3600 in FIG. 36 may be modified from an operating environment 300 to include an arrangement of components including logic for performing the method 3400. Of course, however, logic for performing the method 3400 may be implemented in various embodiments in any suitable operating environment. Further, the aforementioned definitions may equally apply to the description below. Of course, however, logic for performing the method 3400 may be implemented in various embodiments in any suitable operating environment.

In an operating environment 3500 logic to perform the method 3400 may be included in and/or otherwise may be accessible to, for example, a user agent client 3501, a user agent 3505, and/or in an application protocol service 3513. Logic to perform block 3402 may be included, for example, in a user interface element handler component 3517 in a user agent client 3501, a content handler component in a user agent 3505, and/or in a browser 3503.

Referring to FIG. 35, a content handler 3515 in a user agent 3505 and/or in a user agent client 3501, and/or a user interface element handler 3517 may detect a first URL including a schema identifier. For example the schema identifier may identify, for example, "HTTP" or "HTTPS". In a scenario, block 3402 may be specified by source that may be translated to implement block 3402 in logic that receives input information in response to a user input detected via an input device. The source code may specify that the logic detects a correspondence between the input and a hyperlink in output presented via an output device to a user by a second user agent client 3501 in a second browser 3503. Logic to perform block 3402 may be included in and/or otherwise may be accessible to a user interface element handler component 3517. Further, the second user agent client 3501 may include and/or otherwise may access logic translated from source code specified to implement block 3404 to identify, in response to detecting the first URL, a first user agent 3505 to access a first resource identified by the first URL. The first user agent 3505 may access the first resource in a response received by the client node 114 to a request sent to a server node 112 by the second user agent 3505 based on the first URL.

Additionally or alternatively, source code may be written to implement block 3406 in logic that when executed operates in and/or otherwise is accessible to a user agent 3505 to detect a second URL that includes a second schema identifier. The second schema identifier identifies the schema of the first URL. Source code may be written to generate logic that operates to identify the second user agent client 3501 to access a second resource and/or resource generated based on the second resource. That logic may be included in the user agent 3505 to implement block 3408, which may be invoked in response to detecting the second URL. Accessing the second resource may include receiving the second resource in a response to a request, based on the second URL, sent by the user agent that detected the second URL to a server node 112.

Source code may be written to implement block 3402 in logic, translated from the source code, that may be included in and/or otherwise accessible to a user interface element handler component 3517 in a first user agent client 3501. When execute the logic may operate to detect a first URL including a schema identifier. The logic may detect the first URL in a form markup element and/or in a hyperlink processed by the first user agent client 3501. The form and/or the hyperlink may be in content presented via an output device to a user by the first user agent client 3501. The first user agent client 3501 may also include logic translated from source code written to implement block 3404 in and/or otherwise accessible to a component 3515. The logic may be invoked in response to detecting the first URL, and according to the source code may operate to identify a first user agent 3505, to access a first resource identified by the first URL. The first user agent 3505 may send a request, in an HTTP request, that includes some or all of the first URL to a server node 112 to access the first resource. Further, the logic for performing block 3402 in the first user agent client 3501 may be generated from source code written to detect a second URL that includes a second schema identifier. The second URL may be included markup presented and/or to be presented via an output device to a user. The second URL may identify a media item such an image, video stream, and/or audio stream. Logic that when executed operates in performing block 3404 included in a content handler component 3515 may identify a second user agent 3505 to access the second resource by sending a request based on the second URL to a server node 112. The first user agent client 3501, the second user agent 3505, and/or the server node 112 may identify a user agent and/or user agent client to process a response to the request sent by the server node 112 and received by the client node 114.

In an operating environment 3600, logic to perform the method 3400 may be in and/or accessible to, for example, a service application 3601, a network application platform 3603, and/or in an application protocol service 3607. Source code may be written for implementing block 3402 in logic included in and/or otherwise accessible to a model service 3617, such as in a request-in component to detect a first URL including a schema identifier that identifies a first URL schema. The first URL may be detected in a request line of an HTTP request. The schema may be identified by detecting a protocol identifier in the request line. Logic that implements lock 3404 may be translated from source code written for including in and/or accessing by request handler 3613, a response handler 3604, a template engine 3617, a template 3621, and/or in a response-out component 3622. The various implementation may operate to identify and/or providing a criterion for identifying a user agent and/or a user agent client, such as a first user agent and/or a first user agent client respectively. The identifying information and/or the criterion information may be included in user agent information that is included in a message (e.g. as a criterion) sent to a client node 114 that sent the corresponding request. The first resource identified by the first URL may be included in the message sent to the client node 114 for processing by the identified user agent and/or user agent client.

Source code may also be written to implement logic for block 3402 and/or for block 3406 that includes a URL in a resource sent in a message from a service application 3601 in an operating environment 3600 of a server node 112 to a client node 114. The message may also include one or more criteria. A criterion may be processed by the client node 114 to identify a user agent and/or user agent client for accessing resource identified by the URL in a request to a server node 114 which may be the same or different server node. Source code may be written to implement logic for block 3404 and/or for block 3408 detect one or more criteria in the request to access the resource to identify a user agent and/or a user agent client to process and/or otherwise access the resource returned in a response sent from the server node 112 to the client node 114.

Further still, the method 3400 may be performed by a user agent client in identifying user agents to access resources identified by corresponding URLs. The user agents may operate to send a request to a server node 112 based on a respective URL. For example, with respect to FIG. 35, a user agent client 3501 may detect a first URL including a schema identifier that identifies a first URL schema. The user agent client 3501 may identify, in response to detecting the first URL, a first user agent 3505 to access a first resource identified by the first URL. The first user agent 3505 may send a message to a server node 112 based on the first URL to access the first resource. The first resource may be received and presented by the first user agent or by another user agent. Output based on the first resource may be presented by the user agent client 3501 or by another user agent client, if one exists in the operating environment 3500. The user agent client 3501 may identify the first user agent 3505 automatically when the first URL is detected. In another embodiment, the first user agent 3505 may be identified based on an interaction with a user. Also, the user agent client 3501 may detect a second URL including a schema identifier that identifies the first URL schema. Again, the user agent client 3501 may identify, in response to detecting the second URL, a second user agent 3505 to access a second resource identified by the second URL. A second resource accessed via the second URL may be received and presented by the second user agent or by another user agent. Output based on the second resource may be presented by the user agent client 3501 or by another user agent client, if one exists in the operating environment 3500.

Figure 37:
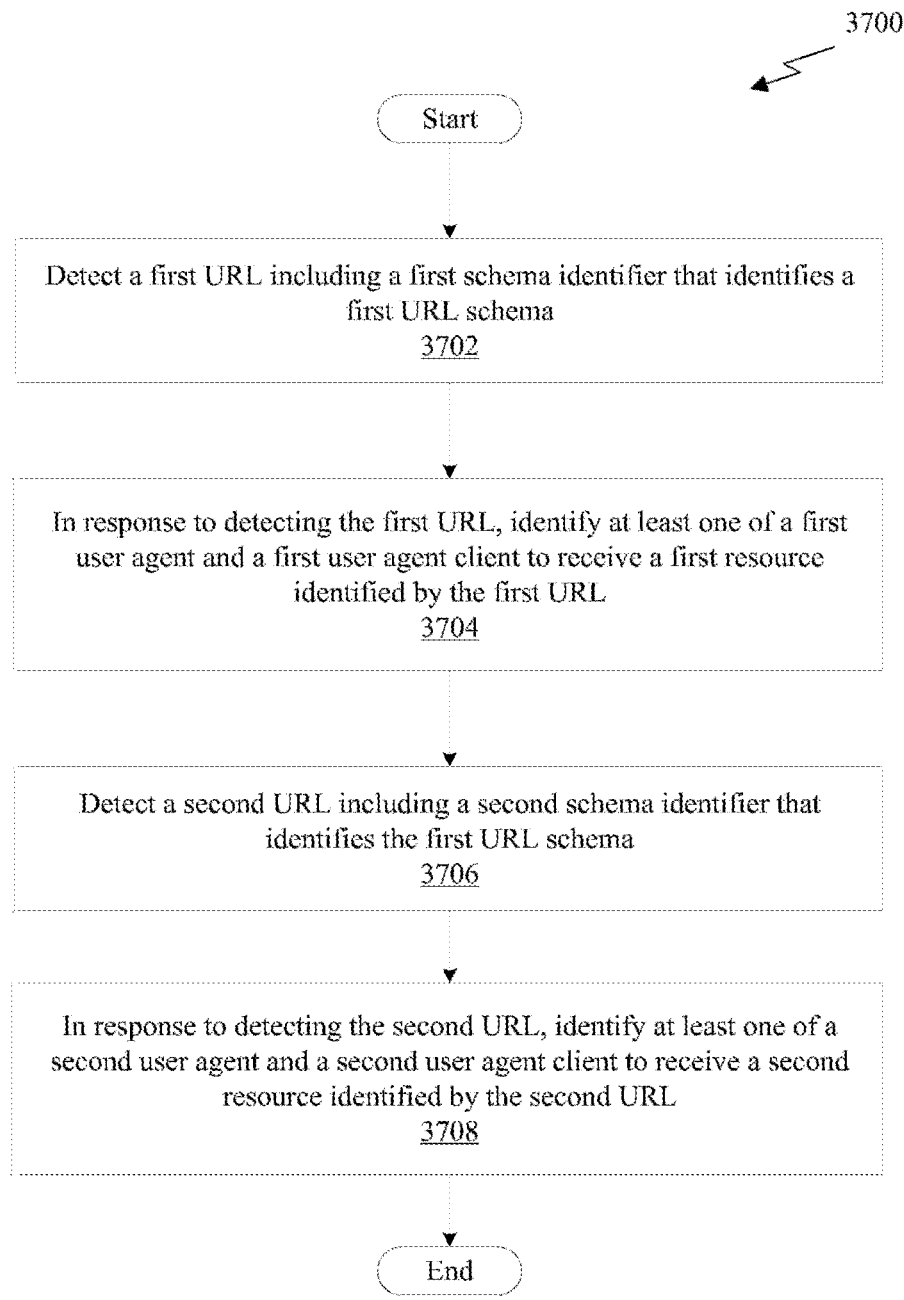
FIG. 37 shows a flow chart of a method in accordance with an embodiment of the subject matter described herein.

FIG. 37 shows a flow chart of a method 3700 in accordance with an embodiment. As an option, the method 3700 may be implemented in the context of the details of any of the foregoing figures. As shown in FIG. 37 at block 3702, a first URL, including a first schema identifier that identifies a first URL schema, is detected. At block 3704, in response to detecting the first URL, a first user agent and/or a first user agent client is identified to receive a first resource identified by the first URL. At block 3706 in the method 3700, a second URL, including a second schema identifier that identifies the first URL schema, is detected. At block 3708, in response to detecting the second URL, a second user agent and/or a second user agent client is identified to receive a second resource identified by the second URL. In an option, the detecting of the first URL is performed by an application that does not include a Web browser, and the detecting of the second URL is performed by the same application.

Figure 38:
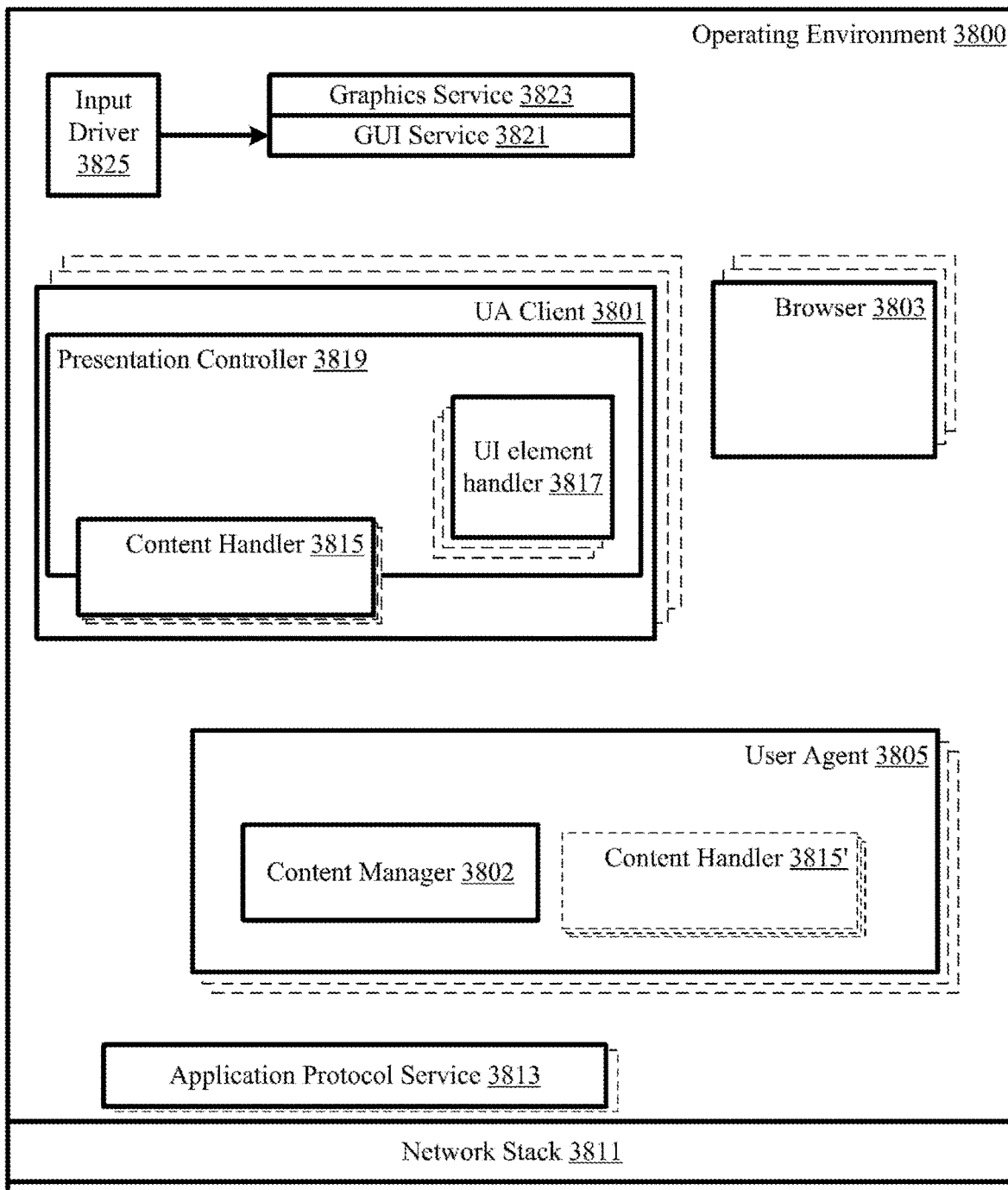
FIG. 38 shows a block diagram illustrating an arrangement of components that may include logic for performing one or more of the methods described herein.
Figure 39:
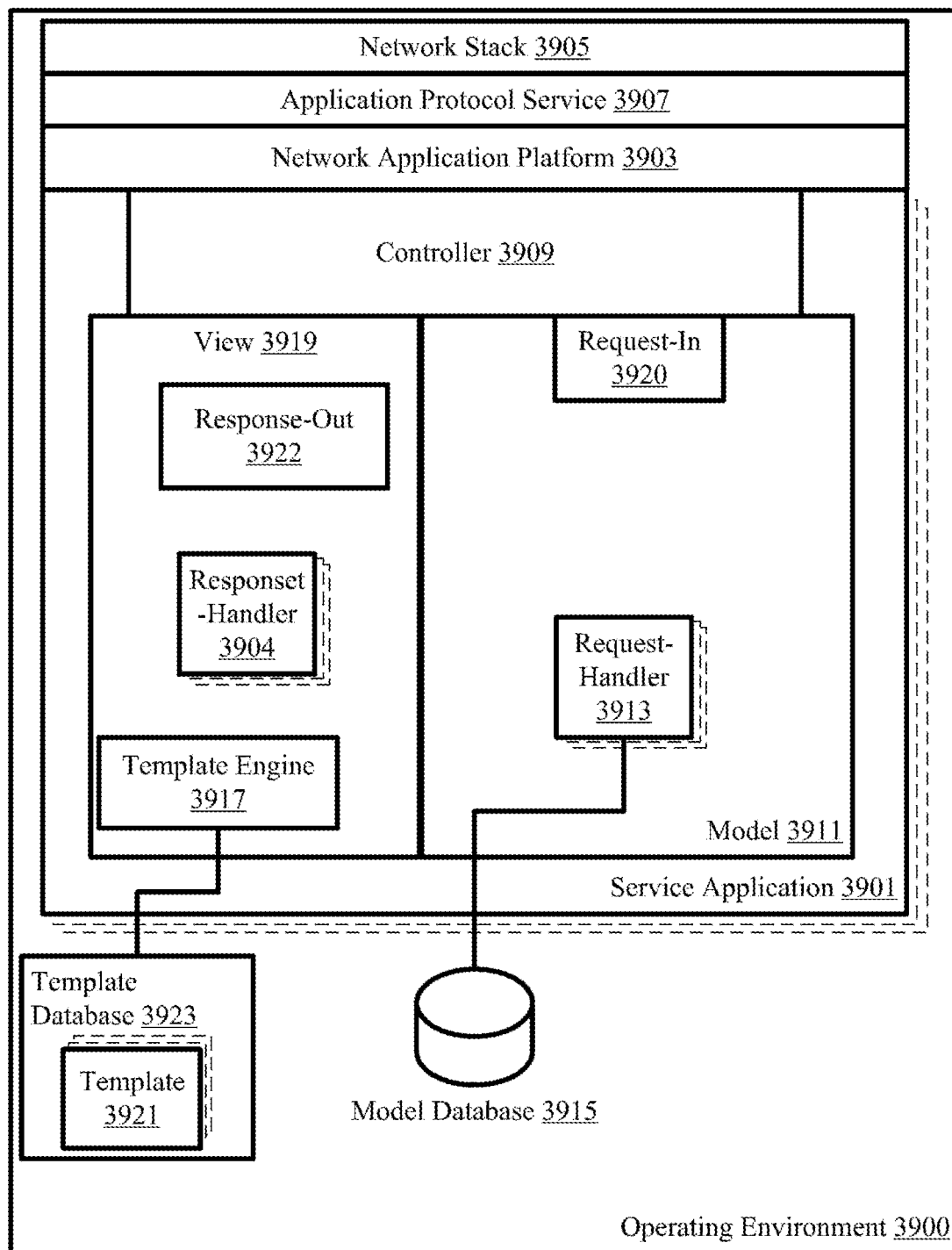
FIG. 39 shows a block diagram illustrating an arrangement of components that may include logic for performing one or more of the methods described herein.

An operating environment suitable for including logic that when executed operates to perform the method 3700 may be implemented in and/or otherwise may include one or more client nodes 114 and/or server nodes 112 in FIG. 1A. FIGS. 38 and 39 illustrate operating environments that separately and/or in combination may include an arrangement of components including logic for performing the method 3700. For example, as described above, various embodiments of operating environment 3800 in FIG. 38 may be modified from an operating environment 200 to include an arrangement of components including logic for performing the method 3700. Also as described above various embodiments of operating environment 3900 in FIG. 39 may be modified from an operating environment 300 to include an arrangement of components including logic for performing the method 3700. Of course, however, logic for performing the method 3700 may be implemented in various embodiments in any suitable operating environment. Further, the aforementioned definitions may equally apply to the description below. Of course, however, logic for performing the method 3700 may be implemented in various embodiments in any suitable operating environment.

In an operating environment 3900 logic to perform the method 3700 may be included in and/or otherwise may be accessible, for example, to an application protocol service 3907, a network application platform 3903, and/or a service application 3901.

For example, as shown in FIG. 39, logic that when executed operates in performing block 3702 may be included in a request-in component 3920 to detect a first URL including a schema identifier that identifies a first URL schema. Logic that when executed operates in performing block 3704 may be included in a request handler 3918 to identify, in response to detecting the first URL, a first user agent to receive a first resource identified by the first URL. In an option, logic that when executed operates in performing block 3706 may be included in a response-in 3920 to detect a second URL including a schema identifier that identifies the first URL schema or that identifies a different schema. Logic that when executed operates in performing block 3708 may be included in a request handler 3918 to also identify, in response to detecting the second URL, a second user agent to receive a second resource identified by the second URL.

Source code may be written for implementing block 3702 in logic included in and/or otherwise accessible to a model service 3917, such as in a request-in component to detect a first URL including a schema identifier that identifies a first URL schema. The first URL may be detected in a request line of an HTTP request. The schema may be identified by detecting a protocol identifier in the request line. Logic that implements lock 3704 may be translated from source code written for including in and/or accessing by request handler 3913, a response handler 3904, a template engine 3917, a template 3921, and/or in a response-out component 3922. The various implementations may operate to identify and/or provide a criterion for identifying a user agent and/or a user agent client, such as a first user agent and/or a first user agent client respectively. The identifying information and/or the criterion information may be included in user agent information that is included in a message (e.g. as a criterion) sent to a client node 114 that sent the corresponding request. The first resource identified by the first URL may be included in the message sent to the client node 114 for processing by the identified user agent and/or user agent client.

Source code may also be written to implement logic for block 3702 and/or for block 3706 that includes a URL in a resource sent in a message from a service application 3901 in an operating environment 3900 of a server node 112 to a client node 114. The message may also include one or more criteria. A criterion may be processed by the client node 114 to identify a user agent and/or user agent client for accessing resource identified by the URL in a request to a server node 114 which may be the same or different server node. Source code may be written to implement logic for block 3704 and/or for block 3708 to detect one or more criteria in the request to access the resource to identify a user agent and/or a user agent client to process and/or otherwise access the resource returned in a response sent from the server node 112 to the client node 114.

In an operating environment 3800 logic to perform the method 3700 may be included in and/or otherwise may be accessible to, for example, a user agent client 3801, a user agent 3805, and/or in an application protocol service 3813 in an operating environment 3800 of a client node 114. Referring to FIG. 38, a content handler 3815 in a user agent 3805 and/or in a user agent client 3801, and/or a user interface element handler 3817 may detect a first URL including a schema identifier. For example the schema identifier may identify, for example, "HTTP" or "HTTPS". In a scenario, block 3702 may be specified by source that may be translated to implement block 3702 in logic that receives input information in response to a user input detected via an input device. The source code may specify that the logic detects a correspondence between the input and a hyperlink in output presented via an output device to a user by a second user agent client 3801 in a second browser 3803. Logic to perform block 3702 may be included in and/or otherwise may be accessible to a user interface element handler component 3817. Further, the second user agent client 3801 may include and/or otherwise may access logic translated from source code specified to implement block 3704 to identify, in response to detecting the first URL, a first user agent 3805 to access a first resource identified by the first URL. The first user agent 3805 may access the first resource in a response received by the client node 114 to a request sent to a server node 112 by the second user agent 3805 based on the first URL.

Additionally or alternatively, source code may be written to implement block 3706 in logic that when executed operates in and/or otherwise is accessible to a user agent 3805 to detect a second URL that includes a second schema identifier. The second schema identifier identifies the schema of the first URL. Source code may be written to generate logic operates to identify the second user agent client 3801 to access a second resource and/or resource generated based on the second resource. That logic may be included in the user agent 3805 to implement block 3708, which may be invoked in response to detecting the second URL. Accessing the second resource may include receiving the second resource in a response to a request, based on the second URL, sent by the user agent that detected the second URL to a server node 112.

Source code may be written to implement block 3702 in logic, translated from the source code, that may be included in and/or otherwise accessible to a user interface element handler component 3817 in a first user agent client 3801. When execute the logic may operate to detect a first URL including a schema identifier. The logic may detect the first URL in a form markup element and/or in a hyperlink processed by the first user agent client 3801. The form and/or the hyperlink may be in content presented via an output device to a user by the first user agent client 3801. The first user agent client 3801 may also include logic translated from source code written to implement block 3704 in and/or otherwise accessible to a component 3815. The logic may be invoked in response to detecting the first URL, and according to the source code may operate to identify a first user agent 3805, to access a first resource identified by the first URL. The first user agent 3805 may send a request, in an HTTP request, that includes some or all of the first URL to a server node 112 to access the first resource. Further, the logic for performing block 3702 in the first user agent client 3801 may be generated from source code written to detect a second URL that includes a second schema identifier. The second URL may be included markup presented and/or to be presented via an output device to a user. The second URL may identify a media item such an image, video stream, and/or audio stream. Logic that when executed operates in performing block 3704 included in a content handler component 3815 may identify a second user agent 3805 to access the second resource by sending a request based on the second URL to a server node 112. The first user agent client 3801, the second user agent 3805, and/or the server node 112 may identify a user agent and/or user agent client to process a response to the request sent by the server node 112 and received by the client node 114.

Further still, the method 3700 may be performed by a user agent client in identifying user agents to access resource identified by corresponding URLs. The user agents may operate to send a request to a server node 112 based on a respective URL. For example, with respect to FIG. 38, a user agent client 3801 may detect a first URL including a schema identifier that identifies a first URL schema. The user agent client 3801 may identify, in response to detecting the first URL, a first user agent 3805 to access a first resource identified by the first URL. The first user agent 3805 may send a message to a server node 112 based on the first URL to access the first resource. The first resource may be received and presented by the first user agent or by another user agent. Output based on the first resource may be presented by the user agent client 3801 or by another user agent client, if one exists in the operating environment 3800. The user agent client 3801 may identify the first user agent 3805 automatically when the first URL is detected. In another embodiment, the first user agent 3805 may be identified based on an interaction with a user. Also, the user agent client 3801 may detect a second URL including a schema identifier that identifies the first URL schema. Again, the user agent client 3801 may identify, in response to detecting the second URL, a second user agent 3805 to access a second resource identified by the second URL. A second resource accessed via the second URL may be received and presented by the second user agent or by another user agent. Output based on the second resource may be presented by the user agent client 3801 or by another user agent client, if one exists in the operating environment 3800.

Figure 40:
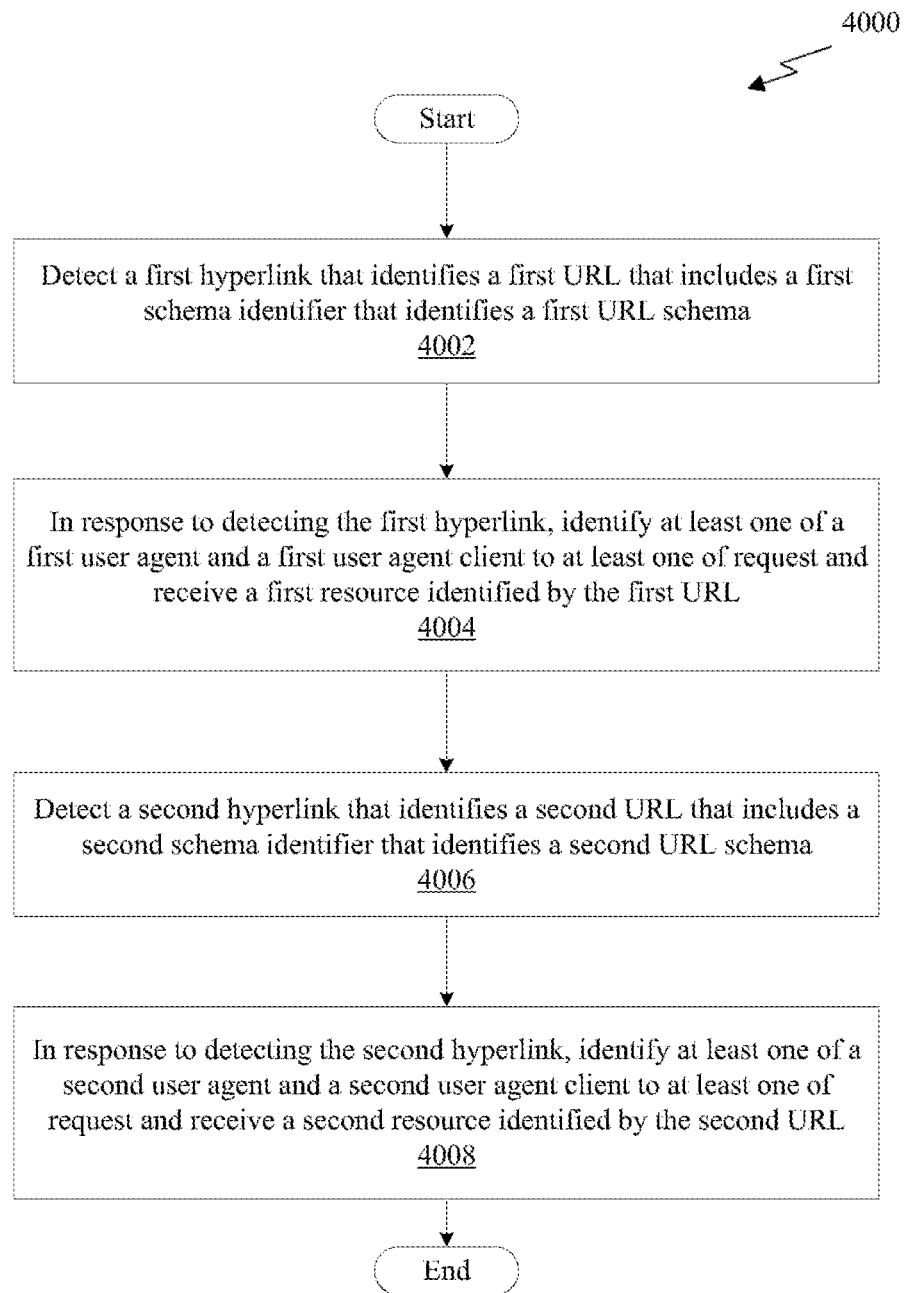
FIG. 40 shows a flow chart of a method in accordance with an embodiment of the subject matter described herein.

FIG. 40 shows a flow chart of a method 4000 in accordance with an embodiment. As an option, the method 4000 may be implemented in the context of the details of any of the foregoing figures. As shown in FIG. 40 at block 4002, a first hyperlink, that identifies a first URL that includes a first schema identifier that identifies a first URL schema, is detected. At block 4004 in the method 4000, in response to detecting the first hyperlink, a first user agent and/or a first user agent client is identified to at least one of request and receive a first resource identified by the first URL. At block 4006 in the method 4000, a second hyperlink, that identifies a second URL that includes a schema identifier that identifies the first URL schema, is detected. At block 4008 in the method 4000, in response to detecting the second hyperlink, a second user agent and/or a second user agent client is identified to at least one of request and receive a second resource identified by the second URL. The detected first hyperlink may be exchanged between a server node 112 and at least one of the second user agent and the second user agent client of a client node 114, or the detected second hyperlink may be exchanged between a server node 112 and the first user agent and/or the first user agent client in a client node 114.

Figure 41:
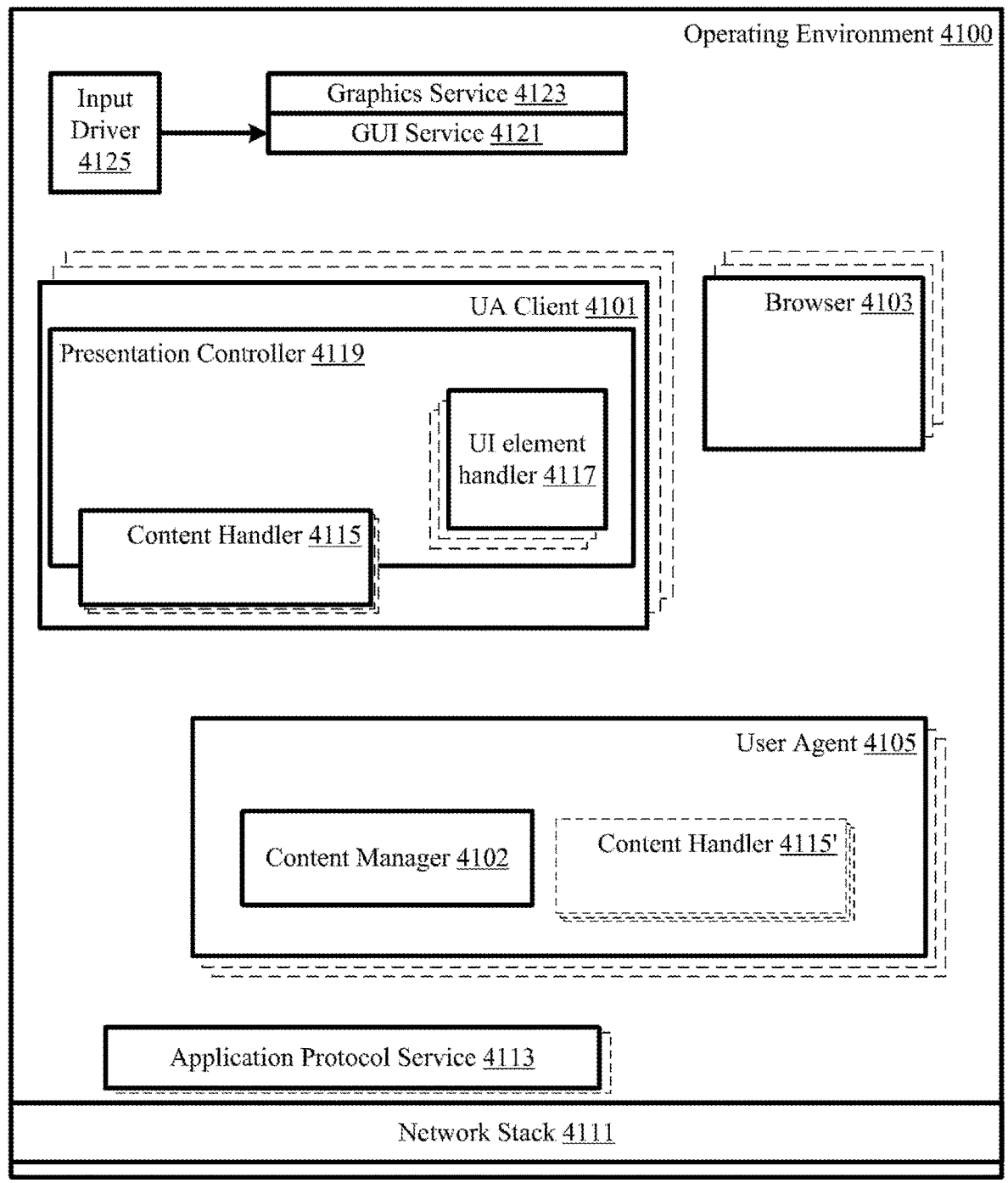
FIG. 41 shows a block diagram illustrating an arrangement of components that may include logic for performing one or more of the methods described herein.
Figure 42:
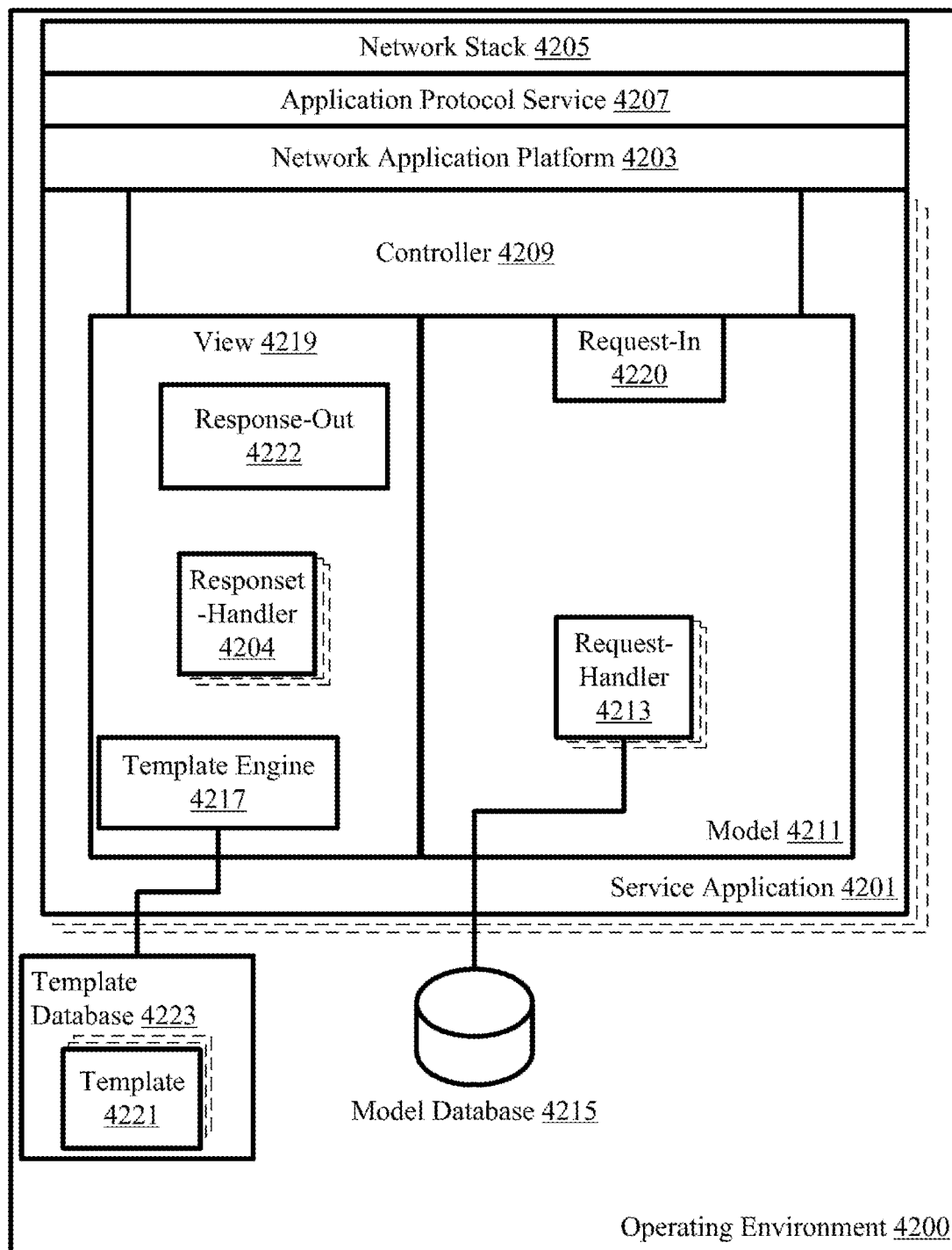
FIG. 42 shows a block diagram illustrating an arrangement of components that may include logic for performing one or more of the methods described herein.

An operating environment suitable for including logic that when executed operates to perform the method 4000 may be implemented in and/or otherwise may include one or more client nodes 114 and/or server nodes 112 in FIG. 1A. FIGS. 41 and 42 illustrate operating environments that separately and/or in combination may include an arrangement of components including logic for performing the method 4000 illustrated in FIG. 40. For example, as described above, various embodiments of operating environment 4100 in FIG. 41 may be modified from an operating environment 200 to include an arrangement of components including logic for performing the method 4000. Also as described above various embodiments of operating environment 4200 in FIG. 42 may be modified from an operating environment 300 to include an arrangement of components including logic for performing the method 4000. Of course, however, logic for performing the method 4000 may be implemented in various embodiments in any suitable operating environment. Further, the aforementioned definitions may equally apply to the description below. Of course, however, logic for performing the method 4000 may be implemented in various embodiments in any suitable operating environment.

In an operating environment 4200 logic to perform the method 4000 may be included in and/or otherwise may be accessible to an application protocol service 4207, a network application platform 4203, and/or a service application 4201. With respect to FIG. 42, logic that implements block 4002 and/or block 4006 may be included and/or may otherwise interoperate with response-handler component 4204 in a view service 4219. The logic be translated from source code that is written to detect a first hyperlink in markup in a first resource to send to a client node 114 by a server 112 of the operating environment 4200 in a message. Alternatively or additionally, logic for performing block 4002 and/or block 4006 may be translated from source code written to detect a URL in resource data such as image metadata, in a message header such as content header, and/or in header in the body of a message such as MIME type header. Such logic may be included in and/or may be accessible to a response-out component 4222, a template engine 4217, and/or other component based on the source code specification and per the desires of and/or requirements for the programmer. The first URL schema may be any suitable schema including an HTTP schema, a mailto schema, a file transfer protocol schema, a schema for a presence entity, an ISBN schema, and the like. Logic that implements block 4004 and/or block 4008 may be included, in an option, in controller component 4209 that constructs and/or routes the message to an application protocol service and/or a network protocol layer to send to the client node 114. Logic for block 4004 and/or for block 4008 may be generated from source code written to identify a criterion and/or criteria for identifying and/or selecting a user agent and/or a user agent client. A criterion may be determined based on a domain in the URL, based on the schema identifier, based on a previously sent URL including the same or different schema identifier, based on a path, based on a parameter and/or parameter value in a query portion of the URL, based on a resource name and/or name extension—to name a few examples. The source code may include instructions translatable to logic that includes the one or more criteria in the message to send to the client node 114. Alternatively or additionally, logic that implements block 4004 and/or block 4008 may be included in template engine 4217 that generates and/or otherwise identifies some or all of a resource to be included in the message to send to the client node 114. Source code may be written for logic in and/or accessible to a template 4221 and/or a template engine 4217 that detects a hyperlink in markup data and adds one or more criteria to the markup to identify a user agent and/or a user agent client. A user agent and/or a user agent client may be identified to receive and/or process the message to be sent to the client node 114. Alternatively or additionally, a user agent and/or a user agent client may be identified to initiate and/or send a request based on the message when sent to the client node 114. Still further, a user agent and/or a user agent client may be identified for sending, receiving, and/or otherwise processing any number of messages exchanged between an operating environment of the client node 114 and operating environment 4200 of the server node 112. A first URL may have a first schema that may be the same scheme or a different schema of a second URL schema.

A user agent and/or a user agent client may be identified based on one or more identifiers and/or criteria included in a message received by a server 112 and/or based on one or more identifiers and/or criteria in a message to be sent by the server 112. Alternatively or additionally, source code may be written to translate to logic that identifies a user agent and/or a user agent client based on any information accessible to the server node 112 per the desires of a developer of the source code and/or per the desires of one who specifies configuration data for the source code and/or for any translation of the source code.

In an operating environment 4100 logic to perform the method 4000 may be included in and/or otherwise may be accessible to, for example, a user agent client 4101, a user agent 4105, a browser 4103, and/or in an application protocol service 4113 in an operating environment 4100 of a client node 114. With respect to FIG. 41, logic to implement block 4002 and/or block 4006 may be translated from source code for a user agent 4105 and/or for a user agent client 4101. The source code may be written to detect a hyperlink that identifies a URL. The URL may include and/or otherwise may be associated with a schema identifier that identifies a URL schema. The hyperlink may be presented to a user in output via an output device. Logic that implements block 4004 and/or block 4008 may be written in source code for a user agent 4105 and/or a user agent client 4101. The source code may include programming language instructions for identifying a user agent 4105 and/or a user agent client 4101 to request and/or to receive a resource identified by the a URL detected by logic that implements block 4002 and/or that implements block 4004 as described above. Logic that implements block 4004 may be invoked in response to executing logic that implements 4002. Similarly, logic that implements block 4004 may be invoked in response to executing logic that implements 4002.

Figure 43:
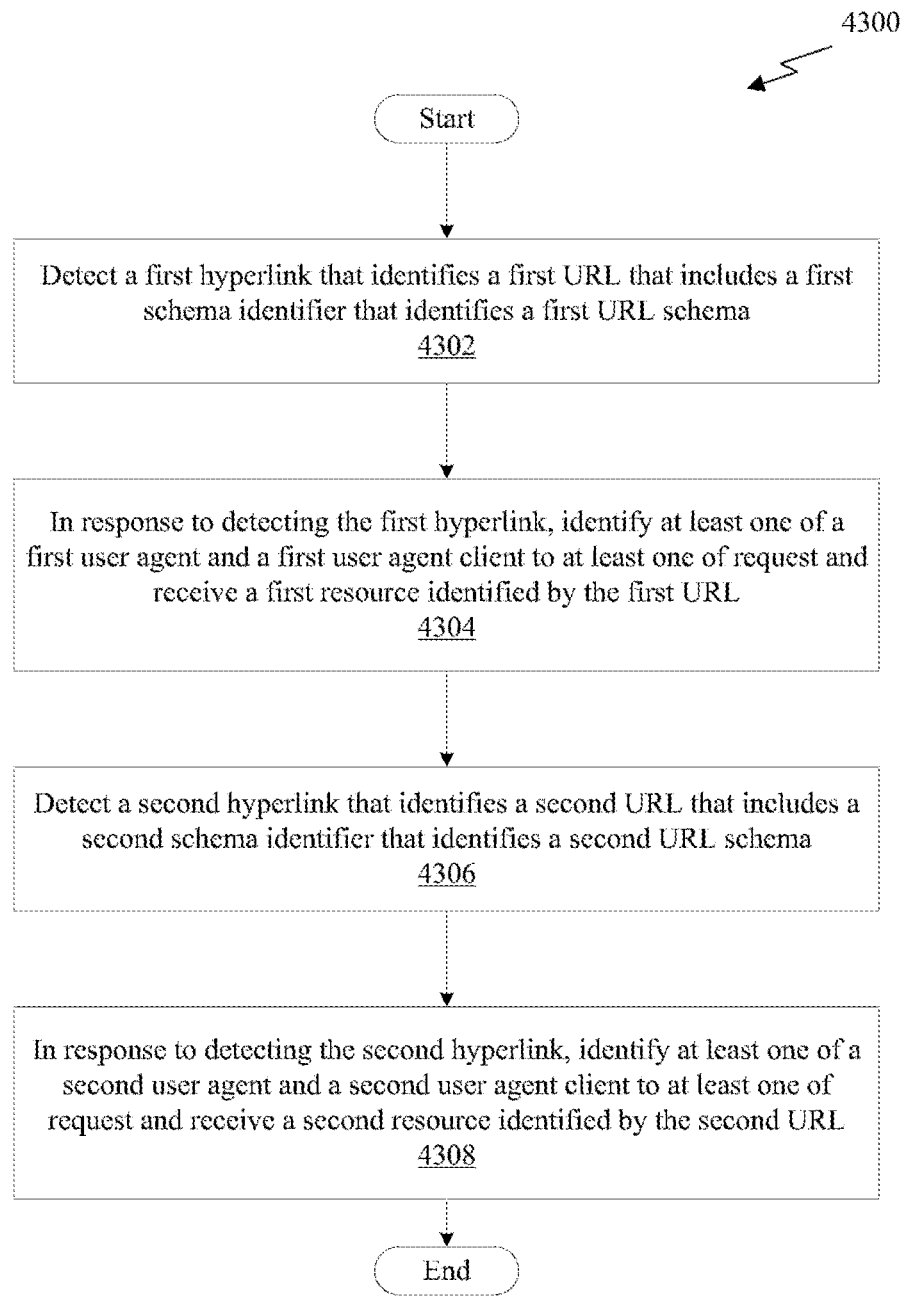
FIG. 43 shows a flow chart of a method in accordance with an embodiment of the subject matter described herein.

As described with respect to operating environment 4200, logic that implements the method 4000 in an operating environment 4100 and/or an analog, may identify a user agent and/or a user agent client for sending, receiving, and/or otherwise processing any number of messages exchanged between an operating environment 4100 of the client node 114 and operating environment of a server node 112. A first URL may have a first schema may be the same scheme or a different schema of a second URL schema FIG. 43 shows a flow chart of a method 4300 in accordance with an embodiment. As an option, the method 4300 may be implemented in the context of the details of any of the foregoing figures. As shown in FIG. 43 at block 4302, a first hyperlink, that identifies a first URL that includes a first schema identifier that identifies a first URL schema, is detected. At block 4304 in the method 4300, in response to detecting the first hyperlink, a first user agent and/or a first user agent client is identified to at least one of request and receive a first resource identified by the first URL. At block 4306 in the method 4300, a second hyperlink, that identifies a second URL that includes a schema identifier that identifies a second URL schema, is detected. At block 4308 in the method 4300, in response to detecting a second hyperlink, a second user agent and/or a second user agent client is identified to at least one of request and receive a second resource identified by the second URL. The detected first hyperlink may be exchanged between a server node 112 and the second user agent and/or the second user agent client of a client node 114, or the detected of the second hyperlink may be exchanged between a server node 112 and the first user agent and/or the first user agent client of a client node 114.

An operating environment suitable for including logic that when executed operates to perform the method 4300 may be implemented in and/or otherwise may include one or more client nodes 114 and/or server nodes 112 in FIG. 1A. FIGS. 41 and 42 illustrate operating environments that separately and/or in combination may include an arrangement of components including logic for performing the method 4300 illustrated in FIG. 43. For example, as described above, various embodiments of operating environment 4100 in FIG. 41 may be modified from an operating environment 200 to include an arrangement of components including logic for performing the method 4300. Also as described above various embodiments of operating environment 4200 in FIG. 42 may be modified from an operating environment 300 to include an arrangement of components including logic for performing the method 4300. Of course, however, logic for performing the method 4300 may be implemented in various embodiments in any suitable operating environment. Further, the aforementioned definitions may equally apply to the description below. Of course, however, logic for performing the method 4300 may be implemented in various embodiments in any suitable operating environment. See, for example, descriptions the present disclosure that describe FIGS. 41 and 42.

In one or more implementations of the subject matter of the present disclosures, a user agent may be identified based on a policy and/or condition evaluated based on a measure. A criterion may specify and/or identify a policy or condition that is evaluated in identifying and/or selecting a user agent client. Alternatively or additionally, a criterion may be included as an input in evaluating a policy and/or in determining whether a condition is met and/or otherwise exists. A criterion may be included in criteria that are processed together to identify and/or select a user agent client. For example, a user agent client may be identified and/or selected based on a size of working set of a computing process, a count of user interface elements in a user interface of the user agent client (e.g. a count of tabs in a browser window), and a measure of processing time for a computing process. A criterion may be represented in a memory location and/or in a signal (e.g. electro-magnetic, thermal, optical, and the like). A criterion may be detected as a pattern of activity or events that occur over a duration which may be bounded or open-ended. A criterion may be represented as a number, a bit pattern, an instruction, a string, a variable, a constant, as a data structure, in a data structure, by a memory location, as a memory address of an executable instruction, by a memory address of a location in memory accessible to a user agent and/or a user agent client, an addressable entity included in and/or referenced by a user agent and/or a user agent client, via a interprocess data mechanism for interoperating with a user agent and/or a user agent client, a semaphore, an interrupt, a lock, a queue, a socket, a stream, a network port, a shared memory location, an output from a sensor, an output of a user output device, an input detected via an input device, a data type, and the like. A criterion may be detected via a memory device, a register of a processor, a stack of a thread of execution, a persistent memory device, a data base, a file system, a removable media, an input device, an output device, a network interface adapter, a bus, a data transmission medium, and the like. A criterion may be detected by logic in and/or otherwise accessible to a user agent client, a user agent, an application protocol service, a network application platform, a service application, and/or via logic in any other component in an operating environment as specified in source code for the logic.

For example, a user input, such as a drag and drop, a finger swipe, and a change in focus of visual attention from a user interface of one user agent client to a user interface of another user agent client may be detected via one or more input devices. Input information may be received by and/or otherwise accessed by one or both user agent clients. One or both clients may create an association that may be represented in data stored in a memory of a storage device. The data in the association may identify one of the user agent clients for presenting output based on a resource identified by the other user agent client. In an option, an input may be detected that corresponds to output previously presented via an output device. A user agent client may present output via an output device that identifies one of the user agent clients to present output based on a first resource to access. Input information and/or a user interface element may correspond to markup, image data, audio data, plain text, script instructions, and/or a data base record—to name some examples of which each may include a criterion and/or may have metadata that includes a criterion. For example, a document object model (DOM) for an XML document (e.g. an HTML document) presented as output may include a form markup element that identifies a URL for accessing a resource to present. The form markup may include an identifier of a browser, a user agent client, and/or a user agent. A criterion may include and/or may be included in an image, an image map, resource to be sent in a request, a URL (in a form or hyperlink and/or URL), in a configuration setting received from a user and/or accessible via a network, presented output, a script instruction, a schema identifier such as a MIME type, a keyword, a type of service application accessed and/or to be accessed, a security setting, a user, a legal entity such as company, a law, a regulation, a role of a user, a state of a device, a cost, a measure of performance, a measure of risk, an error indication, logged resource, a task, a type of service, a transaction, a payer, a payee, an item for sale, and a price—to name some examples. A user agent client and/or a user agent may store an association that identifies a user agent client and/or a user agent to present output based on and identified resource. The stored association may be processed as a criterion for identifying the user agent to send a request to access the resource, the user agent to receive the resource in response to the request, and/or the user agent client to present output based on the resource.

A criterion may be detected by logic in and/or otherwise accessible to a user agent that sends a request to access a resource upon which output may be based. As described above an input may identify a URL. The URL may identify a service application accessible via a server node. The user agent client may process the URL as a criterion to identify a user agent client. The user agent client may identify a user agent client. The user agent client may provide the criterion to a user agent for identifying and/or selecting a user agent client. Alternatively or additionally, the user agent client may access a record stored in a memory that identifies information to be sent in a request to a server node as criteria and/or a criterion. The information, for example, may be personal information such as person's name and address. A configuration setting may associate personal information with a particular user agent client and/or with a particular user agent indicating that the particular user agent client and/or user agent client is to be included in requesting a resource and/or to be included in processing a resource received in a response. A user agent client may store data that associates a user agent client and/or a user agent with a type of resource, a service provider, a service application, a service type, an attribute of an operating environment of the user agent and/or user agent client, an attribute of another operating environment, a measure associated with a network, a measure associated with a hardware and/or a software component of the operating environment of the user agent and/or the user agent client, and the like. Data in the stored association may be processed as a criterion for identifying a user agent and/or a user agent client. A user agent and/or a user agent client may be identified by identifying a web browser and/or other application that includes and/or that otherwise accesses the user agent and/or the user agent client.

Source code may be written to generate logic for a user agent to generate, detect, and/or otherwise identify a criterion. A user agent client may invoke logic, in a user agent, generated from source code for sending send a request a resource identified by data accessible to the logic invoked. In a scenario, a user agent client may provide a criterion for identifying a user agent client and/or a user agent. For such a scenario, source code may be written to generate logic to receive and/or otherwise detect the criterion as provided by the user agent client and/or otherwise based on a means by which the criterion is provided. Source code for the user agent may be written to generate logic that includes the criterion provided by the user agent in the request to be sent. Alternatively or additionally, source code may be written to generate logic that transforms the provided criterion to a different criterion in name, format, syntax, etc. The logic, may alternatively or additionally, generate, receive, and/or otherwise identify a criterion not provided by the user agent client. A user agent may discard and/or ignore a criterion received from a user agent client, may transform the criterion as mentioned, and/or may identify a criterion not provided by and not based on a criterion received from the user agent client. According to source code for logic in a user agent, the user agent may include the same and/or a different criterion in the request to send to a server.

As described above, an input may identify a URL. The URL may identify a service application accessible via a server node. A user agent and/or a user agent client may process the URL as a criterion to identify a user agent client and/or a user agent to be include in sending a request for a resource identified by the URL, a user agent to receive the resource via a response to the request, and/or a user agent client to present output based on the resource.

In the context of the present description, a criterion for identifying a user agent and/or a user agent client may include any code (e.g., scripting language, etc.), metadata (e.g., associated with a resource, etc.), an interaction, a signal received via a data transmission medium, historical information (e.g., cookies, logs, statistics, measurements, etc.), a relationship between first output and second output and/or a respective first resource and a second resource, context dependent input (e.g., based off of sensors, based off of word selection, based off of pattern recognition, etc.), an advertisement or marketing information, and/or information which relates to a user interface element associated with a user agent and/or associated with a user agent client, a presentation space, a service application or information related to a service application. In an option, a particular user agent and/or a particular user agent client may be identified and/or selected based on a content type of resource identifying a URL and/or resource identified by a URL. For example, resource having a MIME type of image/* may be provided to a particular user agent for preprocessing and to a particular user agent client for presenting via an output device. The particular user agent may include a content handler and/or plugin that maintains an image cache that performs better than those of other user agents per some condition and/or measurement. Alternatively or additionally, a criterion may be based on a network protocol address, an application protocol address, a symbolic identifier of a network node, an alias associated with network protocol address and/or an application protocol address, an attribute of a user of a user agent, and a security attribute some or all of resource for representing in an output via an output device, a client node, a server node, a service application, a service provider, a hop network path, and a type of protocol address included in relaying a resource to a user agent from a service application, a geo-spatial attribute, a performance attribute, a security attribute, a reliability attribute; a markup element in a resource; a script in a resource; an executable in a resource; an owner of a resource, an administrator, a developer and/or programmer, a seller, a reseller, a regulator, a region of a network, error condition in a user agent and/or user agent client, number of tabs open, CPU usage, blocked thread(s) and/or processes, a size of working set, swap activity, a scan of incoming data packets and/or messages, monitored URLs associated with presented output, a resource from a user agent client, a type of request, a network protocol for the request, a received resource, a resource to be received, an attribute of another user agent, and/or an attribute of another user agent client.

A criterion may be based on an internet session, including data from the internet session (e.g., cookies, etc.). A criterion may be based on placement and/or relative position of items in a resource (e.g. an HTML document) and/or in output presented via an output device (e.g., widgets, multimedia items, data objects, etc.). A criterion may be based on prior activity associated with previously identified, and/or received resources accessed via a service application. A criterion may be based on prior activity associated with previously presented output based on a previously identified, requested, and/or received resource. Further, resources and/or output based on the respective resources may be associated with a criterion determined, received, and/or otherwise identified based on a previously identified, requested, and/or received resource and/or a previously presented output based on a respective previously identified, requested, and/or received resource. In this manner, criterion may be tailored according to the user's preferences and history.

Logic may be generated form source code written to detect a type of a file as accessed by a service application in an operating environment of a server node. A criterion may be identified by logic in the server based on the file type. A file type may be identified in a URL, in a content header, and/or in a resource included in a message sent by the server node to a client node (e.g. "www.somedomain.com/index.htm"). Logic in an operating environment of the client node may determine and/or otherwise identify a criterion based on the file type. A user agent and/or a user agent client may be identified and/or selected based on the file type. "HTM" files may be directed to MICROSOFT INTERNET EXPLORE while "HTML" files may be routed to another browser, such as MOZILLA. Other exemplary file types that may be processed as criteria and/or may be processed in identifying criteria include "PDF", "MP3", and "WEBM" among others A first resource presented as first output by a user agent interoperating with a user agent client in an operating environment may reference a second resource to be presented as second output in the first output. As an option, a criterion may for the second resource identify a different user agent client which may present the second output, and/or a different user agent may request and/or receive the second resource than the user agent that requested and/or received the first resource.

A first portion of a resource may be presented as a first portion of output based on the resource by a user agent interoperating with a user agent client in an operating environment based on a criterion. A second portion of the resource may be presented as a second portion of the output by a different user agent client which may present the second output and/or a different user agent may request and/or receive the second resource than the user agent that requested and/or received the first resource based on a criterion. For example, a portion of webpage including credit card information may be processed by a different user agent and/or a different user agent client than another portion of a resource and/or webpage. A criterion may identify a browser determined and/or identified to have a specified security attribute to process the credit card portion of the web page.

A user agent and/or user agent client criterion may be based on a metric. Exemplary metrics include a metric based on a network, a memory location such as a cache, authentication, authorization, security, a whitelist, a blacklist, a task, a payment, a purchase, an item or sale, a natural environment, a group, a legal entity, a society, heat, power, light, sound, a nuclear particle, energy, family, a role of user or group, privacy, a government, a network path, a proxy, a network relay, a schema, a detected error, a warning, and the like. For example, a metric may include a count of items of a specified type. The items may counted in response to receiving some or all of them via a message sent via a network. The count may for items received, sent, created, modified, identified, and/or detected in a time period which may have a fixed duration or not. The count may be associated with and/or based on one or more users.

The subject matter of the present disclosure allows a service provider and/or a service application in server node to process a criterion from a client node as a requirement or as a suggestion. As such an employer, a bank, an insurance company, a retailer, a wholesaler, an auction service, a social media service, and/or a search service—to name a few examples—may identify a browser, user agent, and/or user agent client to be included in accessing and processing a resource. Alternatively or additionally, a user and/or administrator of a client node that accesses a service application may identify a browser, user agent, and/or user agent client to be included in accessing and processing a resource provided by the service application.

Criterion may be determined dynamically or may be preconfigured and/or otherwise predetermined.

In an option, code and/or instructions to present output may be retrieved from a URL associated with a resource. In other embodiments, resource may be retrieved via a request (e.g. a web query, a database query, etc.), may be retrieved in response to an activity (e.g., social networking updates, blog updates, etc.), and/or may be retrieved from any other element or source associated with the output.

In an option, determining, selecting, and/or identifying a user agent and/or a user agent client in the context of the present disclosure may be performed automatically based on a received, detected, generated, and/or identified criterion in implementations of methods of present disclosure. In another option, user interaction may be included in selecting and/or identifying a user agent and/or a user agent client in implementations of methods of present disclosure.

In the context of the present description, a criterion for identifying and/or selecting a user agent and/or a user agent client may be detected in a computing process associated with the user agent and/or associated with a user agent client. A first criterion for identifying and/or selecting a user agent and/or a user agent client may be detected by a first user agent and/or a first user agent client in a first computing process of an operating environment. A second criterion for identifying and/or selecting a user agent and/or a user agent client may be detected in a second computing process associated with a second user agent and/or a second user agent client. Logic in the first computing process may identify the first user agent and/or the first user agent client based on the first criterion. Logic in the second computing process may identify the first user agent and/or the first user agent client based on the second criterion. Alternatively or additionally, logic in the first computing process may identify the first user agent and/or the first user agent client based on the first criterion. Logic in the first computing process may identify the second user agent and/or the second user agent client based on the second criterion.

Further, first output may be presented to a user via the first user agent and/or the first user agent client and second output may be presented to a user via the second user agent and/or the second user agent client in the second computing process where both the first output and the second output are presented in a same user interface element. The first user agent and/or first user agent client may operate in a first computing process. The second user agent and/or second user agent client may operate in a first computing process. As an option, source code may be written to generate logic to present the first output and the second output in a same computing process which may be one of the first computing process, the second computing process, or a third computing process.

The user agent client may be developed, tested, sold, installed, and/or maintained by an entity different from one or both of the first user agent and the second user agent. In an option, a first output may be presented in a first tab user interface element and a second output may be presented in a second tab user interface element. For example, in various embodiments, a first output may include a video stream (e.g., Youtube, Vimeo, previously uploaded video, etc.), and a second output may include a text article. In such an embodiment, a website may include information associated with the first output and the second output (e.g., URL, etc.), and based off of the information, the video stream may be displayed on a first tab of a browser, and the text article may be displayed on a second tab of a browser.

While the present disclosures uses the terms "user agent" and "user agent" client, those skilled in the art will realize based on the descriptions and drawing of the present disclosure that the scope of the subject matter includes methods and systems for identifying and/or selecting a browser for requesting a resource identified by a URL and/or selecting a browser for processing the resource received in response to the request. The subject matter includes methods and systems for identifying and/or selecting a browser for requesting a resource received and/or otherwise identified in a message sent asynchronously from a server node to a client node.

In an option, a first criterion may be detected by a first thread of a computing process and a second criterion may be detected by a second thread of the computing process. Still yet, in various embodiments, a first criterion may be detected in a first thread of the first computing process and a second criterion may be detected in a second thread of the first computing process. Additionally, a detecting of a first criterion may be performed by first logic, executed by a processor, that may be generated from first source code written in a programming language and a detecting of the second criterion may be performed by second logic, executed by a processor that may be generated from second source code written in a programming language. Moreover, logic for a user agent client may be from first source code or from third source code.

More than one user agent may operate in a single computing process in an operating environment. The process may have one or more threads. Each user agent may use a respective thread and/or may share one or more threads. In an option, multiple user agents may operate in respective separate computing processes in an operating environment. The respective user agents may be developed, tested, sold, installed, and/or maintained by different entities. As such, an indicator to present output based on a resource received by a user agent and/or identified by a URL may be detected by a user agent operating in a first computing process in an operating environment and another indicator may be detected by a user agent operating in a second computing process of the operating environment. The user agents in the respective processes (and/or threads) may be different instances of the same executable code or they may be operating based on different code. In an option, a user agent client that presents the output associated with the first criterion and the output associated with the second criterion may operate in the first computing process.

In various embodiments, the first criterion may be detected in a first computing process of a first user agent client. In another embodiment, a first parent user interface element may be presented by the first user agent client. The first parent user interface element may include a visible first input user interface element associated with interoperating with the first user agent while a user interface element in a first child user interface element has input focus for a first input device. Additionally, the first parent user interface element may not include the visible first input user interface element while a user interface element in a second child user interface element has the input focus.

Output may be presented based on various types of data in a resource including markup, executable instructions, image data, video stream data, audio stream data, streamed text, encrypted data, and the like. A resource may include an identifier of another resource, such as a URL in a hyperlink.

A first resource received by a client node from a server node for presenting first output may be received in a message of a first network protocol and/or a first application protocol and a second resource received by the client node from a server node for presenting second output may be received in a message of a second network protocol and/or a second application protocol. The first resource and the second resource may be received via proxy or relay node and/or via any suitable node in a network path included in transmitting the first resource and/or the second resource. The first resource and the second resource may be received via a same network path or a different network path, a same proxy/relay, or different proxy/relay.

In an option, a first child user interface element including first output based on a first resource and the second child user interface element including second output based on a second resource may both be at least partially visible to a user. For example, the first output may be presented in a first window along with second output presented in a second window. In another embodiment, the first output may be presented in a first HTML frame and the second output may be presented in a second HTML frame. Additionally, a first parent user interface element may include a visible first input user interface element enabling interoperation with the first user agent while a user interface element in the first child user interface element has input focus for a first input device, and in another embodiment, a first parent user interface element may not include the visible first input user interface element while a user interface element in the second child user interface element has an input focus.

Still yet, in another option, a first URL may include a hypertext markup language protocol (HTTP) schema identifier, and a first resource may include at least one of hypertext markup language (HTML), eXtensible markup language (XML), first source code written in a programming language (script), logic generated from second source code written in a programming language, image data, audio data, streamed resource, and/or any other resource and/or code which may be used in a URL.

A first resource and a second resource may be accessed by a client node via a first server node. Alternatively or additionally, a client node may access a resource from a first node and access another resource from another node.

In an option, a first resource may be included in a multipart message and another part of the multipart resource may be routed to at least one of a second user agent and a second user agent client. Additionally, a second user agent may not be operable for presenting a second output in a presentation space.

In another embodiment, the first resource may be received by the first user agent via a network from a remote user agent. The first resource may be received in an email, an instant message, an MMS message, an SMS, message, a message including audio data and/or video data, and/or may be received via streaming protocol. Similarly, the second resource may be received by the second user agent via a network from a remote user agent which may be the same user agent that sent the first resource or may be a different remote user agent. The second resource may be received in an email, an instant message, an MMS message, an SMS, message, a message including audio data and/or video data, and/or may be received via streaming protocol.

A user agent client may receive first presentation information based on a first resource received and/or otherwise identified by the first user agent. The user agent client may operate to present output, based on the first presentation information in a first child user interface element of a first parent user interface element. The first parent user interface element may include a second child user interface element including second output, based on a second resource received and/or otherwise identified by a second user agent.

In an embodiment a user agent and a user agent client that interoperate to request a resource and/or that interoperate to present output based on a received resource may operate in different operating environments which may be operating environments of different nodes.

In an option, a URL and/or resource identified by the URL may include another URL identifying a criterion. Moreover, in some embodiments, one or more of the methods described herein may further include accessing a first criterion and identifying a first user agent; detecting user input that may correspond to a representation of a first hyperlink presented via an output device and performing an automatic identifying to the first user agent, in response to detecting a user input; detecting a first type of content identified by a first URL and automatically identifying a first user agent, in response to detecting a first type of the content; determining that a first URL may include a first namespace domain identifier and automatically identifying a first user agent, in response to determining that a first URL may include a first namespace domain identifier; detecting at least one of a first URL modifier and a first value of the first URL modifier and automatically selecting a first application, in response to detecting the first type of the content (e.g., modifier identifies the first application, etc.); detecting at least one of a node identifier and a path identifier included in an access to a first resource in and/or otherwise based on the first URL and automatically identifying a first user agent, in response to detecting at least one of a node identifier and a path identifier; detecting at least one of a first parameter and a first parameter value in a query portion of a first URL and automatically identifying a first user agent, in response to detecting the at least one of a first parameter and a first parameter value; and detecting that a first URL may be identified by a first markup element and automatically identifying a first user agent, in response to detecting that the first URL is identified by the first markup element.

In some embodiments, a user may take an action on a website which affects which a resource and/or output presented based on the resource. In other embodiments, a user may take an action on a website which affects how output based on a resource is presented. As an example, a user may select to disable comments on a video sharing site. Based off of this input, the next time the user visits the video sharing site, the comments will be automatically disabled. In various embodiments, the user may retain control of the configuration of presentation, including, for example, the ability to disable customizing the presentation of resource based off of the user's history, the ability to selectively customize the presentation information (e.g., automatically apply the customization but allow the user to interact with the filtered portions to enable them if desired, etc.), and/or any other ability whereby the user may control the presentation of the resource.

For example, in an option, in addition to selecting to disable comments, the user may select to activate or disable any other textual input or multimedia input. Further, in other embodiments, the user may select to activate or disable other feeds (e.g., RSS, etc.), advertisements, scripts (e.g., java, python, ruby, etc.), styles (e.g., CSS, etc.), sources (e.g., external sources, within network sources, within social networking connections, etc.), and/or any other output element presented. Still yet, in an option, selecting to activate or disable a website element may include applying a filter (e.g., block, overlay, etc.) to the website element. In a separate embodiment, a filter may be used for children to implement viewing restrictions, as specified by predetermined settings set by a parent. In another embodiment, a time constraint filter may be applied to the content to modify what content is presented (e.g., news in the morning, funnies at night, etc.). Of course, any element presented may be disabled and/or enabled in any manner.

In other embodiments, how output is presented may be modified. For example, in various embodiments, the user may move the output to be viewed in a separate pane and/or area of the display device (including, for example, a separate part of the website), may select a different color scheme to be applied to the output, may select one or more time constraints to filter how output is presented (e.g., white background when it is light out, black background when it is night, etc.), may select a specific display to show the output (e.g., external monitor, mobile device, television, etc.), may select a preconfigured size (e.g., enlarge all text and images by 115%, etc.), and/or may alter how the output is displayed in any manner.

As an example, in an option, a user may access a video sharing site and may configure the site such that the video is enlarged to a predetermined size, the rest of the website is darkened, and the video is not automatically played (i.e., it requires a user to select "play," etc.). In a different embodiment, a user may access a social networking site and may only be interested in viewing video and photos uploaded by associated friends. As such, the text may filtered out, all of the photos from that day's uploads may be aggregated into one slideshow for the user to view, and all videos may be aggregated into a series of videos for the user to view. The user may select to view the photos and the rest of the photos will be automatically presented (e.g., as a slideshow, etc.). In this manner, what output is displayed, as well as how it is displayed, may be configured by the user, and may be applied in subsequent visits.

In an option, a user may visit a new website not hitherto before visited. Even though the user may not have before visited the site, what output is displayed, and how it is displayed, may be influenced and/or applied based off of other similar and/or related sites. For example, in an option, a user may visit a first photo sharing site and may select to view all images which are in the public domain at maximum resolution. The user may visit a second photo sharing site, and the options selected on the first photo sharing site may be applied to the second photo sharing site. In this manner, a user's history may be applied to any other potentially applicable website in the future.

Additionally, in an option, resources for presenting output may be provided by one or more sources. For example, in an option, one or more resources may come from a web based database, a local based database, from a client node or a server node, from a program on a client node or a server node, and/or from any other location. In another embodiment, more than one source may be accessed simultaneously (e.g., resources from web and local resources, etc.) to be presented on the display device.

As an example, a user may access an education website. On one side of the webpage, the user may view the video of the class presentation. On the other side of the webpage, a pane may allow the user to incorporate resources (e.g., Microsoft® Word, Photoshop, etc.) available on the user's computer. The resources available on the user's computer may therefore be integrated and used in the website. In this manner, more than one resource, a video accessed through the internet, and resources provided by the user's computer, are presented as on the website.

In an option, disabling/enabling an output element may be dependent upon one or more conditions. For example, the conditions may include paying a fee (e.g., a one-time fee, a subscription fee, etc.), fulfilling a quota (e.g., distributing content to a threshold number of connections, etc.), fulfilling a requirement (e.g., "like" a number of entities, etc.), and/or fulfilling any other predetermined prerequisite.

As an example, in an option, a user may seek to disable the display of all ads on a website. In an option, the user may pay to remove all ads from the website. Of course, in other embodiments, the user may select one of plurality of tiered options, including disabling a particular ad, a particular brand, a particular source (e.g., producer, marketing firm, etc.), and/or any other option which may be selected by the user.

In other embodiments, a user history associated with one device may be accessed and used by other devices. For example, in an option, a user may be associated with more than one device, and interaction with any of the devices may be saved and used to display content on any of the devices. In this manner, what is displayed and how it is displayed are device ubiquitous. In an option, a central server node system may be used to collect information (e.g., settings specified by the user, etc.). In another embodiment, a browser local to one device may be used to collect information associated with the user, and may transfer that information to another browser on a separate device associated with the user. Of course, any syncing mechanism may be used to ensure that information associated with the user is saved and may be used for future interactions.

Still yet, in an option, a resource being received may trigger one or more requests for resources. For example, in an option, an output may be presented in and/or may include a pane (e.g., a java pane, a flash pane, an HTML5 input, etc.) which provides for an input feed from the user. In various embodiments, the input feed may include a video (e.g., a camera, a webcam, etc.), a program (e.g., hosted on the user's computer, etc.), and/or any other resource not directly associated with the source website. As an example, in an option, a pane on a website may request a resource from a user. The user may select the applicable resource (e.g., Adobe® Photoshop, etc.). The resource may run on the computer, but features and/or displays associated with the resource may be integrated into the website. In this manner, a pane may request a resource to be utilized within the website. Of course, it should be understood that any application and/or resource native to a user's computer may be used and integrated into a website.

In another embodiment, a resource may be associated with a user but not be hosted or located on a user's computer. For example, a user may have access to online resources, including an operating system (e.g., Microsoft® Azure, etc.), programs (e.g., Adobe® Creative Cloud, Microsoft® Office 365, Pixlr, Magisto, etc.), networking sites (e.g., Linked-in®, Facebook®, etc.), media sharing sites (e.g., Flickr, etc.), and/or any other resource which may be located online. In various embodiments, the user may select to use features associated with an online resource within another website. For example, in an option, a user may access a database storage site. Within the website may be a pane for resources associated with the user. The user may select to run a word document program (e.g., Microsoft® Office 365, etc.) to display and edit a document stored on the database storage site. Or, the user may decide to run a movie editing program (e.g., Magisto, etc.) to display and edit one or more video files stored on the database storage site.

In an option, code and/or instructions to present output may be retrieved from a URL associated with the resource. For example, in various embodiments, the URL associated with the resource may include a direct link (e.g., a specific address to a content resource, etc.), a subdomain (e.g., a content is retrieved based off of group domain setting, etc.), a dependency relationship (e.g., a URL may cause information provided by a sensor on a device to be retrieved, present information about the closest restaurant based off of the user's location, etc.), a condition (e.g., if user X is near friend group A1, then request permission to access a device associated with friend group A1, etc.), a context (e.g., time, place, syntax language structure, etc.), and/or any other factor which may be used in a URL and be associated with content.

In another embodiment, integration of device-based and cloud-based resources may be optimized. For example, in various embodiments, a website may be requested. Embedded in the website may be code to display an interactive pane (e.g., to receive input from the user, etc.). In an option, rather than display an interactive pane retrieved from a server node which may increase latency between the device and the server node, the website may automatically cause a device-based program to be used within the interactive pane. In this manner, resources displayed on a website may come from one or more sources, local or cloud-based, and may be fetched based off of a determination of which resource will most decrease latency (i.e., lag, etc.) between the device and the server node.

Still yet, in an option, a collection agency may be used to store history information associated with a user, a website configuration (e.g., placement of elements, etc.) associated with a URL, resources fetched and/or retrieved, and/or any other element associated with a website or a user. In another embodiment, information stored with the collection agency may be used to optimize website presentation, including, for example, decreasing loading time based off of prior usage, automatically rearranging the site based off of prior changes, and/or automatically displaying input elements as previously configured. In an option, information stored with the collection agency may be applied to websites not heretofore visited by a user. For example, in an option, a user may visit a news site, select one or more genres to view, enlarge the text of the articles, and disable viewing of any comments or ads. Such changes may be applied by the collection agency to any similar and/or related site in the future (e.g., other news agency sites, etc.).

Of course, in other embodiments, the collection agency may include a third party database storage repository, one or more devices associated with a user, a server node system, an intranet resource, and/or any other device which may store information associated with a website or a user. Further, in another embodiment, the collection agency may include one or more profiles which may be applied to a user's viewing experience, including, for example, a minimalist approach (e.g., reduce clutter on the website, etc.), a media focus approach (e.g., eliminate everything on the page except the video or photo stream, etc.), a time approach (e.g., daytime white background with black text, nighttime black screen with white text, etc.), and/or any other setting which may be saved as a profile.

Additionally, in an option, a history associated with a first user may be used to improve the viewing experience of a second user. For example, in an option, a second user may access a news media site, and desire to apply the first user's settings and/or changes to the site. The second user may select the first user as a profile to be applied on the second user's display device. In another embodiment, the first user may control how settings and/or history are shared with other users.

In an option, if it is determined that changes have been made to a website (e.g., what content is presented, how content is presented, etc.), the user may be presented with a list of options, including, saving the information for future use with this website, saving the information for future use with this website and/or any similar or related websites, sharing the information for use by other users, and/or any other option associated with changes made to a website and/or associated with a user. In an option, the website and/or resources and/or changes made to the website may be associated with a white list (e.g., permissible use, etc.) or black list (e.g., non-permissible use, etc.).

In another embodiment, one or more APIs may be integrated based off of a resource request. For example, in an option, a request may include a request for a video (e.g., a URL link associated with a video, etc.). Rather than redirecting the user to a separate site to view the video, the API associated with the video (e.g., a Youtube® embedded API, etc.) may be retrieved and integrated within the site. Therefore, selecting to view the video may cause a video API to run within the website. In this manner, the user is not required to leave the website to view and/or interact with output based on a resource.

In a separate embodiment, one or more apps may be integrated based off of a resource request. For example, in an option, a request may include a request for a video (e.g., a URL link associated with a video, etc.). In response to the request for a video, an app may be retrieved and caused to be run within a pane of the website, thereby allowing the video to be played without having to leave the website. Of course, in other embodiments, any program and/or app may be used to provide one or more functionality to the website.

In an option, external display devices may be used in conjunction with a primary display device. For example, in various embodiments, output may be redirected to an external display device (e.g., television, etc.), to a secondary device (e.g., attached monitor, etc.), to a device associated with another user (e.g., to a trusted friend's device, etc.), and/or to any other display device which is capable of displaying the content.

Further, in other embodiments, one or more APIs may be integrated into a website, including chat functionality, RSS feeds, social plugin(s), context plugin(s), event plugin(s), translation functionality, localization functionality, and/or any other API which may provide additional functionality and which may be integrated in some manner into the website. Additionally, in an option, a website may provide for third party resources to be integrated into the website through the use of one or more APIs. For example, a social plugin API may be placed on a website, and a user may select which type of social plugin is retrieved (e.g., Facebook®, Twitter®, etc.). In other embodiments, the social plugin API may be dependent upon a marketing bidding system, where the highest bidder (e.g., social networking company, etc.) can advertise within the social plugin API.

Additionally, in an option, resources available from any online source may be retrieved and integrated into websites. For example, in various embodiments, a user may provide one or more customizations to a website which allows for resources from a separate online source to be retrieved and integrated into output of a website.

In other embodiments, updates to a website may be provided to a plurality of individuals. For example, in an option, a calendaring website may seek to integrate a real-time traffic update. Rather than redirecting the user to a separate site, a traffic API may be integrated, and information from a crowd-based platform may be provided to update the traffic API. In an option, the crowd-based platform may include a plurality of individuals, where a device associated with each individual provides one or more updates to the central traffic platform service. Therefore, when a user selects a calendaring appointment, a traffic API may be displayed on the website, which shows real-time map information based off of inputs from a plurality of sources and/or devices.

In an additional embodiment, a plurality of users may be associated with a display device. In such an embodiment, each user may have a user-based history and settings to be applied to the presentation experience. As an example, a first user prefers to maximize media content, whereas a second user prefers to increase the font size of all text content. In this manner, the display device may automatically determine (e.g., through login information, through face detection functionality, through biometric information, etc.) and apply settings relating directly to the active user using the display device. Of course, in another embodiment, any number of users may be associated with a display device. In various embodiments, therefore, presentation settings may be associated according to a specific user, or may be associated directly with a display device, regardless of the user.

In various implementations of the subject of the present disclose, logic for accessing a resource may include logic included in creating and sending a message, such as an HTTP request, via a network interface coupled to a network to a network interface of second node. As such a user agent client may access a resource by providing a URL or other identifier of the resource to a user agent to send a request for the resource. A user agent may access the resource by interoperating with an application protocol service and/or a network stack to send the message. An application protocol service may access the resource by interoperating with a network stack and/or a network interface adapter to send the request. Alternatively or additionally, accessing a resource may include logic included in receiving, parsing deconstructing, transforming, and/or otherwise processing a message that includes some or all of an identified resource. For example, the message may be an HTTP response. As such an application protocol service may access a resource by interoperating with a network stack and/or a network interface adapter to receive some or all of the resource via the network. A user agent may access the resource by interoperating with an application protocol service and/or a network stack to receive the message and/or some or all of the resource. A user agent client may access a resource by receiving the resource and/or information based on the resource. Analogously, a service application, a network application platform, and an application protocol service in a server node may access a resource by receiving a request identifying a resource, processing the request, retrieving the resource from a memory, generating the resource, creating response to the request, including some or all of the resource in the response, and/or sending the response.

In various implementations of the subject of the present disclose, logic for "sending" and entity (e.g. resource) as used herein refers sending via a network and/or making accessible via a shared data area, stack, a queue, a pointer to a memory location, an interprocess communication mechanism, and the like. Similarly, in various implementations of the subject of the present disclose, logic for "receiving" an entity as use herein may include receiving via a network, gaining access sending via a network and/or making accessible via a shared data area, stack, a queue, a pointer to a memory location, an interprocess communication mechanism, and the like. Logic for "exchanging" may include logic for sending and/or for receiving. In various implementations of the subject of the present disclose, logic for "identifying" as use herein may include logic for accessing, sending, receiving, exchanging, detecting, creating, modifying, translating, and/or transforming. In various implementations of the subject of the present disclose, logic for "detecting" as use herein may include logic for accessing, sending, receiving, exchanging, identifying, creating, modifying, translating, and/or transforming.

Performing the methods described herein may comprise one or more of, but is not limited to: calling a function or method of an object; sending a message via a network; sending a message via an interprocess resource exchange mechanism such as a pipe, a semaphore, a shared resource area, and/or a queue; receiving a request such as via polling and responding to invoke the method; and sending an asynchronous message.

Those skilled in the art will understand based on the present disclosure that the methods described herein and illustrated in the drawings constitute algorithms that may each be specified in more detail in source code written in any of various programming languages per the desires of one or more programmers. The source code may be translated and/or otherwise transformed to logic, such as machine code, that is executable by a processor. Those skilled in the art will further understand that modern operating environments, programming languages, and software development tools allow a programmer numerous options in writing the source code that specifies in more detail an algorithm that implements a particular method. For example, a programmer may have a choice with respect to specifying an order for carrying out the operations specified in the method. In another example, a programmer may present a user interface element in any number of ways that are known to those skilled in the art. Details of the source code typically will depend on a target operating environment which may include a particular operating system and user interface software library. Compilers, loaders, and linkers may rewrite the instructions specified in the source code. As such, with respect to an algorithm that implements a particular method, the number of possible algorithms increases or at least remains as large as the level of specificity increases. Specificity general increases from software analysis languages to design languages to programming languages to object code languages to machine code languages. Note the term "language" in this paragraph includes visual modeling (e.g. a flow charts, class diagrams, user interface drawings, etc.) It would be impractical to identify all such algorithms specified at the level of analysis languages or at the level of design languages, but such specifications will be apparent to the population as a whole of those skilled in the art. Further at least at some of all such specifications will be apparent and/or derivable based on the present disclosure to each member of the population. As such, the present disclosure is enabling and all such specifications of the methods/algorithms that may be written by those skilled in the art based on the descriptions herein and/or based on the drawings in an analysis language, a design language, a high level programming language, and/or an assembler language are within the scope of the subject matter of the present disclosure. Further, all specifications generated by a tool from any of the user written specifications are also within the scope of subject matter of the present disclosure.

It will also be apparent to those skilled in the art the algorithms taught based on the descriptions herein, the drawings, and the pseudo-code are exemplary and that a particular architecture, design, and/or implementation for any of the methods described herein may be selected based on various requirements that may vary for an application including and/or otherwise invoking the logic. Requirements may vary based on one or more resources in a target operating environment, performance needs/desires of a user and/or customer, attributes of target display device, attributes of a graphics service if included in a target operating environment, one or more user interface elements processed by the logic and/or otherwise effecting the processing of the logic, a programming language, an analysis language, a design language, a test tool, a field support requirement, an economic cost of developing and supporting the implemented logic, and the desires of one or more developers of the architecture, design, and/or source code that includes and/or accesses the implemented logic. It will be clear to those skilled in the art that in the present disclosure it would impractical to attempt to identify all possible target operating environments, programming languages, development, and test tools much less identify all possible algorithms for implementing the various methods whether the algorithms are expressed in pseudo-code, flow charts, object oriented analysis diagrams, object oriented design diagrams, resource flow diagrams, entity-relationship diagrams, resource structures, classes, objects, functions, subroutines, and the like.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

Illustrative information is provided above regarding various optional architectures and features with which the foregoing frameworks may or may not be implemented, per the desires of the user. It should be strongly noted that such illustrative information is set forth for illustrative purposes and should not be construed as limiting in any manner. Any of the aspects identified by the illustrative information may be optionally incorporated with or without the exclusion of any other of the aspects.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of resource in a structured form. This manipulation transforms the resource or maintains it at locations in the memory system of the computer, which reconfigures or otherwise alters the operation of the device in a manner well understood by those skilled in the art. The resource is maintained at physical locations of the memory as resource structures that have particular properties defined by the format of the resource. However, while the subject matter is being described in the foregoing context, it is not meant to be limiting as those of skill in the art will appreciate that various acts and operation described hereinafter may also be implemented in hardware. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used here, a "computer readable medium" may include one or more of any suitable media for storing the executable instructions of a software component in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. By way of example, and not limitation, computer readable media may comprise computer storage media and resource exchange media. Computer storage media includes volatile and nonvolatile, removable and non-removable media implemented in any method or technology for storage of information such as computer readable instructions, resource structures, software components or other resource. Computer storage media includes, but is not limited to, Random Access Memory (RAM), Read Only Memory (ROM), Electrically Erasable Programmable Read Only Memory (EEPROM), flash memory or other memory technology; portable computer diskette; Compact Disk Read Only Memory (CDROM), compact disc-rewritable (CDRW), digital versatile disks (DVD) or other optical disk storage; magnetic cassettes, magnetic tape, magnetic disk storage or other magnetic storage devices; or any other medium which can be used to store the desired information and which can accessed by a device.

Resource exchange media typically embodies computer readable instructions, resource structures, software components, or other resource in a modulated resource signal such as a carrier wave or other transport mechanism and includes any information delivery media. The term "modulated resource signal" means a signal that has one or more of its characteristics set or changed in such a manner as to encode information in the signal. By way of example, and not limitation, resource exchange media includes wired media such as a wired network or direct-wired connection, and wireless media such as acoustic, RF, infrared and other wireless media. Combinations of any of the above should also be included within the scope of computer readable media.

Thus, the subject matter described herein may be embodied in many different forms, and all such forms are contemplated to be within the scope of what is claimed. It will be understood that various details may be changed without departing from the scope of the claimed subject matter.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A computer-implemented method, comprising:
   developing at least a portion of a particular application that is configured to be installed on at least one device including an operating system, a web browser, and another application;
   developing a web page that includes a Hypertext Transfer Protocol (HTTP) link;
   causing the web page that includes the HTTP link to be hosted by at least one server in connection with a web site;
   causing to be stored, in connection with the particular application, first information identifying at least one aspect of the web site;
   causing to be stored, at the at least one server, second information identifying the particular application;
   via at least one network, receiving, at the at least one server and from the at least one device, a first request initiated via the web browser or the another application of the at least one device; and in response to the first request, serving, to the at least one device via the at least one network, the web page that includes the HTTP link such that, in response to a selection of the HTTP link via the web browser or the another application of the at least one device, the HTTP link causes the operating system to:
- based on a first result of an analysis involving the first information and the second information, open the HTTP link utilizing the particular application of the at least one device, and
- based on a second result of the analysis involving the first information and the second information, open the HTTP link utilizing the web browser or the another application of the at least one device;

wherein, based on the first result of the analysis, the HTTP link is caused to be opened utilizing the particular application of the at least one device in response to the selection of the HTTP link via web browser or the another application of the at least one device, without any user input in connection with the HTTP link other than the selection of the HTTP link via the web browser or the another application of the at least one device;

wherein, based on the first result of the analysis, the HTTP link is caused to be opened utilizing the particular application, instead of the web browser or the another application, even in response to the selection of the HTTP link via the web browser or the another application, and not via the particular application.

2. The computer-implemented method of claim 1, wherein the second information includes a uniform resource locator (URL) parameter.

3. The computer-implemented method of claim 1, wherein the HTTP link is not modified to enable the web browser or the another application of the at least one device or the particular application of the at least one device, to be selectively utilized to open the HTTP link.

4. The computer-implemented method of claim 1, wherein the analysis involves a security criterion, the first result is indicative of the security criterion being met, and the second result is indicative of the security criterion not being met, such that the HTTP link is caused to be opened utilizing the particular application instead of the web browser or the another application in response to the security criterion being met, and that the HTTP link is caused to be opened utilizing the web browser or the another application instead of the particular application in response to the security criterion not being met.

5. The computer-implemented method of claim 1, wherein the analysis involves a first comparison of the first information with first data that is included with the request and that identifies the at least one aspect of the web site, and further involves a second comparison of the second information with second data that is included with the request and that identifies the particular application.

6. The computer-implemented method of claim 1, wherein the first result is indicative of: the first information accurately identifying the at least one aspect of the web site and the second information accurately identifying the particular application, such that the HTTP link is caused to be opened utilizing the particular application instead of the web browser or the another application in response to both the first information accurately identifying the at least one aspect of the web site and the second information accurately identifying the particular application, and that the HTTP link is caused to be opened utilizing the web browser or the another application instead of the particular application in response to at least one of the first information inaccurately identifying the at least one aspect of the web site or the second information inaccurately identifying the particular application.

7. The computer-implemented method of claim 1, wherein the second result is indicative of at least one of: the first information inaccurately identifying the at least one aspect of the web site or the second information inaccurately identifying the particular application.

8. The computer-implemented method of claim 1, wherein the analysis involves a historical criterion.

9. The computer-implemented method of claim 1, wherein the second result occurs even if the first information accurately identifies the at least one aspect of the web site and the second information accurately identifies the particular application, based on a historical use of the at least one device by a user.

10. The computer-implemented method of claim 1, wherein the analysis involves user input.

11. The computer-implemented method of claim 1, wherein the second result occurs even if the first information accurately identifies the at least one aspect of the web site and the second information accurately identifies the particular application, based on a user input on a user interface element displayed in connection with the HTTP link.

12. The computer-implemented method of claim 1, wherein the second result occurs even if the first information accurately identifies the at least one aspect of the web site and the second information accurately identifies the particular application, based on whether the particular application is installed on the at least one device.

13. The computer-implemented method of claim 1, wherein the same web page that includes the same HTTP link is served in response all requests.

14. The computer-implemented method of claim 1, wherein at least one of the first result or the second result is generated in response to the request.

15. The computer-implemented method of claim 1, wherein at least one of the first result or the second result is generated prior to the receipt of the request.

16. The computer-implemented method of claim 1, wherein the at least one aspect of the web site includes at least one uniform resource locator (URL).

17. The computer-implemented method of claim 1, wherein the Hypertext Transfer Protocol (HTTP) link includes a Hypertext Transfer Protocol Secure (HTTPS) link.

18. A method, comprising:
at an apparatus:
- storing, in connection with a particular application, first information identifying at least one aspect of a web site, where the web site includes a web page having an Hypertext Transfer Protocol (HTTP) link associated therewith;
- utilizing a web browser interface of a web browser or a software interface of a software program configured to display the HTTP link, detecting a selection of the HTTP link;
- in response to the detection of the selection of the HTTP link utilizing the web browser interface of the web browser or the software interface of the software program configured to display the HTTP link, causing sending, from the apparatus via at least one network to at least one server that stores the web site and second information identifying the particular application, of a request to access the web page;
- after causing sending, from the apparatus via the at least one network to the at least one server that stores the web site and the second information identifying the particular application, of the request to access the web page: accessing the web page;

performing an analysis involving the first information and the second information;

based on a first result of the analysis involving the first information and the second information, causing presentation of the web page utilizing an application interface of the particular application; and based on a second result of the analysis involving the first information and the second information, causing presentation of the web page utilizing the web browser interface of the web browser;

wherein, based on the first result of the analysis, the web page is caused to be presented utilizing the application interface of the particular application in response to the detection of the selection of the HTTP link utilizing the web browser interface of the web browser or the software interface of the software program configured to display the HTTP link, without detection of any user input in connection with the HTTP link other than the selection of the HTTP link utilizing the web browser interface of the web browser or the software interface of the software program configured to display the HTTP link;

wherein, based on the first result of the analysis, the web page is caused to be presented utilizing the application interface of the particular application, instead of the web browser interface of the web browser or the software interface of the software program configured to display the HTTP link, even in response to the detection of the selection of the HTTP link utilizing the web browser interface of the web browser or the software interface of the software program configured to display the HTTP link, and not the application interface of the particular application.

* * * * *